(12) United States Patent
Bissonette et al.

(10) Patent No.: US 11,354,121 B2
(45) Date of Patent: Jun. 7, 2022

(54) SOFTWARE PORTFOLIO MANAGEMENT SYSTEM AND METHOD

(71) Applicant: RTConfidence, Inc., Irvine, CA (US)

(72) Inventors: Michael M. Bissonette, Irvine, CA (US); Thomas Cocotis, Irvine, CA (US); Craig Trivelpiece, Irvine, CA (US); David Maeschen, Irvine, CA (US); Parvaneh Alavi, Irvine, CA (US)

(73) Assignee: RTCONFIDENCE, INC., Irvine, CA (US)

( * ) Notice: Subject to any disclaimer, the term of this patent is extended or adjusted under 35 U.S.C. 154(b) by 178 days.

(21) Appl. No.: 16/741,648

(22) Filed: Jan. 13, 2020

(65) Prior Publication Data

US 2020/0233662 A1    Jul. 23, 2020

Related U.S. Application Data

(60) Provisional application No. 62/791,526, filed on Jan. 11, 2019.

(51) Int. Cl.
*G06F 9/44* (2018.01)
*G06Q 10/00* (2012.01)
(Continued)

(52) U.S. Cl.
CPC ............... *G06F 8/77* (2013.01); *G06F 9/453* (2018.02); *G06Q 10/0635* (2013.01);
(Continued)

(58) Field of Classification Search
CPC .. G06F 8/77; G06F 8/61; G06F 9/453; G06Q 10/063118; G06Q 10/0635;
(Continued)

(56) References Cited

U.S. PATENT DOCUMENTS

| 7,260,772 | B2 | 8/2007 | Dodge |
| 8,839,232 | B2 * | 9/2014 | Taylor .................... G06Q 30/02 |
| | | | 717/176 |
| 9,953,281 | B2 * | 4/2018 | Wiig ................... G06F 16/3331 |
| 2005/0114829 | A1 | 5/2005 | Robin et al. |
| 2006/0259973 | A1 | 11/2006 | Sima et al. |

(Continued)

OTHER PUBLICATIONS

David C. Bachman, Better Schedule Performance Assessments Derived From Integrated Master Plan—Referenced Schedule Metrics, Sep. 2011, [Retrieved on Aug. 11, 2021]. Retrieved from the internet: <URL: https://apps.dtic.mil/sti/pdfs/ADA582713.pdf> 25 Pages (403-427) (Year: 2011).*

(Continued)

*Primary Examiner* — Anibal Rivera
(74) *Attorney, Agent, or Firm* — Manatt, Phelps & Phillips LLP

(57) ABSTRACT

A software-based product development portfolio management system and method that may be implemented using a software as a service (SaaS) model that allows users (based on access rights) to: create and update valid project plans using integrated management tools and techniques, view near-real-time project data and metrics; enable lean project management; send messages to other users via system alerts and/or e-mails and receive messages/alerts from other SPM System users; input data; establish and change organizational governance guidelines; and approve, conditionally approve or reject decisions.

23 Claims, 72 Drawing Sheets

(51) Int. Cl.
*G06Q 10/06* (2012.01)
*G06F 8/77* (2018.01)
*G06F 9/451* (2018.01)
*G06Q 10/10* (2012.01)

(52) U.S. Cl.
CPC ..... *G06Q 10/063118* (2013.01); *G06Q 10/06* (2013.01); *G06Q 10/067* (2013.01); *G06Q 10/0639* (2013.01); *G06Q 10/06313* (2013.01); *G06Q 10/06314* (2013.01); *G06Q 10/10* (2013.01)

(58) Field of Classification Search
CPC .... G06Q 10/0639; G06Q 10/10; G06Q 10/06; G06Q 10/067; G06Q 10/06314; G06Q 10/063114; G06Q 10/06313
See application file for complete search history.

(56) References Cited

U.S. PATENT DOCUMENTS

| | | | |
|---|---|---|---|
| 2008/0222630 | A1* | 9/2008 | Taylor ................ G06F 8/61 717/176 |
| 2009/0018886 | A1 | 1/2009 | Lacy et al. |
| 2011/0131139 | A1* | 6/2011 | Gregory .............. G06Q 10/067 705/301 |
| 2011/0270644 | A1 | 11/2011 | Roncolato et al. |
| 2012/0041796 | A1* | 2/2012 | Miller, Jr. ...... G06Q 10/063114 705/7.15 |
| 2012/0215574 | A1* | 8/2012 | Driessnack ........ G06Q 10/0639 705/7.12 |
| 2013/0129060 | A1 | 5/2013 | Gopalakrishnan et al. |
| 2013/0253969 | A1 | 9/2013 | Das et al. |
| 2014/0032255 | A1 | 1/2014 | Hegazi |
| 2014/0343999 | A1 | 11/2014 | Kim et al. |
| 2014/0365198 | A1 | 12/2014 | Kuell et al. |
| 2015/0006122 | A1 | 1/2015 | Du |
| 2015/0066834 | A1 | 3/2015 | Jeffries |
| 2017/0286880 | A1* | 10/2017 | Wiig ................... G06Q 10/067 |
| 2019/0394243 | A1* | 12/2019 | Wiig ................... H04L 63/0876 |
| 2020/0226305 | A1 | 7/2020 | Trivelpiece et al. |

OTHER PUBLICATIONS

Debra L. Emmons et al., Quantitative Approach to Independent Schedule Estimates of NASA Science Missions, 2009 IEEE, [Retrieved on Dec. 9, 2021]. Retrieved from the internet: <URL: https://ieeexplore.ieee.org/stamp/stamp.jsp?tp=&arnumber=4839733> 8 Pages (1-8) (Year: 2009).*

Banks et al., "Integrated modeling program, applied chemical theory (IMPACT)." In: Journal of computational chemistry. Dec. 2005 (Dec. 2005) Retrieved on Mar. 13, 2020 (Mar. 13, 2020), 57 pages. https://www.ncbi.nlm.nih.gov/pmc/articles/PMC2742605/pdf/nihms129108.pdf.

Cho et al., "A simulation-based process model for managing complex design projects." In: IEEE Transactions on engineering management. Aug. 2005 (Aug. 2005) Retrieved on Mar. 10, 2020 (Mar. 10, 2020), 13 pages. <http://web.mitedu/people/eppinger/pdf/Cho_IEEE_2005.pdf> entire document.

Ballesteros-Perez, Pablo. "M-PERT: Manual project-duration estimation technique for teaching scheduling basics." Journal of construction engineering and management 143.9 (2017): 04017063. (Year: 2017), 14 pages.

Burt, John, and Mark Garman. "Monte Carlo techniques for stochastic PERT network analysis." INFOR: Information Systems and Operational Research 9.3 (1971): 248-262. (Year: 1971), 8 pages.

Covert, Raymond P. "Using Method of Moments in Schedule Risk Analysis." (2011). 2012 SCEA/ISPA Joint Annual Conference and Training Workshop (Year: 2012), 18 pages.

Hayhurst et al., "A Structural Factoring Approach for Analyzing Probabilistic Networks", 1989, College of William and Mary, Master's Thesis (Year: 1989), 46 pages.

Lawrence, Frederick P., and Jeffery K. Cochran. "A new computational approach for project management networks." Computers & Industrial Engineering 29.1-4 (1995): 339-343. (Year: 1995), 5 pages.

Martin, J. J. "Distribution of the time through a directed, acyclic network." Operations Research 13.1 (1965): 46-66. (Year: 1965), 22 pages.

McDonald, "Analysis of Stochastic Networks", Master's Thesis, Arizona State University, May 1966 (Year: 1966), 49 pages.

Sprow, Frank B. "Evaluation of research expenditures using triangular distribution functions and Monte Carlo Methods." Industrial & Engineering Chemistry 59.7 (1967): 35-38. (Year: 1967), 4 pages.

Weck et al., "ESD.36 System Project Management, Lecture 9, Probabilistic Scheduling", Course Notes from MIT, Oct. 4, 2012, accessed via the MIT OpenCouseWare site, (Year: 2012), 42 pages.

* cited by examiner

| | IMS Analysis Check-List Items | DCMA 14-Point Metric | ChronoTM Comparison |
|---|---|---|---|
| 1 | Logic (inter-dependencies) | Minimal missing Logic Links. | |
| | | # of tasks without predecessors and / or successors should not exceed | 0 Exceptions per ChronoTM Wizard |
| 2 | Leads (negative lag) | Should not be used. | 0 Exceptions per ChronoTM Wizard |
| | | Negative time is not demonstrable and should not be encouraged. | |
| 3 | Lags | Minimal usage allowed. | SS+ Allowed by ChronoTM Wizard |
| | | Should not be used to manipulate float/slack or to restrain the schedule. Should not exceed 5%. | |
| 4 | Relationship Types | | |
| | Finish-to-Start (FS) | Encouraged (>90%) | ChronoTM Default |
| | Start-to-Finish (SF) | Counter-intuitive; only rarely used, if Justified | Not allowed by ChronoTM |
| | Start-to-Start (SS) | OK | Allowed by ChronoTM |
| | Finish-to-Finish (FF) | OK | Not allowed by ChronoTM |
| 5 | Hard Constraints | No more than 5% of tasks should have Hard Constraints. | |
| | Hard: Must_Finish-On (MFO), Must-Start- On (MSO), Start No-Later-Than (SNLT) & Finish-No-Later-Than (FNLT) | Hard constraints prevent schedule from being logic-driven. | Not allowed by ChronoTM |
| | Soft: As-soon-As-Possible (ASAP), Start-No-Earlier-Than (SNET), & Finish-No-Earlier-Than (FNET) | Soft contraints are OK. | ChronoTM Default |

FIGURE 2B

| | | | |
|---|---|---|---|
| 6 | High Float | No more than 5% of tasks with Total Float/Slack in excess of 44 days (2 | Not Specifically imposed by Chrono™ (could easily add) |
| | | May be a result of missing predecessors and/or successors. | |
| 7 | Negative Float | Tasks should not have negative float. | Not allowed by Chrono™ |
| 8 | High Duration | A task which has less than 0 Float/Slack does not support the Critical Path (CP). | |
| | | <5% of tasks with a Baseline duration >44 working days (2 months), within rolling wave planning window. | Not Specifically imposed by Chrono™ (could easily add) |
| | | Helps to break large tasks into 2 or more smaller tasks - makes schedule more manageable. | |
| 9 | Invalid Dates | Cannot forecast starts and/or finishes before the project Status date. | 0 Exceptions per Chrono™ Wizard |
| | | Not logical or appropriate to back-date. | |
| 10 | Resources | All tasks with durations greater than zero have dollars or hours assigned. | Not Specifically imposed by Chrono™ (not Planned or needed for ES) |
| | | If IMS is required to be resource-loaded. | |
| 11 | Missed Tasks | No more than 5% of tasks should be late at a status update. | 0 Exceptions per Chrono™ Wizard |
| | | % of tasks which were suppose to be completed by the baseline status date, but have forecasted finish dates after the status date. | |

FIGURE 2B
CONTINUED

| | | | |
|---|---|---|---|
| 12 | Critical Path Test | Change in Critical Path task duration extension must result in same number of negative float/slack days for completion task/milestone. | [dotted] |
| | | This is a test for broken logic somewhere in the IMS network. | 0 Exceptions per Chrono™ Wizard |
| 13 | Critical Path Length Index (CPLI) | CPLI < .95 is an indicator of inefficiencies to be investigated. | [hatched] Not Specifically Imposed by Chrono™ (could easily calculate) |
| | | CPLI = (remaining duration of CP + TF)/(remaining duration of CP). | |
| 14 | Baseline Execution Index (BEI) | Metric measuring task throughput (>1 is good, and <1 is bad). | [hatched] Not Specifically Imposed by Chrono™ (could easily calculate) |
| | | BEI cum = (total # of tasks complete) / (total # of tasks completed before status date + total # of tasks missing baseline finish date). | |
| | | Provides insight into the realism of program cost, resource and schedule estimates. | |

[dotted] Chrono™ Exceeds this metric guideline
[shaded] Chrono™ Meets this metric guideline
[hatched] Not Implemented but could (or do not have to due to ES vs EV Implementation)

FIGURE 2B
CONTINUED

| | Project Wizard components (current Sub-Wizards) | | |
|---|---|---|---|
| SPM System Sub-Wizard | | Wizard Functions | Activation Method |
| 1 | Blank Project Wizard | Sets up a New Project with essential start and end bounds. Pre-establishes Project Settings which enable a Valid Project set-up. | User Selection via "New" File Options |
| 2 | Chrono Wizard | Incrementally helps Users set up Predecessor/Successor Task Relationships. Enables establishment of valid interdependencies between Tasks. Incrementally helps Users to establish 3-point duration estimates per Task. Provides drop-down menus for Task Opportunity and Risk Descriptions. | Chrono Tab Button |
| 3 | Validation Wizard | Checks the entire Project structure to ensure that construction criteria for appropriate SRA (Schedule Risk Analysis) and EVM (Earned Value Measurement) is supported. Provides help and options for fixing issues identified. | Automated when identifies need for Simulation updates (due to changes) and Chrono Tab Button |
| 4 | TriCoBi Simulation Wizard | Collect and sends all the data to the Cloud for SRA and Earned Schedule computations and graphic output generation. Automatically invokes the Validation Wizard if changes made. Formats the Simulation Data for multiple Gantt charts in local MS Project file. | Activated by the Chrono Tab Button or whenever a RED Flag in the Chrono Tab is selected |
| 5 | Gantt Chart View Wizard | Creates the database for multiple (i.e. 4 or more) IMS Gantt charts (at different 'S' Curve %Confidence values) and sends to local MS Project file. Enables the different Gantt charts to be displayed in the local MS Project file when the Chrono Tab selection is made. | Automatic for all selected Auto-scheduled Milestones in the IMS Structure |

FIGURE 2C

| | | | |
|---|---|---|---|
| 6 | Set Project Baseline Wizard | Automatically established IMS (Integrated Master Schedule) Baselines (both a "Nominal" task duration baseline for the traditional Critical Path and a Business task duration baseline established for the Team Commitment).<br>Sets up the ES (Earned Schedule) Baseline data for use in generating ES metrics automatically.<br>Provides a warning to user to ensure Sponsor approval is obtained first.<br>Enables Selection of either Baseline in the Gantt Chart Views - the default for Nominal and Business Gantts are the Nominal and Business Baselines.<br>Automatically disables "Defaults" from being changed after the Baseline is set - this prevents inappropriate changes. | Chrono Tab Buttons -- one for setting the baselines, and the other for selecting the baseline in Gantt Views |
| 7 | Project Progress Update Wizard | Walks the user through Project progress updating that enables automatic generation of new SRA and EVM outputs.<br>User sets the Update date, are sequenced through updates of Tasks that were open during that time up to the update date, automatically changes 3-points for remaining durations, allows checking of data, previewing of update results, and officially publishing the update when ready to do so.<br>Ensures that the correct process if followed to make updating easy. | Chrono Tab Buttons, which are only available after the project plan has been "Baselined" |
| 8 | Probability Distribution Wizard | Enables users to pick the appropriate Probability Distribution to use for the various Tasks.<br>Enables the Task distribution to be set as the Output distribution of a more complicated "Child" IMS by automatically linking the information within the SPM System.<br>Can also apply the same triangular distribution Ratios to all tasks as a "What IF". | A "Default" setting and/or a communicating setting within the task definitions for "Child" / "Parent" linking of tasks |

FIGURE 2C
CONTINUED

| | | | |
|---|---|---|---|
| 9 | Multiple Gantt Chart Wizard | Provides the different Gantt charts within the Chrono Tab. If a RED Flag is present, the Validation and Simulation will be automatically initiated to provide the Gantt chart representing the most current data, and if the IMS has a structure problem, will invoke the Validation Wizard to help resolve the issue(s). | Automatic |
| 10 | SRA Output Wizard | A cloud-based system that takes current inputs and converts those into Graphic Outputs for SRA, ES and other data as deemed necessary (i.e. SRA Tornado chart, Merge Bias charts, Trend charts, etc.). Includes controls for knowing when Baselines are established and Updates are processed – and provides trend data by keeping track of past inputs. | Automatic |
| 11 | Earned Schedule Output Wizard | Takes Baseline and Update input data and establishes a data set that is used to process integrated trend charts with EVM performance indices and independent schedule estimations. Passes the above data to the SRA Output Wizard. | Automatic |
| 12 | Merge Bias Wizard | This Wizard both quantifies the Merge Bias (i.e. extra schedule impact contributed to the SRA output as a result of the merging of overlapping parallel Tasks within the IMS network) and enables an innovative Gantt chart view that displays it graphically. | Automatic, but the display is a Chrono Tab Button feature |
| 13 | Probabilistic Branching Wizard | This feature enables users to effortlessly insert Probabilistic branching into the IMS to enable SRA outputs which include the impacts of these potential schedule structure paths. | Chrono Tab Button |
| 14 | Status Presentation Wizard | This is an expansive Wizard, for it is the engine that constructs the ChronoDash output data for eventually display to the Project/Program/Portfolio Stakeholder community. The ultimate output is graphics that displace the need for separate Project status update charts, and maximizes the use of objective project performance data and metrics. Includes the generation of Shields/Badges that essentially represent the level of goodness in Project Planning and Execution Performance – a form of Gamification. | Available for Users of the System who have access right to approve published project data |

FIGURE 2C
CONTINUED

| Project Objective | Defined Conditions for Impact Scales of a Risk on Major Project Objectives (Examples are shown for negative impacts only) | | | | |
|---|---|---|---|---|---|
| | Relative or numerical scales are shown | | | | |
| | Very Low /0.05 | Low /0.10 | Moderate /0.20 | High /0.40 | Very high /0.80 |
| Cost | Insignificant cost increase | <10% cost increase | 10 - 20% cost increase | 20 - 40% cost increase | >40% cost increase |
| Time | Insignificant time increase | <5% time increase | 5 - 10% time increase | 10 - 20% time increase | >20% time increase |
| Scope | Scope decrease barely noticeable | Minor areas of scope affected | Major areas of scope affected | Scope reduction unacceptable to sponsor | Project end item is effectively useless |
| Quality | Quality degradation barely noticeable | Only very demanding applications are affected | Quality reduction requires sponsor approval | Quality reduction unacceptable to sponsor | Project end item is effectively useless |

FIGURE 4A
CONTINUED

Individual Project Task Schedule Risk Description Generation Process
(with example based on risk information generated in FIG. 3a).

Risk Metalanguage Statement:
As a result of <CAUSE>, <RISK> may occur, which will lead to <EFFECT>.
Example:
As a result of this design's tight dimensional tolerances, the need for more engineering work may occur, which will lead to schedule growth.

(Step 4)

Risk Description Metalanguage Statement:
<RISK> due to <CAUSE>
Example:
The need for more engineering work due to this design's tight dimensional tolerances (Step 5)

Project Risk Register Example (Step 6)

| Item | Description | Project Objectives Potentially Impacted (cost, schedule, scope, quality) | Response Plan | Probability | Impact / Consequence | Severity |
|---|---|---|---|---|---|---|
| A | The need for more engineering work due to this design's tight dimensional tolerances | Schedule | Closely Monitor | 0.3 | 0.1 | 0.03 |
| B | | | | | | 0 |
| C | | | | | | 0 |

FIGURE 4B
CONTINUED

Origin of R/Y/G Metrics:
- Automated Examples:
  - Overall Project Health: via FIG. 4c Table
  - Schedule: SPI EVM Metric
  - Scope: Based on Change Management System Alerts (Proposed and Approved)
  - Technical/Quality: Based on Change Management System Alerts (Proposed and Approved)
  - Resources: TBD
  - Finances: CPI EVM Metric
  - Risks: Risk Matrix and % Confidence for Cost and Schedule
- Manual Updating as well (with appropriate approvals) for officially updating
- Auto-Populate Prior Status Data Recovery Plan Inputs & Future Trend
- All Require Input from PM
- Can accommodate Team Member recommended inputs (edited and approved by FM and edited/approved/officially updated by PM and/or Exec)

| | Overall Status | | | | | RECOVERY PLAN | Future Trend |
|---|---|---|---|---|---|---|---|
| | Month -3 | Month -2 | Month -1 | Current | Future Trend | | Steady ⇔ / Improving ⇐ / Worsening ⇒ |
| Overall Project Health | Y | G | R | R | ⇔ | Overall project is in serious jeopardy of missing commitments. Meeting tomorrow morning with all stakeholders to assess. | |
| Schedule | Y | G | R | R | ⇐ | Slight improvement in SPI - Team to Evaluate (to report on next week). | |
| Scope | Y | Y | Y | R | ⇒ | Additional scope required to recover. Increase in concern over last month's report. | |
| Technical/Quality | G | G | G | Y | ⇒ | Considering product spec changes to meet schedule and budget. | |
| Resources | G | G | Y | G | ⇒ | Resource concern resolved, but scope change might require that this is re-visited. | |
| Finances | G | G | R | R | ⇐ | Slight improvement expected, but additional scope changes are expected to be required to recover. | |
| Risk | Y | G | Y | R | ⇐ | Risk materialized regarding completion of design. Impacts to project performance is expected to increase - under review. | |

FIGURE 5B

Sample Red/Yellow/Green Metric Calculator

- 4 Levels of Green ("G" in figure)
- 7 Levels of Yellow ("Y" in figure)
- 17 Levels of Red ("R" in figure)

Could be expanded or contracted to evaluate more than just the 6 Constraints or leaving out one or more of the 6 Constraints that are not considered important to the organization.

FIGURE 5C

TRACKING GANTT | Critical Path Nominal

| | Task Mode | Task Name | Duration | Start | Finish | Predecessors | Successors |
|---|---|---|---|---|---|---|---|
| 1 | ⬥ | Start Milestone | 0 days | 2/3/20 8:00 AM | 2/3/20 8:00 AM | | 3 |
| 2 | ⌐ | Prototype Development | 115 day | 2/3/20 8:00 AM | 7/10/20 5:00 PM | | |
| 3 | ⌐ | Prototype Design | 45 days | 2/3/20 8:00 AM | 4/3/20 5:00 PM | 1 | 4SS+30 days,5 |
| 4 | ⌐ | Buy Prototype LL (Long-Lead) Parts | 35 days | 3/16/20 8:00 AM | 5/1/20 5:00 PM | 3SS+30 days | 6 |
| 5 | ⌐ | Buy Remaining Prototype Parts | 30 days | 4/6/20 8:00 AM | 5/15/20 5:00 PM | 3 | 7 |
| 6 | ⌐ | Initial Prototype Build | 20 days | 5/4/20 8:00 AM | 5/29/20 5:00 PM | 4 | 7 |
| 7 | ⌐ | Final Assembly of Prototypes | 10 days | 6/1/20 8:00 AM | 6/12/20 5:00 PM | 5,6 | 8 |
| 8 | ⌐ | Test & Evaluation | 20 days | 6/15/20 8:00 AM | 7/10/20 5:00 PM | 7 | 10SS+15 days,12 |
| 9 | ⌐ | Final Product Development | 105 day | 7/6/20 8:00 AM | 11/27/20 5:00 PM | | |
| 10 | ⌐ | Final Product Design | 35 days | 7/6/20 8:00 AM | 8/21/20 5:00 PM | 8SS+15 days | 11 |
| 11 | ⌐ | Final Design Review | 0 days | 8/21/20 5:00 PM | 8/21/20 5:00 PM | 10 | 13 |
| 12 | ⌐ | Buy LL Parts for Qual Units and Production | 30 days | 7/13/20 8:00 AM | 8/21/20 5:00 PM | 8 | 14 |
| 13 | ⌐ | Buy Remaining Parts for Qual Units | 30 days | 8/24/20 8:00 AM | 10/2/20 5:00 PM | 11 | 15 |
| 14 | ⌐ | Initial Assembly of POR (Plan of Record) Units | 20 days | 8/24/20 8:00 AM | 9/18/20 5:00 PM | 12 | 15 |
| 15 | ⌐ | Final Assembly of POR Units | 15 days | 10/5/20 8:00 AM | 10/23/20 5:00 PM | 13,14 | 16,17SS+10 days |
| 16 | ⌐ | Conduct Qual Tests | 20 days | 10/26/20 8:00 AM | 11/20/20 5:00 PM | 15 | 18,19 |
| 17 | ⌐ | Verify Final Design Iterations | 30 days | 10/19/20 8:00 AM | 11/27/20 5:00 PM | 15SS+10 days | 18 |
| 18 | ⌐ | Conduct Launch Readiness Review | 0 days | 11/27/20 5:00 PM | 11/27/20 5:00 PM | 16,17 | 20 |
| 19 | ⌐ | Buy Remaining Production Parts | 30 days | 11/23/20 8:00 AM | 1/1/21 5:00 PM | 16 | 20 |
| 20 | ⌐ | Start Production | 0 days | 1/1/21 5:00 PM | 1/1/21 5:00 PM | 18,19 | 21 |
| 21 | ⬥ | Commitment Milestone | 0 days | 3/3/21 5:00 PM | 3/3/21 5:00 PM | 20 | |

FIGURE 6A
CONTINUED

| Task Mode | Task Name | Duration | Start | Finish | Predecessors | Successors |
|---|---|---|---|---|---|---|
| | Start Milestone | 0 days | 2/3/20 8:00 AM | 2/3/20 8:00 AM | | 3 |
| ⚙ | Prototype Development | 134.98 day | 2/3/20 8:00 AM | 8/7/20 4:50 PM | | |
| ⚙ | Prototype Design | 53.18 days | 2/3/20 8:00 AM | 4/16/20 9:26 AM | 1 | 4SS+30 days,5 |
| ⚙ | Buy Prototype LL (Long-Lead) Parts | 35 days | 3/16/20 8:00 AM | 5/1/20 5:00 PM | 3SS+30 days | 6 |
| ⚙ | Buy Remaining Prototype Parts | 35.25 days | 4/16/20 9:26 AM | 6/4/20 11:26 AM | 3 | 7FS+1.9 days |
| ⚙ | Initial Prototype Build | 22.04 days | 5/4/20 8:00 AM | 6/3/20 8:19 AM | 4 | 7FS+1.22 days |
| ⚙ | Final Assembly of Prototypes | 14.97 days | 6/8/20 10:38 AM | 6/29/20 10:24 AM | 5FS+1.9 days,6 | 8 |
| ⚙ | Test & Evaluation | 29.68 days | 6/29/20 10:24 AM | 8/7/20 4:50 PM | 7 | 10SS+15 days,12 |
| ⚙ | Final Product Development | 127.54 day | 7/20/20 10:24 AM | 1/13/21 3:43 PM | | |
| ⚙ | Final Product Design | 41.19 days | 7/20/20 10:24 AM | 9/15/20 11:55 AM | 8SS+15 days | 11 |
| ⚙ | Final Design Review | 0 days | 9/15/20 11:55 AM | 9/15/20 11:55 AM | 10 | 13 |
| ⚙ | Buy LL Parts for Qual Units and Production | 30 days | 8/7/20 4:50 PM | 9/18/20 4:50 PM | 8 | 14 |
| ⚙ | Buy Remaining Parts for Qual Units | 35.16 days | 9/15/20 11:55 AM | 11/3/20 2:12 PM | 11 | 15FS+1.75 days |
| ⚙ | Initial Assembly of POR (Plan of Record) Units | 20.3 days | 9/18/20 4:50 PM | 10/19/20 10:14 AM | 12 | 15FS+0.5 days |
| ⚙ | Final Assembly of POR Units | 14.68 days | 11/5/20 11:12 AM | 11/26/20 8:38 AM | 13FS+1.75 days | 16,17SS+10 days |
| ⚙ | Conduct Qual Tests | 34.76 days | 11/26/20 8:38 AM | 1/13/21 3:43 PM | 15 | 18FS+3.45 days,1 |
| ⚙ | Verify Final Design Iterations | 31.41 days | 11/19/20 11:12 AM | 1/1/21 3:29 PM | 15SS+10 days | 18FS+1.45 days |
| ⚙ | Conduct Launch Readiness Review | 0 days | 1/19/21 10:19 AM | 1/19/21 10:19 AM | 16FS+3.45 days | 20 |
| ⚙ | Buy Remaining Production Parts | 35.05 days | 1/13/21 3:43 PM | 3/3/21 4:07 PM | 16 | 20 |
| ⚙ | Start Production | 0 days | 3/3/21 4:07 PM | 3/3/21 4:07 PM | 18,19 | 21 |
| ✦ | Commitment Milestone | 0 days | 3/3/21 5:00 PM | 3/3/21 5:00 PM | 20 | |

70 % Schedule

TRACKING GANTT

FIGURE 6A
CONTINUED

| | Task Mode | Task Name | Duration | Start | Finish | Predecessors | Successors |
|---|---|---|---|---|---|---|---|
| 1 | ◇ | Start Milestone | 0 days | 2/3/20 8:00 AM | 2/3/20 8:00 AM | | 3 |
| 2 | ☑ | Prototype Development | 134.98 day | 2/3/20 8:00 AM | 8/7/20 4:50 PM | | |
| 3 | ☑ | Prototype Design | 53.18 days | 2/3/20 8:00 AM | 4/16/20 9:26 AM | 1 | 4SS+30 days,5 |
| 4 | ☑ | Buy Prototype LL (Long-Lead) Parts | 35 days | 3/16/20 8:00 AM | 5/1/20 5:00 PM | 3SS+30 days | 6 |
| 5 | ☑ | Buy Remaining Prototype Parts | 35.25 days | 4/16/20 9:26 AM | 6/4/20 11:26 AM | 3 | 7FS+1.9 days |
| 6 | ☑ | Initial Prototype Build | 22.04 days | 5/4/20 8:00 AM | 6/3/20 8:19 AM | 4 | 7FS+1.22 days |
| 7 | ☑ | Final Assembly of Prototypes | 14.97 days | 6/8/20 10:38 AM | 6/29/20 10:24 AM | 5FS+1.9 days,6 | 8 |
| 8 | ☑ | Test & Evaluation | 29.68 days | 6/29/20 10:24 AM | 8/7/20 4:50 PM | 7 | 10SS+15 days,12 |
| 9 | ☑ | Final Product Development | 127.54 day | 7/20/20 10:24 AM | 1/13/21 3:43 PM | | |
| 10 | ☑ | Final Product Design | 41.19 days | 7/20/20 10:24 AM | 9/15/20 11:55 AM | 8SS+15 days | 11 |
| 11 | ☑ | Final Design Review | 0 days | 9/15/20 11:55 AM | 9/15/20 11:55 AM | 10 | 13 |
| 12 | ☑ | Buy LL Parts for Qual Units and Production | 30 days | 8/7/20 4:50 PM | 9/18/20 4:50 PM | 8 | 14 |
| 13 | ☑ | Buy Remaining Parts for Qual Units | 35.16 days | 9/15/20 11:55 AM | 11/3/20 2:12 PM | 11 | 15FS+1.75 days |
| 14 | ☑ | Initial Assembly of POR (Plan of Record) Units | 20.3 days | 9/18/20 4:50 PM | 10/19/20 10:14 AM | 12 | 15FS+0.5 days |
| 15 | ☑ | Final Assembly of POR Units | 14.68 days | 11/5/20 11:12 AM | 11/26/20 8:38 AM | 13FS+1.75 days | 16,17SS+10 days |
| 16 | ☑ | Conduct Qual Tests | 34.76 days | 11/26/20 8:38 AM | 1/13/21 3:43 PM | 15 | 18FS+3.45 days,1 |
| 17 | ☑ | Verify Final Design Iterations | 31.41 days | 11/19/20 11:12 AM | 1/1/21 3:29 PM | 15SS+10 days | 18FS+1.45 days |
| 18 | ☑ | Conduct Launch Readiness Review | 0 days | 1/19/21 10:19 AM | 1/19/21 10:19 AM | 16FS+3.45 days | 20 |
| 19 | ☑ | Buy Remaining Production Parts | 35.05 days | 1/13/21 3:43 PM | 3/3/21 4:07 PM | 16 | 20 |
| 20 | ☑ | Start Production | 0 days | 3/3/21 4:07 PM | 3/3/21 4:07 PM | 18,19 | 21 |
| 21 | ◇ | Commitment Milestone | 0 days | 3/3/21 5:00 PM | 3/3/21 5:00 PM | 20 | |

TRACKING GANTT — Baseline Commitment

FIGURE 7
CONTINUED

TRACKING GANTT

Status'd Gantt - 51% Confidence of

| # | Task Mode | Task Name | Duration | Start | Finish | Predecessors | Successors |
|---|---|---|---|---|---|---|---|
| 1 | ◇ | Start Milestone | 0 days | 2/3/20 8:00 AM | 2/3/20 8:00 AM | | 3 |
| 2 | ⚙ | Prototype Development | 144.58 day | 2/3/20 8:00 AM | 8/21/20 1:38 PM | | |
| 3 | ⚙ | Prototype Design | 63.6 days | 2/3/20 8:00 AM | 4/30/20 1:48 PM | 1 | 4SS+30 days,5 |
| 4 | ⚙ | Buy Prototype LL (Long-Lead) Parts | 35 days | 3/16/20 8:00 AM | 5/1/20 5:00 PM | 3SS+30 days | 6 |
| 5 | ⚙ | Buy Remaining Prototype Parts | 35.6 days | 4/30/20 1:48 PM | 6/19/20 9:35 AM | 3 | 7 |
| 6 | ⚙ | Initial Prototype Build | 22.04 days | 5/4/20 8:00 AM | 6/3/20 8:19 AM | 4 | 7 |
| 7 | ⚙ | Final Assembly of Prototypes | 14.65 days | 6/19/20 9:35 AM | 7/9/20 3:48 PM | 5,6 | 8 |
| 8 | ⚙ | Test & Evaluation | 30.73 days | 7/9/20 3:48 PM | 8/21/20 1:38 PM | 7 | 10SS+15 days,12 |
| 9 | ⚙ | Final Product Development | 128.26 day | 7/30/20 3:48 PM | 1/27/21 8:53 AM | | |
| 10 | ⚙ | Final Product Design | 42.8 days | 7/30/20 3:48 PM | 9/29/20 2:12 PM | 8SS+15 days | 11 |
| 11 | ⚙ | Final Design Review | 0 days | 9/29/20 2:12 PM | 9/29/20 2:12 PM | 10 | 13 |
| 12 | ⚙ | Buy LL Parts for Qual Units and Production | 30 days | 8/21/20 1:38 PM | 10/2/20 1:38 PM | 8 | 14 |
| 13 | ⚙ | Buy Remaining Parts for Qual Units | 35.13 days | 9/29/20 2:12 PM | 11/17/20 3:14 PM | 11 | 15FS+0.84 days |
| 14 | ⚙ | Initial Assembly of POR (Plan of Record) Units | 20.26 days | 10/2/20 1:38 PM | 10/30/20 3:43 PM | 12 | 15FS+0.13 days |
| 15 | ⚙ | Final Assembly of POR Units | 14.72 days | 11/18/20 1:58 AM | 12/9/20 10:43 AM | 13FS+0.84 days | 16,17SS+10 days |
| 16 | ⚙ | Conduct Qual Tests | 34.77 days | 12/9/20 10:43 AM | 1/27/21 8:53 AM | 15 | 18FS+3.11 days,1 |
| 17 | ⚙ | Verify Final Design Iterations | 31.48 days | 12/2/20 1:58 PM | 1/15/21 8:48 AM | 15SS+10 days | 18FS+1.21 days |
| 18 | ⚙ | Conduct Launch Readiness Review | 0 days | 2/1/21 9:45 AM | 2/1/21 9:46 AM | 16FS+3.11 days | 20 |
| 19 | ⚙ | Buy Remaining Production Parts | 35.06 days | 1/27/21 8:53 AM | 3/17/21 9:22 AM | 16 | 20 |
| 20 | ⚙ | Start Production | 0 days | 3/17/21 9:22 AM | 3/17/21 9:22 AM | 18,19 | 21 |
| 21 | ◇ | Commitment Milestone | 0 days | 3/3/21 5:00 PM | 3/3/21 5:00 PM | 20 | |

A Web Page necpa //

| Home | PI Dashboard | P Dashboard | Logout |

Project Charter Set-up or
Project Stockholders

— Charter

<Project Name> Charter Category — Description (shown when hover over)

- Project Stockholders
- Key Product Features
- Key Product Requirements
- Key Project Requirements
- Key Project Assumptions
- Project Priorities
- Direct Customer(s)
- EndUser (if different from Customer)

Selections to Choose from - Sari by Org. Mgmt Guidlines Could be a long Drop-Down Menu Select "Create New Project" to get Started, or
Select one of the Below Options to make Adjustments

- Create New Project
- Select Project to Set-up or Change
- Request Approval or Approve

FIGURE 9B

Change q

Icon Name

<Project Name> <Category>

Workspace

Input Data

| | | |
|---|---|---|
| Project Manager (PH) | Name | |
| PM Supervisor | True | |
| Project Sponser (Ext) | Employee No. | |
| Project Sponser (Ent) | | |
| Other | | |

Could be a drop-down which relates Homes, Titles, Employee No's, e-Mail address, Desk phone, Mobile phone Could pre-populate Supervisor info

| Sample Authorization Matrix | Potential Users | | | | | | |
|---|---|---|---|---|---|---|---|
| | System Administrator | Executive | Portfolio Manager | Project Manager | Functional Manager | Team Lead | At-Large Team Member |
| Access and Authentication Control | Y | O | O | NL | L | N | N |
| System Customization | Y | Y | Y | N | L | N | N |
| Create Portfolio or Sub-Portfolio | Y | Y | Y | N | N | N | N |
| Pf (Portfolio) Guidelines | Y | O | L | NL | NL | N | N |
| Access Portfolio Dashboards | Y | Y | Y | L | L | L | N |
| Project Charter Set-up and Change | Y | O | Y | Y | L | L | N |
| Access Project Dashboards | Y | Y | Y | Y | L | Y | L |
| Project Plan Creation and Updating* | O | N | O | Y | L | L | L |
| Project Inputs and/or Approvals | N | O | L | Y | L | L | L |
| Messaging / Alerts | Y | Y | Y | Y | Y | Y | Y |

| Legend | |
|---|---|
| Y | Yes |
| N | No |
| O | Optional |
| L | Limited |

\* Might Need Local IMS Tool

FIGURE 17 (CONTINUED)

Notional Project Requirements Compliance Matrix Example

| Section | Category | Sub-Category | Original Requirement | Approved Waiver or Deviation | Demonstrated Performance | Validation Method | | | |
|---|---|---|---|---|---|---|---|---|---|
| | | | | | | Observed | Analysis | Test | Test Method |
| 1.0 | Project | | | | | | | | |
| 1.1 | | Deliverables | | | | | | | |
| 1.1.1 | | | 10 Prototype Units | | | X | | | |
| 1.1.2 | | | 50 Qualification Units | | | X | | | |
| 1.1.3 | | | Data per contract | | | X | | | |
| 1.2 | | Key Schedule Commitments | | | | | | | |
| 1.2.1 | | | 1 January Kick-Off Review | | | X | | | |
| 1.2.2 | | | NLT 1 August Final Design Review | | | X | | | |
| 1.2.3 | | | NLT 15 November Launch Readiness Review | | | X | | | |
| 1.2.4 | | | NLT 30 November Start of Production | | | X | | | |
| 1.3 | | Budget Commitments | | | | | | | |
| 1.3.1 | | | $6.044M total budget | | | X | | | |
| 1.3.2 | | | $6.527M total contract | | | X | | | |
| 1.4 | | Management & Controls | | | | | | | |
| 1.4.1 | | | Integrated Master Schedule per contract | | | X | | | |
| 1.4.2 | | | Earned Value Management per contract | | | X | | | |
| 1.4.3 | | | Requirements Management per contract | | | X | | | |
| 1.4.4 | | | Communication Management per contract | | | X | | | |
| 1.4.5 | | | Supplier Management per contract | | | X | | | |

FIGURE 19B
CONTINUED

| # | Description | Quality Control per contract | Per Company & Industry Std. | | | | Notes |
|---|---|---|---|---|---|---|---|
| 1.4.6 | | | | X | | | |
| 2.0 | Project | | | | | | |
| 2.1 | Key Features - Prototypes | | | | | | |
| 2.1.1 | xxx Dimensions (+5%) | | | | | X | Test 2x.1 |
| 2.1.2 | yyy Weight (max.) | | yyy+10% Weight (max.) | | | X | Test 2x.2 |
| 2.1.3 | 100% Product Performance under Nominal Conditions | | | | X | X | Test 2.1.3 & Analysis 2.1.3 |
| 2.1.4 | Product Cost at 3X Production Cost | | | | X | | Analysis 2x.4 |
| 2.2 | Key Features - Qualification | | | | | | |
| 2.2.1 | xxx Dimensions (± 5%) | | | X | | X | Test 2x.1 |
| 2.2.2 | yyy Weight (max.) | | | | | X | Test 2x.2 |
| 2.2.3 | 100% Product Performance under Specification Conditions | | | | | X | Test 2.2.3 |
| 2.2.4 | Product Cost per contract | | | X | | | Analysis 2x.4 |
| 2.3 | Key Specifications | | | | | | |
| 2.3.1 | Max. Operating Temperature - 100 deg. | | | | | X | Test 2.3.1 |
| 2.3.2 | Min. Operating Temperature - 25 deg. | | | | | X | Test 2.3.2 |
| 2.3.3 | 0 - 100% Humidity | | | | | X | Test 2.3.3 |
| 2.3.4 | 4g Shock per contract testing requirements | | Non-Operational Shock | | | X | Test 2.3.4 |
| 2.3.5 | Vibration per contract testing requirements | | | | | X | Test 2.3.5 |
| 2.3.6 | zzz Reliability per contract | | | | X | | Analysis 2x.4 |

FIGURE 19B
CONTINUED

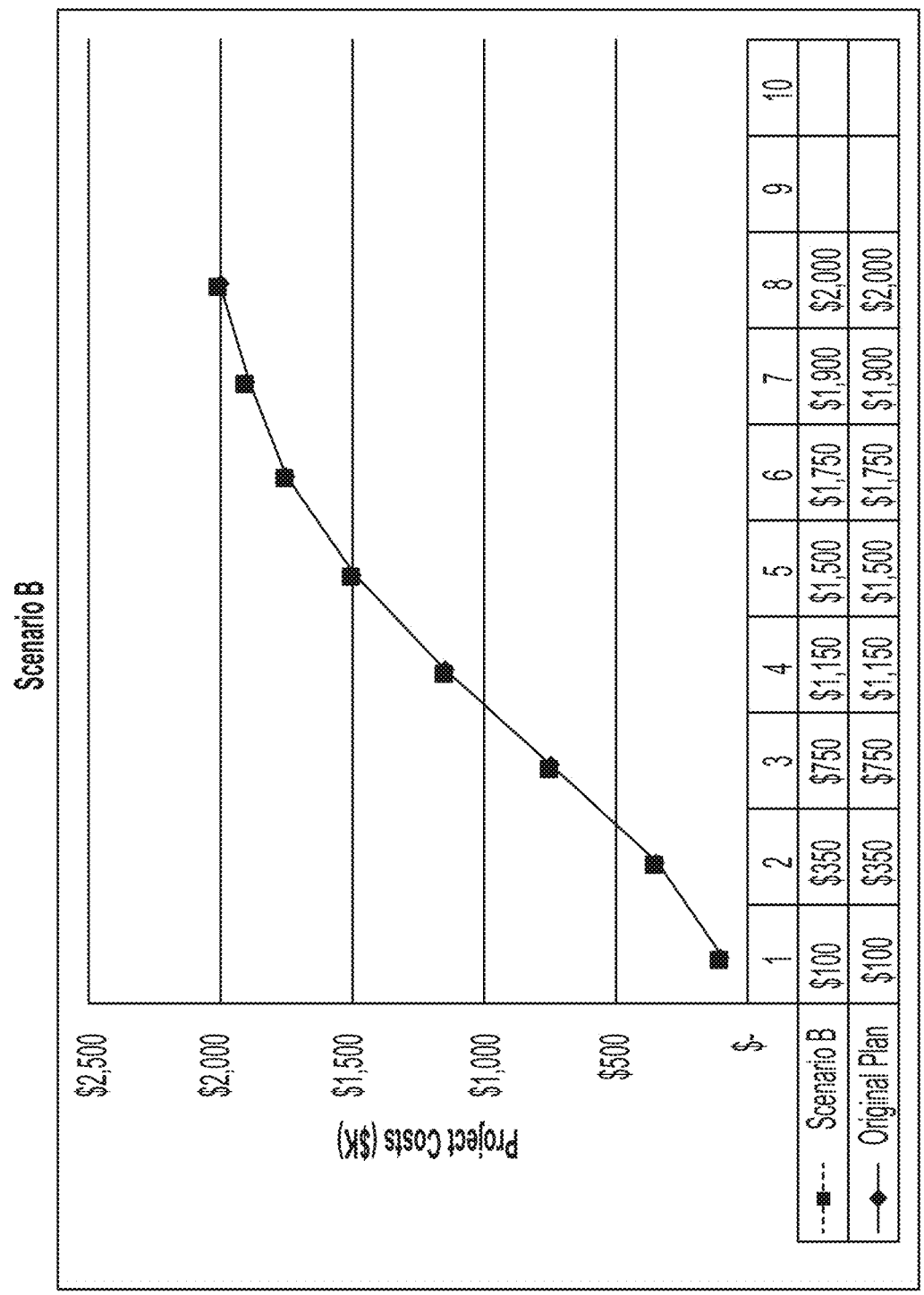

Example of same Plan and 3 Different Progress Scenarios ($ data)

| | Original Project Plan | | | | | | | | | | |
|---|---|---|---|---|---|---|---|---|---|---|---|
| | Month 1 | Month 2 | Month 3 | Month 4 | Month 5 | Month 6 | Month 7 | Month 8 | Month 9 | Month 10 | |
| Task A | $ 100 | $ 100 | $ 100 | | | | | | | | $ 300 |
| Task B | | $ 100 | $ 100 | | | | | | | | $ 200 |
| Task C | | $ 50 | $ 100 | $ 100 | $ 50 | | | | | | $ 300 |
| Task D | | | $ 100 | $ 100 | $ 100 | | | | | | $ 300 |
| Task E | | | | $ 150 | $ 100 | $ 50 | | | | | $ 300 |
| Task F | | | | $ 50 | $ 100 | $ 100 | $ 50 | | | | $ 300 |
| Task G | | | | | | $ 100 | $ 100 | $ 100 | | | $ 300 |
| | $ 100 | $ 250 | $ 400 | $ 400 | $ 350 | $ 250 | $ 150 | $ 100 | | | $ 2,000 |
| | $ 100 | $ 350 | $ 750 | $ 1,150 | $ 1,500 | $ 1,750 | $ 1,900 | $ 2,000 | | | |

| | Scenario A -- Worse than Plan (report) | | | | | | | | | | |
|---|---|---|---|---|---|---|---|---|---|---|---|
| | Month 1 | Month 2 | Month 3 | Month 4 | Month 5 | Month 6 | Month 7 | Month 8 | Month 9 | Month 10 | |
| Task A | $ 75 | $ 125 | $ 200 | $ 50 | | | | | | | $ 450 |
| Task B | | $ 125 | $ 100 | $ 50 | | | | | | | $ 275 |
| Task C | | $ 25 | $ 100 | $ 125 | $ 50 | | | | | | $ 300 |
| Task D | | | $ 50 | $ 75 | $ 100 | $ 75 | | | | | $ 300 |
| Task E | | | | $ 50 | $ 100 | $ 50 | | | | | $ 200 |
| Task F | | | | | $ 25 | $ 100 | $ 75 | $ 25 | | | $ 225 |
| Task G | | | | | | $ 100 | $ 100 | $ 50 | | | $ 250 |
| | $ 75 | $ 275 | $ 450 | $ 350 | $ 275 | $ 325 | $ 175 | $ 75 | | | $ 2,000 |
| | $ 75 | $ 350 | $ 800 | $ 1,150 | $ 1,425 | $ 1,750 | $ 1,925 | $ 2,000 | | | |

| | Scenario A -- Worse than Plan (w future tasks at plan) | | | | | | | | | | |
|---|---|---|---|---|---|---|---|---|---|---|---|
| | Month 1 | Month 2 | Month 3 | Month 4 | Month 5 | Month 6 | Month 7 | Month 8 | Month 9 | Month 10 | |
| Task A | $ 75 | $ 125 | $ 200 | $ 50 | | | | | | | $ 450 |
| Task B | | $ 125 | $ 100 | $ 50 | | | | | | | $ 275 |
| Task C | | $ 25 | $ 100 | $ 125 | $ 50 | | | | | | $ 300 |
| Task D | | | $ 50 | $ 75 | $ 100 | $ 75 | | | | | $ 300 |
| Task E | | | | $ 50 | $ 100 | $ 100 | $ 50 | | | | $ 300 |
| Task F | | | | | $ 25 | $ 100 | $ 100 | $ 50 | $ 25 | | $ 300 |
| Task G | | | | | | $ 100 | $ 125 | $ 50 | $ 25 | | $ 300 |
| | $ 75 | $ 275 | $ 450 | $ 350 | $ 275 | $ 275 | $ 250 | $ 175 | $ 75 | $ 25 | $ 2,225 |
| | $ 75 | $ 350 | $ 800 | $ 1,150 | $ 1,425 | $ 1,700 | $ 1,950 | $ 2,125 | $ 2,200 | $ 2,225 | |

FIGURE 20B

Example of same Plan and 3 Different Progress Scenarios ($ data)

| | Scenario B - To Plan (report) | | | | | | | | | | |
|---|---|---|---|---|---|---|---|---|---|---|---|
| | Month 1 | Month 2 | Month 3 | Month 4 | Month 5 | Month 6 | Month 7 | Month 8 | Month 9 | Month 10 | |
| Task A | $ 100 | $ 100 | $ 100 | | | | | | | | $ 300 |
| Task B | | $ 100 | $ 100 | | | | | | | | $ 200 |
| Task C | | $ 50 | $ 100 | $ 100 | $ 50 | | | | | | $ 300 |
| Task D | | | $ 100 | $ 100 | $ 100 | | | | | | $ 300 |
| Task E | | | | $ 150 | $ 100 | $ 50 | | | | | $ 300 |
| Task F | | | | $ 50 | $ 100 | $ 100 | $ 50 | | | | $ 300 |
| Task G | | | | | | $ 100 | $ 100 | $ 100 | | | $ 300 |
| | $ 100 | $ 250 | $ 400 | $ 400 | $ 350 | $ 250 | $ 150 | $ 100 | | | $ 2,000 |
| | $ 100 | $ 350 | $ 750 | $ 1,150 | $ 1,500 | $ 1,750 | $ 1,900 | $ 2,000 | | | |

| | Scenario C – Better than Plan (report) | | | | | | | | | | |
|---|---|---|---|---|---|---|---|---|---|---|---|
| | Month 1 | Month 2 | Month 3 | Month 4 | Month 5 | Month 6 | Month 7 | Month 8 | Month 9 | Month 10 | |
| Task A | $ 100 | $ 100 | $ 50 | | | | | | | | $ 250 |
| Task B | | $ 100 | $ 50 | | | | | | | | $ 150 |
| Task C | | $ 50 | $ 125 | $ 100 | | | | | | | $ 275 |
| Task D | | $ 25 | $ 125 | $ 100 | $ 50 | | | | | | $ 300 |
| Task E | | | $ 25 | $ 150 | $ 125 | $ 50 | | | | | $ 350 |
| Task F | | | | $ 50 | $ 125 | $ 100 | $ 50 | | | | $ 325 |
| Task G | | | | | $ 50 | $ 100 | $ 100 | $ 100 | | | $ 350 |
| | $ 100 | $ 275 | $ 375 | $ 400 | $ 350 | $ 250 | $ 150 | $ 100 | | | $ 2,000 |
| | $ 100 | $ 375 | $ 750 | $ 1,150 | $ 1,500 | $ 1,750 | $ 1,900 | $ 2,000 | | | |

| | Scenario C – Better than Plan (w future tasks at plan) | | | | | | | | | | |
|---|---|---|---|---|---|---|---|---|---|---|---|
| | Month 1 | Month 2 | Month 3 | Month 4 | Month 5 | Month 6 | Month 7 | Month 8 | Month 9 | Month 10 | |
| Task A | $ 100 | $ 100 | $ 50 | | | | | | | | $ 250 |
| Task B | | $ 100 | $ 50 | | | | | | | | $ 150 |
| Task C | | $ 50 | $ 125 | $ 100 | | | | | | | $ 275 |
| Task D | | $ 25 | $ 125 | $ 100 | $ 50 | | | | | | $ 300 |
| Task E | | | $ 25 | $ 150 | $ 125 | | | | | | $ 300 |
| Task F | | | | $ 50 | $ 125 | $ 125 | | | | | $ 300 |
| Task G | | | | | $ 75 | $ 125 | $ 100 | | | | $ 300 |
| | $ 100 | $ 275 | $ 375 | $ 400 | $ 375 | $ 250 | $ 100 | | | | $ 1,875 |
| | $ 100 | $ 375 | $ 750 | $ 1,150 | $ 1,525 | $ 1,775 | $ 1,875 | | | | |

FIGURE 20B
CONTINUED

Estimate using Original Plan
- Simply does not allow future task estimates to change (fairly optimistic approach and simple to calculate)

Estimate using CPI and SPI
- Calculates EV (Earned Value) of work completed and applies that amount vs. the planned amount to the rest of the project (fairly pessimistic approach [assumes same performance in future as experienced to date] and more complicated to calculate

*Estimate using CPI and SPI Example for 3 Scenarios*

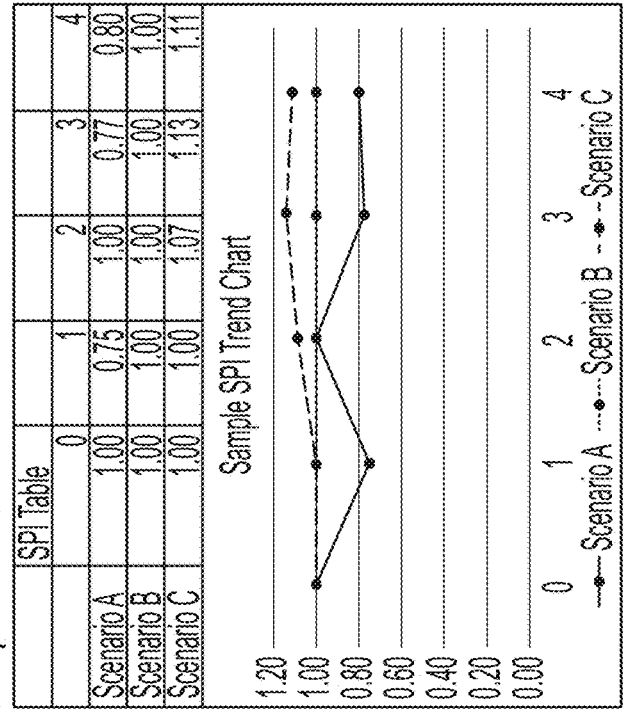

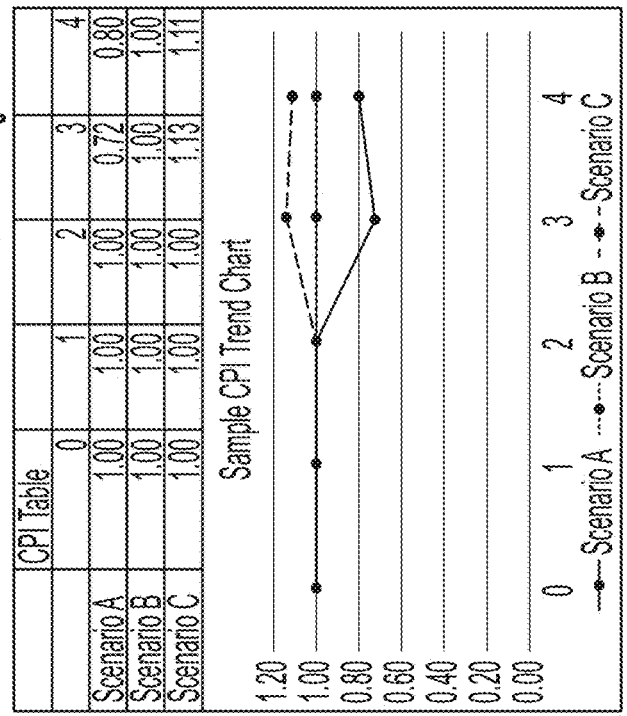

- Charts show % over or under Cost (CPI) and Budget (SPI) over PLC time.
- Schedule/SPI for $.
- Budget (CPI) for Schedule.
- Can be used for generation of project Schedule and Cost ratings.

FIGURE 20C

SOFTWARE PORTFOLIO MANAGEMENT SYSTEM AND METHOD

RELATED APPLICATIONS

This application claims the benefit under 35 USC 119(e) of U.S. Provisional Application No. 62/791,526, filed Jan. 11, 2019 and which is incorporated herein by reference.

FIELD

The disclosure relates generally to a software portfolio management system and in particular to a Software as a Service (SaaS) portfolio management system.

BACKGROUND

There is a need for portfolio and/or project management systems which embody on-line, real-time (or technically, near-real-time, due to the inherent processing system latencies and approvals associated with displaying certain data) hierarchical status reporting that is consistent for reporting critical project data and metrics. The ideal solution provides for the need of all stakeholders, as denoted below.

Executives (and portfolio managers) want:
visual data that instantly points to project concerns;
to review (and believe) confidence levels for meeting key project constraints (i.e. adherence to budgets and/or compliance with scheduled product deliveries) rather than a list of individual risks which is difficult to digest and derive overall project confidence;
to know that project development is aggressive (working toward "doing more with less"), yet still achievable—so that the organization can more effectively meet strategic goals and objectives (and operating plan commitments); and
all levels of employees to work at peak performance, with minimal waste, continuously improving, within a positive work environment.

Functional managers (especially in matrix organizations) want:
consistency between projects tools and techniques (providing an easier understanding of project metrics which affect them);
user-friendly tools and techniques (less personnel training);
real-time access to project status for all projects their group supports;
the ability to automatically roll-up resource supply/demand data, per project, by resource (e.g. human, equipment, facilities, etc.) type;
to ensure that they have a say in critical project decision-making that they have a vested interest in;
to not be surprised by an issue that they were not informed about in a timely manner;
collect and access data to support more accurate estimating of project support costs and task-level commitments; and
more lean processes (taking out the waste promotes greater efficiency).

Project managers want:
to employ tools and techniques which are appropriate "best practices" for their particular projects, as long as they are easy to use by themselves and their key project leads;
to make commitments that can be met, yet are still aggressive;
to automatically create status updates from data used by the team (i.e. be lean);
to control product requirements and changes, and ensure that all key stakeholders are appropriately informed of change recommendations and decisions;
to get the best performance from function organizations supporting the project (via project status visibility within the system versus via escalation);
to not have to set up or have as many meetings;
to not worry about managing project data storage; and
to know that organizational executives and managers truly understand project risks (via % confidence) to prevent stakeholders from having unfounded expectations and to get assistance (as need) for the barriers for success to be visible and appropriately acted upon.

Team members want:
to use systems, tools and techniques that are easy to use;
to have a way of making sure that their manager is automatically notified of project-related issues without being surprised;
to know that their expectations are being met via agreed to hand-shakes from those who provide them information, dates, etc.;
to not have to attend so many meetings which do not affect them;
to ensure that they are involved in meetings/activities which affect their efforts; and
to get the appropriate recognition that they deserve for performing their task as expected.

Thus, it is desirable to provide a software portfolio management system and method that provides each of the needs for each of the stakeholders and it is to this end that the disclosure is directed. Most large organizations have meticulously documented Policies and Procedures that all business segments are to adhere to, but Portfolio/Program/Project governance (e.g. reporting guidelines/formats/content/cadence, rating scales [e.g. Red/Yellow/Green scales and criteria], management Tools & Techniques, Roles & Responsibilities, data accuracy and objectivity, etc.) tend to be inconstant and vary—making oversight more difficult, and the costs of doing business more expensive. Further, Project Team members (i.e. those who typically need to coordinate/communicate their activities with several stakeholders) tend to use different methodologies to do so (some good and some not so good) which tends to be less than effective (e.g. create more work and rework and lead to untimely/costly change decisions). This is all exasperated in large Matrix organizational structures where Functional Managers (who dole out people to Projects) have to try to keep up with all the Projects being supported, whereby each Project Manager tends to do things differently. The trend has been to go to a Project Lifecycle Management (PLM) of some sort to solve for the resultant inconsistencies and inefficiencies—many of which are "Home grown" (i.e. built by the organization's IT [Information Technology] system employees) and limited due to IT staff technical limitations. Merchant supplier PLMs are not necessarily Portfolio Management Systems—which opens the door to a fully integrated SaaS Portfolio Management System (SPM System) designed by experts, with new innovations (i.e. Tools, Wizards, Gamification, Data Storage, Machine Learning, etc.) that simplifies implementation and ensures consistency and that best practices are employed. This latter system is the subject of this Patent, and unlike other alternatives, enables near-real-time updating of Project dashboards using complimentary innovations like the TriCoBi method of Modelling and Simulation and Wizards for ease of use—providing for all the needs of the various groups affected.

BRIEF DESCRIPTION OF THE DRAWINGS

So that the manner in which the exemplary embodiments of the disclosure are attained and can be understood in detail, a more particular description of the system and method, briefly summarized above, may be had by reference to the embodiments thereof which are illustrated in the appended drawings. It is to be appreciated that certain well-known processes are not discussed herein in order to not obscure the disclosure.

FIG. 2B compares the DCMA metric to the chrono sub-wozard that is part of the SPM system;

FIG. 2C is a chart of the sub-wizards, including the Chrono Wizard that are part of the SMP system;

FIGS. 5A-5C illustrate the SPM System Spider or Radar diagram and Status Update chart creation and updating process;

FIGS. 9A and 9B illustrate an exemplary Portfolio Project Dashboards Page and a subordinate Project Home Page that both can be interrogated (e.g. drilled down into more detailed subordinate data) by those with access rights;

FIG. 17 Illustrates an Authentication process within the SPM System process;

FIGS. 20A-C illustrates methodologies for generating project EVM metrics; and

DETAILED DESCRIPTION OF ONE OR MORE EMBODIMENTS

Figure 1A:
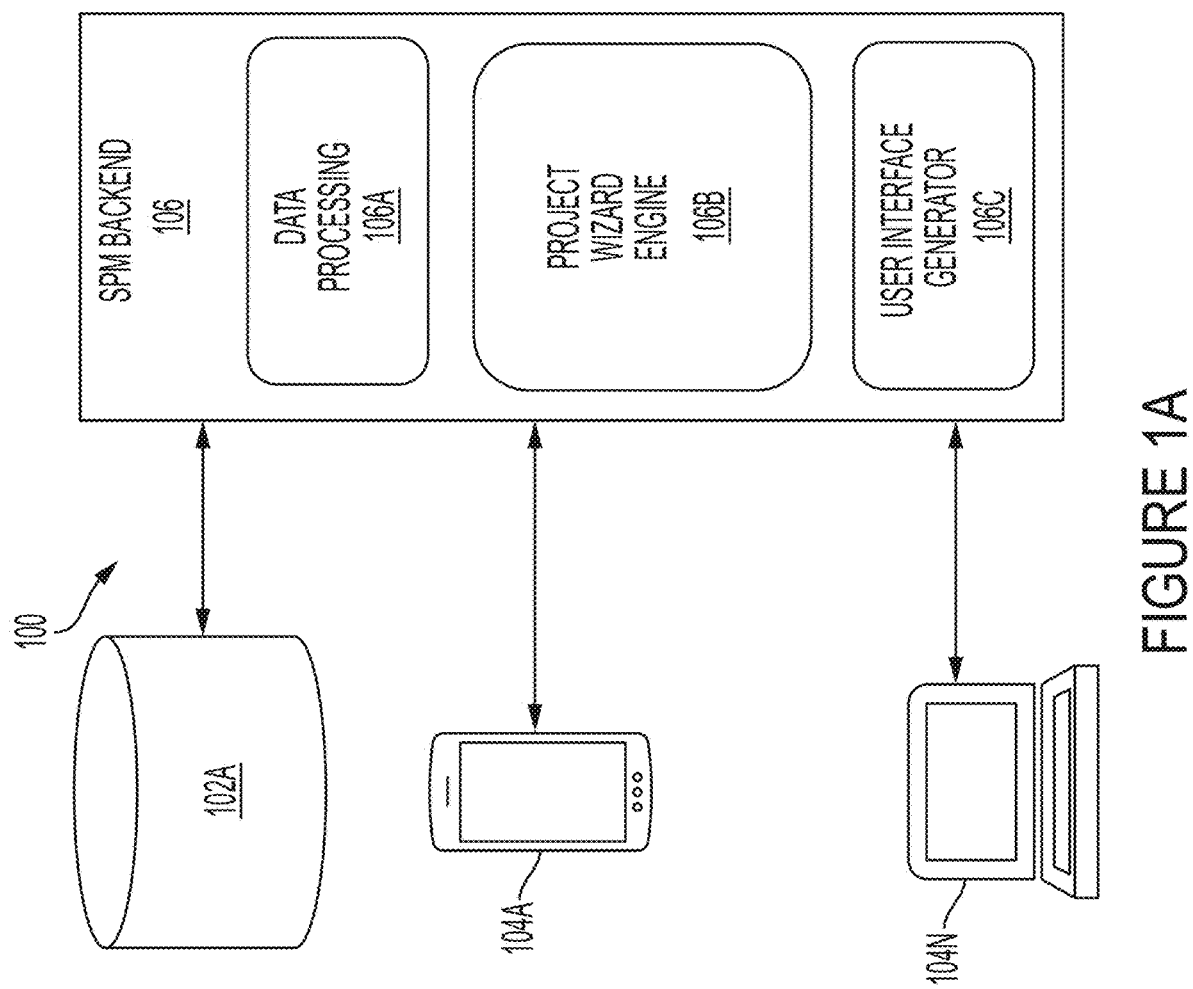
FIG. 1A illustrates an example of a high level architecture of a software portfolio management system.

The disclosure is particularly applicable to a software portfolio management system (SPM) implemented using a software as a service architecture using to manage a risk-adjusted IMS and it is in this context that the disclosure will be described. It will be appreciated, however, that the system and method has greater utility since the system and method may be implemented using alternative deliverable software package methods. The SPM System is the only such system in existence that can satisfy all the desires and needs of every group of stakeholders described in the background. It's unique capabilities (as well as those of the Project Wizard) come from the knowledge embedded into the system and the added bonus of being the only system with access to the TriCoBi™ modelling and simulation methodology. A risk-adjusted integrated master schedule (IMS) is a known IMS with a plurality of tasks that includes various risks included in the IMS as described in more detail below.

The SPM System can reside in the internet (cloud) as software code, within a dedicated intranet server or within a local user's computer. The SPM System can be accessed directly through a user link (icon or PC command) or via a log-in and/or authentication screen. Access rights can be set up universally the same for users within an organization or could vary for different types of users. The SPM System allows users (based on access rights) to: view data; send messages to other users via system alerts and/or e-mails and receive messages/alerts from other SPM System users; input data; create and update project plans; establish and change organizational governance guidelines; and approve, conditionally approve or reject decisions. The SPM System may (or may not) require that the different users install other application programs to facilitate the performance of certain functions (e.g., running the Project Wizard, performing data analytics, etc.). The unique and proprietary embodiments of the SPM System are: the breadth of functionality which enables all aspects of project team communication, monitoring, controlling and reporting to be conducted within the SPM System; the customizable near-real-time and unique project status updates to be available to the approved user base; the logical relational database for organization, storage and retrieval of all present and past data; the incorporation of gamification concepts whereby project information (e.g. plans, update statuses, etc.) are scored and project recognition is awarded (e.g. "shields", such as Gold, Silver, Bronze, "badges", merit points, status ratings, etc.) and displayed, per project; portfolio (i.e. groupings of projects) views (i.e. graphics) are provided for quick and easy status update viewing and drill-down of key project data; the efficient analytical machine learning recommendations for portfolio, program and project performance optimization; etc.

The Project Wizard software resides within the SPM System and may access one or more other complementary software applications to perform subsystem functions. The Project Wizard is comprised of sub-Wizards which are available to the individual user or all authorized organizational users. This Project Wizard application facilitates the development, standardization, baselining, statusing and updating of detailed project plans, and facilitates the future development of additional sub-Wizards that build off of it. Users are provided the option of: starting a plan from the beginning; importing an IMS (Integrated Master Schedule) from a complimentary application program; or importing a prior project plan version from a stored file.

FIG. 2C has a table that shows the various sub-wizards, the function of each sub-wizard and the activation method for each sub-wizard. The Project Wizard steps the user through the sequential process of developing and/or updating a project plan that conforms to a set of "best practices" Expert System rules that enable project plans to be accessed for overall project cost and/or schedule risk (or the inverse, which is referred to as the percent (%) confidence). As the project plan is developed or updated the Project Wizard enables each project task duration to be represented as a probability distribution of durations or a single discrete duration. The same process may be performed for project resources (e.g. man-hours, etc.) and costs. These distributions can serve to define project risks (threats) and opportunities to be included in a project Risk Register and Risk Matrix, and to enable the determination of project health metrics (e.g., schedule, cost, resource, and/or overall risk ratings). After a project plan is "baselined" (i.e. the plan is approved and set as the performance benchmark), as the project progresses and actual performance information becomes available, the project plan and all associated project metrics are instantly updated via this Project Wizard and/or the plan structure is updated via the Project Wizard. Other unique and proprietary embodiments of the Project Wizard are: % confidence numbers are created using proprietary modelling and simulation software applications which use Monte Carlo and/or TriCoB™ methods which perform in a fraction of the time that other conventional "brute force" Monte Carlo based alternative systems perform; the fact that the results support development of near-real-time schedule Gantt charts based on % confidence chosen; new processes for planning and updating "Agile" and "Incremental" product development process methodologies using IMS and modelling and simulation methods; new processes for enabling a combination of product development processes (Waterfall, Agile and Incremental) to be integrated into a project plan; the ability to roll-up subordinate (or "child") schedules into "parent" (or master) schedules via task probability distribution functions; and the ability to instantly change an entire IMS Gantt chart schedule to one with a different overall % confidence between 0% and 100%. In one example, the child schedule/IMS may be for a supply chain of the parent IMS.

FIG. 1A illustrates an example of an implementation of a software portfolio management system 100 that may be implemented using a software as a service architecture but may be implemented using alternative deliverable software systems and methods. In the data analytics industry to which this system and method may be used, the disclosed portfolio management method and processes are unconventional, not routine and not well understood in the industry as disclosed herein since the existing systems and methods are unable to solve the technical problem described above and achieve the results of the disclosed system. At the highest level, the SPM System 100 may comprise a Project Wizard 106B, a multi-faceted PC-based user interface 106C, and an Internet Cloud location 106A for user authentication, communications between users, data processing, data analytics, report generation and database storage.

The system 100 that implements the novel process may include one or more known storage device 102A, such as a software or hardware database, that store data about the project and/or the analysis that is used an input to the portfolio management disclosed below. The system 100 may further include one or more computing devices 104, such as a smartphone 104A, . . . , and a desktop or laptop computer 104N, that may be used by a user, for example, to access the system, interact with the system, submit data about a project or analysis or receive a user interface display from the system with the results of the novel simulation/analysis performed by the system as described below. Each computing device 104 may be a processor-based device with least memory and a display and thus may be the smartphone device 104A, such as an Apple iPhone device or Android operating system based device, a terminal device, the laptop computer device 104N or any known known or yet to be developed computing device that can access the system as described below. The system may also include a backend system 106 wherein the storage devices 102A and computing devices 104 may connect to the backend system 106 over one or more wireless or wired networks (or a combination thereof). While the systems 102A, 104 A, 104N and 106 shown in FIG. 1 are known computer systems, storage and networks, the backend system 106 stores and a processor of the backend system 106 executes a plurality of lines of computer code and the processes performed by the systems 102A, 104 A, 104N and 106 with the plurality of lines of computer code (the simulation operation) are unconventional, not well understood and not routine and provide an ordered combination of processes that form an inventive concept to perform the simulation. It should be noted that the simulation process may also be implemented using hardware devices.

The backend system 106 may be implemented using one or more computing resources, such as blade servers, server computers, storage devices, web servers, application servers and the like that host and execute the plurality of lines of computer code that perform the novel and unconventional processes using the software as a service architecture. For example, the backend 106 may include the data processing element/component 106A (that may be implemented as a plurality of lines of computer code) that may be an Internet Cloud location for user authentication, communications between users, data processing, data analytics, report generation and database storage. The backend system 106 may further include the project wizard engine 106B (that may be implemented as a plurality of lines of computer code) that receives the data and performs the portfolio management processes described below and generates data about the portfolios based on the received data. The backend 106 may further comprise the user interface generator 106C (that may be implemented as a plurality of lines of computer code) that may generate the user interfaces (examples of which are shown in the figures) that conveys the portfolio management results to the computing devices 104 and/or to the storage device 102A.

Embodiments of the disclosure facilitate the innovative functionality of a SaaS (Software as a Service) portfolio management system (SPM System), or other type of system embodiment using alternative deliverable software package methods—herein referred to as the SPM System. And integral to this SPM System, yet also considered an independent system, a software Project Wizard (the RTC Wizard being the preferred embodiment but applying to any other such embodiment)—herein referred to as the Project Wizard.

Figure 1B:
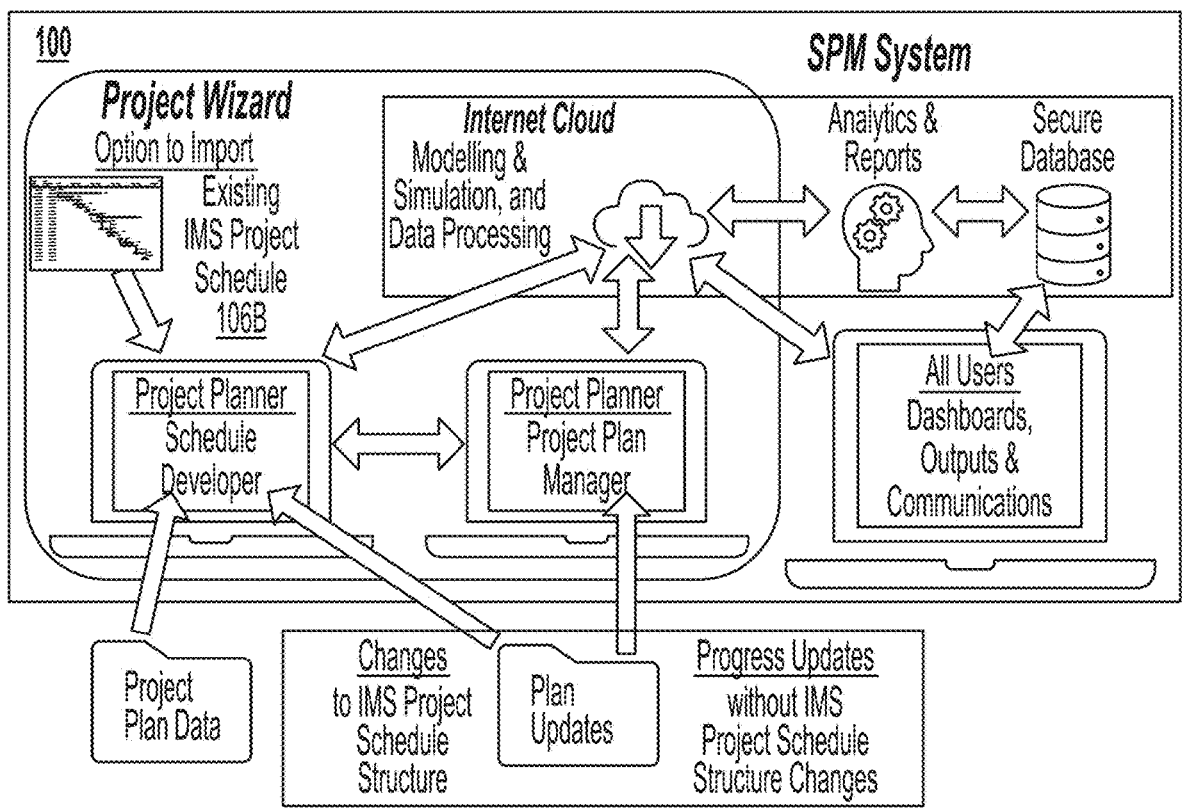
FIG. 1B illustrates the various elements of the SPM (SaaS Portfolio Management) System, as well as how they interrelate to each other and the users.
Figure 1B:
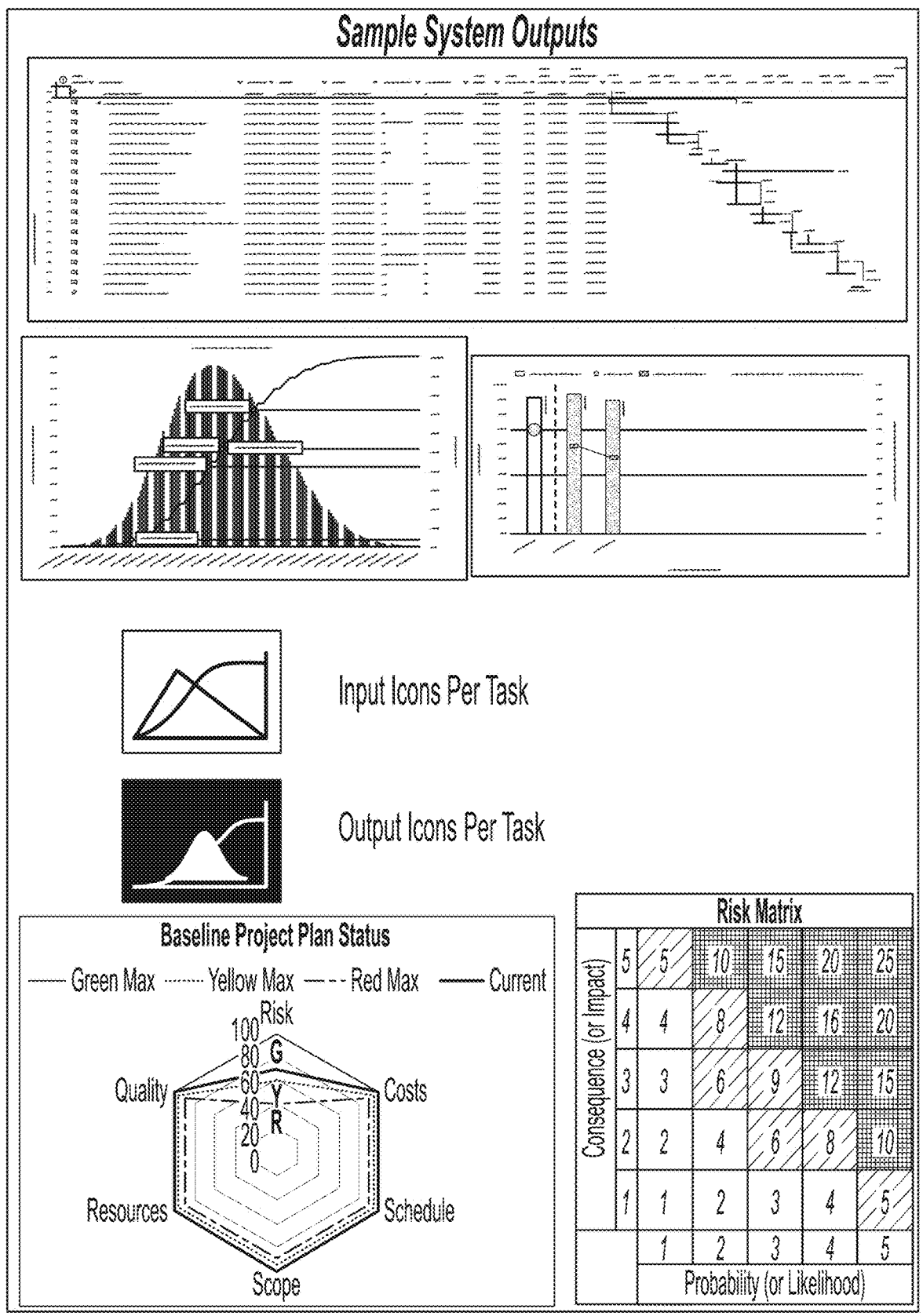

FIG. 1B illustrates the various elements of the SPM (SaaS Portfolio Management) System) 100, as well as how they inter-relate to each other and the users and the project wizard 106B that is part of the SPM 100. In FIG. 1B, the arrows show the direction of potential data and information flow between the various system elements and users. What is not shown is the user authentication/log-on and System Administrative functions that are well known and therefore not illustrated. As shown in FIG. 1B, the system 100 may receive inputs/changes from different sources including an existing IMS project schedule, from project plan data or from plan updates that may include changes to the IMS project schedule structure or progress updates without IMS project schedule structure changes. The latter type of update is typically provided when issues arise and major changes are necessary to attempt to get back on track. The former change is simply an update of the work completed since the Project start date or previous update date.

A number of sample outputs/user interfaces of the SPM System 100 are shown that are described in more detail below. One embodiment of the SPM system 100 may use cloud resources for modeling, simulation and data processing, analytics and reports and secure data storage. The SPM System accommodates several user types, each with varying access rights. For example, Project Planners (e.g. Project Managers, Team Leads, Schedulers, etc.) have access rights to use the Project Wizard (described in more detail, in reference to FIG. 2). All users having system access rights include Project Planners and other Stakeholders (e.g. Executives, Portfolio Managers, Functional Managers, and At-large Team Members). These other Stakeholders are able to access the Project Dashboard, receive Alerts and send Messages, provide project inputs (usually limited based on function the individual performs), customize governance guidelines, create Portfolios, sub-Portfolios, Project Charters, etc. For example, a Team Lead (who oversees a Functional activity like Mechanical Engineering) may have the ability to update (provide progress inputs to) the related tasks worked on by his/her team members, while a Functional Manager for that Team Lead might wish to approve those updates first, and the Project Manager is then able to approve all Team Lead inputs and provide his/her own. Project Planners typically support Project Managers by coordinating the collection of the inputs and making recommended plan changes (i.e. extending tasks, changing requirements, trying to get more resources from Functional Managers to expedite tasks, etc.) for the Project Manager to review and ultimately approve. A System Administrator is offered the most access rights as well (excluding providing project inputs in support of project work). Some unique aspects of this SPM System 100, relative to report generation, data interrogation and processing and output report usage are listed below:

Drill-down from Project Dashboards to Project Home Page and more detailed under-lying project data to gain more insight into project team performance Processing What-ifs on data within the database for determining Project Schedule changes to implement when issues arise Storing and reporting complete Project Updates in the Secure Database for both collecting trend data and for determining other Earlier Warning Indicators (i.e. SPIs [Schedule Performance Indices] that can extrapolate completion date to alert Managers of potential pending issues [i.e. new risks])

Alerting stakeholders of changes and necessary actions to take to resolve or pro-actively prevent issues from derailing the Project Automatic generation of Project Update, with live Drill-down capability for Stakeholder on-line review of the latest Project performance data Automatically rolling up data for use in planning activities (e.g. Functional Managers can obtain views of their group's activities to all projects supported, etc.)

Data-mining in support of analyses and machine learning, i.e. collecting actual data (time it took and how many man-hours of effort and/or how much it costed) for use in creating new estimates for future projects.

Figure 2A:
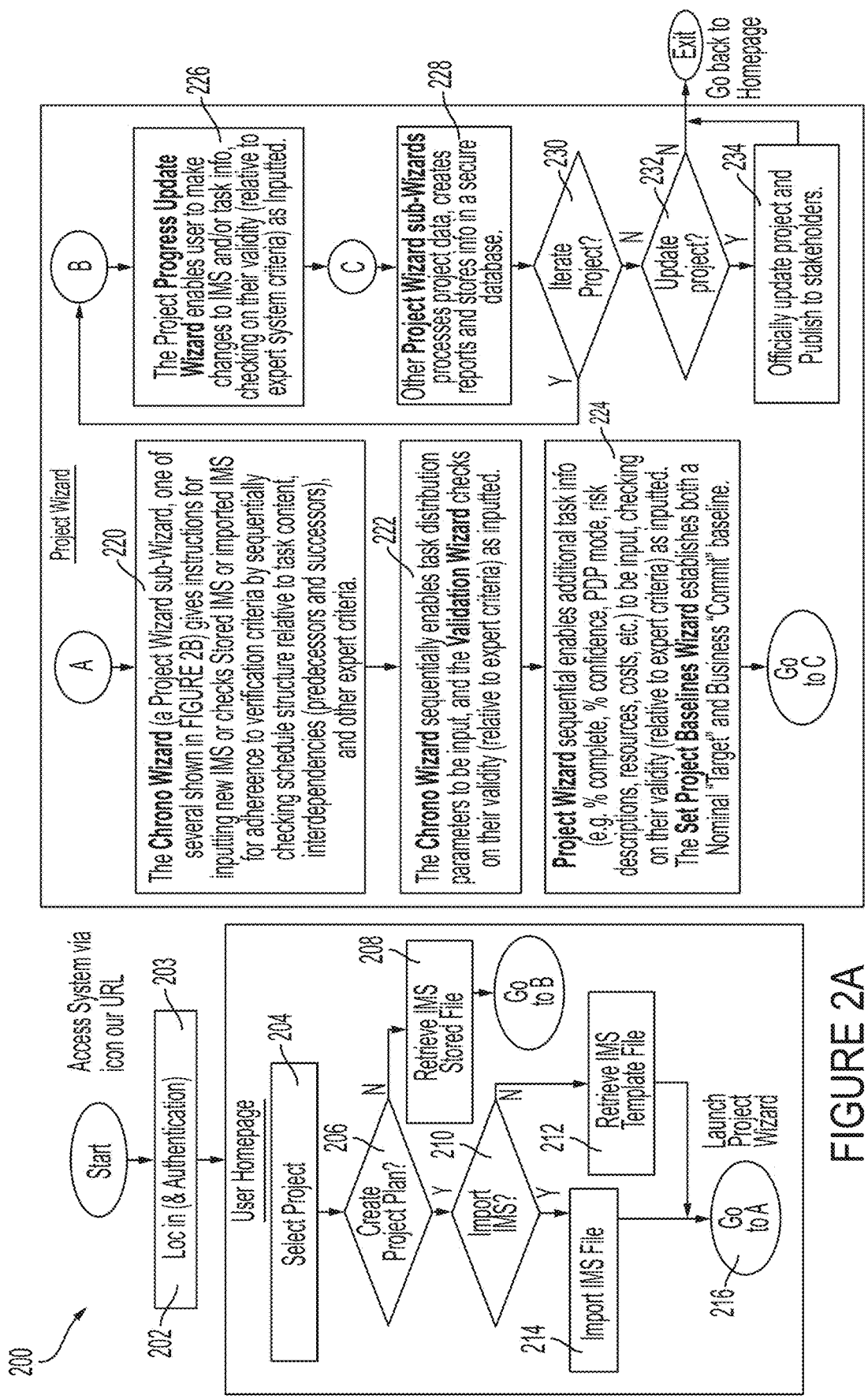
FIG. 2A is a flow diagram of the general SPM System Project Wizard process.

FIG. 2A illustrates a flow diagram of the SPM System Project Wizard process 200. This process starts with the user accessing the SPM System via an Icon or URL and this action brings the user to a Log-in page which manages user access to the system via a known internet authentication process (202). Once a user is authenticated, they are taken to their "home page" (203) which is displayed with all information and command features per the user access rights (established beforehand by the System Administrator). In other words, each user's home page is customized to the user based on that user's access rights as described above. The Project Wizard (processes 220-234 in FIG. 2A) is activated by any action (or command) that requires access to Project Wizard's functionality (e.g., creating a new project plan from a template, importing an existing IMS from a complementary application program, retrieving an existing project plan from the SPM System Internet Cloud, etc.). As shown in FIG. 2A, the use may select a project (204) and retrieve an stored IMS file (208) if a no new project plan is created (206) and activate the project wizard starting at process 226. If a new project plan is created, the method determines if an IMS is being imported (210). If an IMS is not being imported, then the method retrieves an IMS template file (212) and activates the project wizard starting at process 220. This template is referred to as a "Blank Project" which establishes the key settings and default conditions, sets up the information columns and their order, and provides the Start and End milestones for the project. Alternatively, an IMS file is imported (214) and activates the project wizard starting at process 220.

Whether a user imports a file from a complementary application program or retrieve an existing project plan from the SPM System, the Project Wizard is launched and the file is systematically interrogated to determine if there are any non-conformities (relative to the expert system verification criteria) (220). This is a unique and novel capability that ensures the resultant IMS will meet all standards established to perform SRA (Schedule Risk Analysis) modelling and simulation, and EVM (Earned Value Management). The file may be checked for non-conformities by sequentially checking schedule structure relative to task content, interdependencies (predecessors and successors), and other expert criteria (information embedded into the wizard which makes it an Expert System). For example, the criteria may include: (1) setting up an IMS in a way which ensures that the SRA (Schedule Risk Analysis) Modelling and Simulation process (using Monte Carlo methods, TriCoBi™ methods, etc.) yields valid % confidence 'S' Curve (i.e., cumulative probability function) results; (2) setting up EVM (Earned Value Management) data to produce valid CPIs (Cost Performance Indices) and SPIs (Schedule Performance Indices); etc.

The Project Wizard sequentially enables (222) task duration distribution parameters to be input (which are potentially different depending on the distribution used, such as triangular, beta, binomial, etc.), checking on their validity (relative to expert criteria) as inputted, and offering up advise on how to resolve the conflict. The Project Wizard then sequential enables additional task info (e.g. % complete, % confidence, PDP mode, risk descriptions, resources, costs, etc.) to be input, checking on their validity (relative to expert criteria) as inputted, and offering up advise on how to resolve the conflict, and enabling real-time re-calculations to observe interim project plan results. The PDP (Product Development Process) prompts the PDP mode (e.g., Waterfall or Predictive, Incremental or Iterative, Agile or Adaptive, etc.) so that the various PDP processes can be uniquely structured per the expert system (224) for each and can be effectively co-mingled within a single project plan. The project plan can then be processed (e.g. structure validated, simulation run to determine cost and/or schedule % Confidence data, etc.) and iterated one or more times. Eventually the user completes his or her project planning task by exiting (with or without officially updating the file which is sometimes prevented due to user access rights).

When the IMS file is imported, the Project Wizard may process the project data, create reports and stores the information in the secure database (228). The final action is alerting/notifying all project stakeholders that the project has been officially updated (234), if that path was pursued. It should be noted that the DoD's (Department of Defense's) DCMA (Defense Contract Management Agency) established a commission which published (in October 2012) a document entitled "Earned Value Management Systems (EVMS) Program Analysis Pamphlet (PAP) DCMA-EA PAM 200.1" which includes (starting on page 28) "4.0 14 Point Schedule Metrics for IMS (Project/Open Plan, etc.) Analysis" which was "developed to identify potential problem areas with contractor's IMS", and which the subject Project Wizard is consistent with—establishing this process (within this underlying Method) as a technically valid method that has wide-spread application and acceptance. FIG. 2B shows the 14 point DCMA metric and compares each of the metric points to the features/functions of the Chrono Wizard that is part of the SPM system. As shown in FIG. 2B, the Chrono Wizard and thus the SPM system are compatible with the DMCA 14 point metric.

If a retrieved IMS file is used, the Project Wizard may enable the user to make changes in the IMS (226), the Project Wizard may process the project data, create reports and stores the information in the secure database (228). The final action is alerting/notifying all project stakeholders that the project has been officially updated (234), if that path was pursued. As shown in FIG. 2, the user may iterate the project and then return to enabling the user to make changes to the IMS (226).

If a user is simply updating an existing project plan (e.g., implementing changes to structure and/or distributions, and/or updating the status of one or more tasks) the wizard will enable them to make changes to IMS and/or task Info, checking on their validity (relative to expert system criteria) (226) as Inputted, and offering up advise on how to resolve the conflicts that arise, if necessary. The users then follow the same iterating and updating process as previously stated. The SPM process in FIG. 2A provides the Chrono wizard that has the function shown in FIG. 2C and above and is compatible with the DCMA metric as shown in FIG. 2B and no known system or method has that compatibility so that the SMP system is novel and unconventional. Furthermore, unlike a prior art system, such as Microsoft® Project, that does not store past progress data since it writes over that data, the SPM system automatically saves the Baseline and past Project Progress Update Data in the store 102A as shown in FIG. 1A (that may be a storage system in the cloud) to enable the development of Trend charts and Earned Value Management metrics. No known system or method performs these functions so that the SMP system is novel and unconventional.

FIG. 2C shows the various sub-wizards that are part of the project wizard portion of the SMP system 100. The chart in FIG. 2C shows the name of each sub-wizard, the functions and each sub-wizard and how that particular sub-wizard is activated in the SPM system 100. The sub-wizards may include a blank project wizard that sets up a new project for a user with essential start and end bounds and pre-establishes Project Settings which enable a Valid Project set-up. The sub-wizards also may include a chrono wizard that incrementally helps Users set up Predecessor/Successor Task Relationships, enables establishment of valid Interdependencies between Tasks, incrementally helps Users to establish 3-point duration estimates per Task and provides drop-down menus for Task Opportunity and Risk Descriptions.

The system may also include a validation wizard that checks the entire Project structure (for the current project) to ensure that construction criteria for appropriate SRA (Schedule Risk Analysis) and EVM (Earned Value Measurement) is supported, provides help and options for fixing issues identified and is activated automatically when the system identifies the need for simulation updates (due to changes) and use of the Chrono Tab Button. The SPM system may also have a TriCoBi simulation wizard that collects and sends all the data to the Cloud for SRA and Earned Schedule computations and graphic output generation, automatically invokes the Validation Wizard if changes made, formats the Simulation Data for multiple Gantt charts in local MS Project file and is activated by the Chrono Tab Button or whenever a RED Flag in the Chrono Tab is selected.

The SPM system may also have a Gantt Chart View Wizard that creates the database for multiple (i.e. 4 or more) IMS Gantt charts (at different 'S' Curve % Confidence values) and sends the charts to a local MS Project file, enables the different Gantt charts to be displayed in the local MS Project file when the Chrono Tab selection is made and is automatically activated for all selected Autoscheduled Milestones in the IMS Structure. The SPM system may also have a Set Project Baseline Wizard that automatically established IMS (Integrated Master Schedule) Baselines (both a "Nominal" task duration baseline for the traditional Critical Path and a Business task duration baseline established for the Team Commitment), sets up the ES (Earned Schedule) Baseline data for use in generating ES metrics automatically, provides a warning to user to ensure Sponsor approval is obtained first, enables Selection of either Baseline in the Gantt Chart Views—the default for Nominal and Business Gantts are the Nominal and Business Baselines and automatically disables "Defaults" from being changed after the Baseline is set—this prevents inappropriate changes and is activated Chrono Tab Buttons—one for setting the baselines, and the other for selecting the baseline in Gantt Views.

The SPM system may also have a Project Progress Update Wizard that walks the user through Project progress updating that enables automatic generation of new SRA and EVM outputs in which the user sets the Update date, are sequenced through updates of Tasks that were open during that time up to the update date, automatically changes 3-points for remaining durations, allows checking of data, previewing of update results, and officially publishing the update when ready to do so, ensures that the correct process if followed to make updating easy and is activated by the Chrono Tab Buttons, which are only available after the project plan has been "Baselined". The SPM system may also have a Probability Distribution Wizard that enables users to pick the appropriate Probability Distribution to use for the various Tasks, enables the Task distribution to be set as the Output distribution of a more complicated "Child" IMS by automatically linking the information within the SPM System, can also apply the same triangular distribution Ratios to all tasks as a "What If" and is activated by a "Default" setting and/or a communicating setting within the task definitions for "Child"/"Parent" linking of tasks.

The SPM system may also have a Multiple Gantt Chart Wizard that provides the different Gantt charts within the Chrono Tab. If a RED Flag is present, the Validation and Simulation will be automatically initiated to provide the Gantt chart representing the most current data, and if the IMS has a structure problem, will invoke the Validation Wizard to help resolve the issue(s) and is activated automatically. The SMP also has an SRA Output Wizard that is a cloud-based system that takes current inputs and converts those into Graphic Outputs for SRA, ES and other data as deemed necessary (i.e. SRA Tornado chart, Merge Bias charts, Trend charts, etc.), includes controls for knowing when Baselines are established and Updates are processed—and provides trend data by keeping track of past inputs and is automatically activated.

The SPM system may further include an Earned Schedule Output Wizard that takes Baseline and Update input data and establishes a data set that is used to process integrated trend charts with EVM performance indices and independent schedule estimations, passes the above data to the SRA Output Wizard and is automatically activated. The SPM system also has a Merge Bias Wizard that both quantifies the Merge Bias (i.e. extra schedule impact contributed to the SRA output as a result of the merging of overlapping parallel Tasks within the IMS network) and enables an innovative Gantt chart view that displays it graphically and is automatic, but the display is a Chrono Tab Button feature.

The SPM system also has a Probabilistic Branching Wizard that enables users to effortlessly insert Probabilistic branching into the IMS to enable SRA outputs which include the impacts of these potential schedule structure paths and is activated by the Chrono Tab Button. The SPM system also has Status Presentation Wizard that constructs the Chrono-Dash output data for eventually display to the Project/Program/Portfolio Stakeholder community with the ultimate output is graphics that displace the need for separate Project status update charts, and maximizes the use of objective project performance data and metrics, includes the generation of Shields/Badges that essentially represent the level of goodness in Project Planning and Execution Performance—a form of Gamification and is activated and available for users of the system who have access right to approve published project data.

The SPM system may also have a portion for tracking various project financials. The various project financials may include expenditures [e.g. planned, actual, estimated remaining expenditures], expenditure categories [e.g. direct labor, indirect labor, materials, capital, equipment, facilities, other direct costs], funding requirements, etc., with options of integrating directly or indirectly into the organizations ERP (Enterprise Resource Planning) system, or not.

Figure 3:
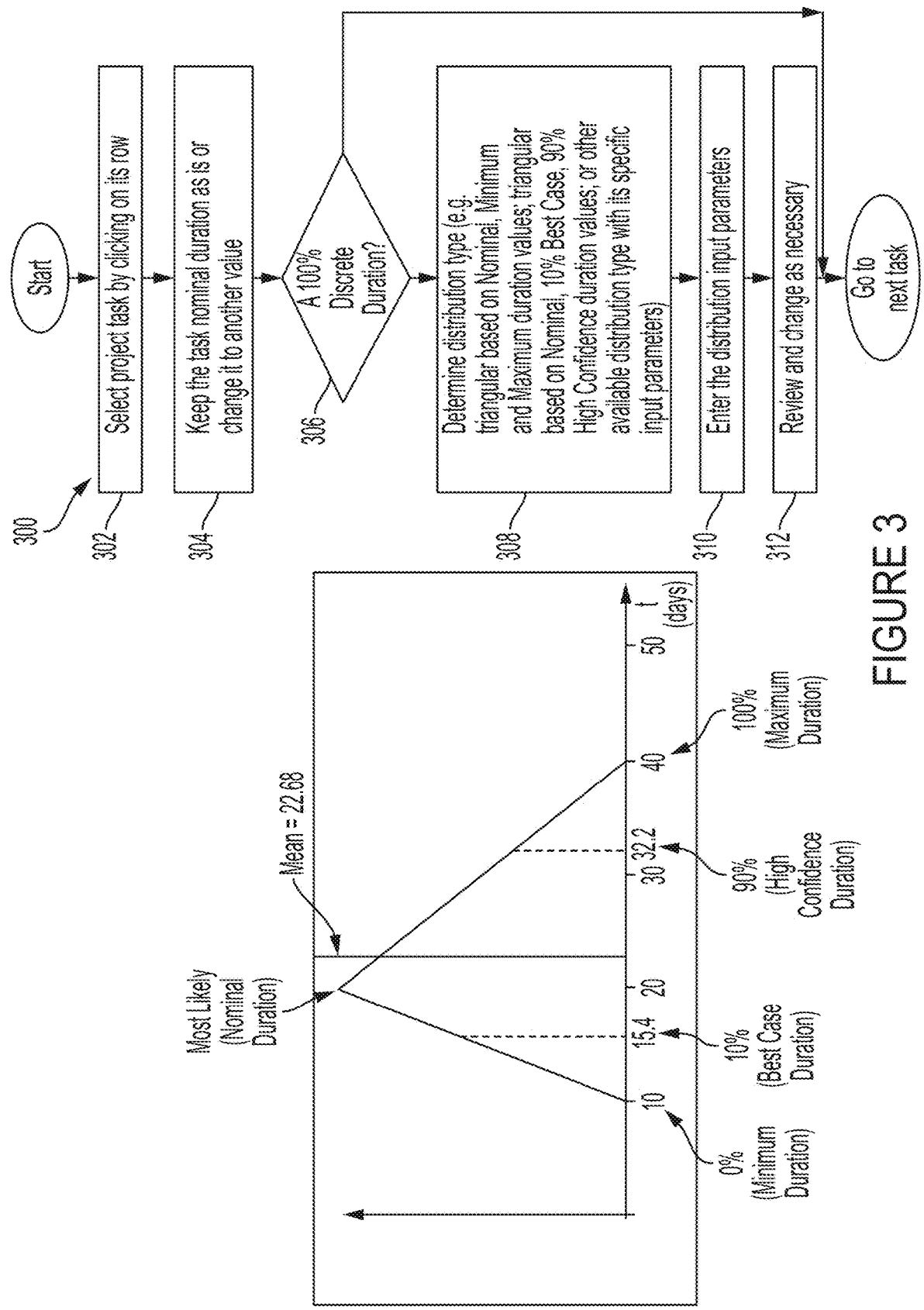
FIG. 3 depicts a process for developing an IMS project task duration probability distribution function using Triangular distributions.

FIG. 3 illustrates a process 300 (and provides a specific example) for developing an IMS project task duration probability distribution function. This figure shows the information pertinent to creating a triangular task distribution; either directly through the identification of the Nominal, Minimum and Maximum duration estimates or indirectly through the identification of the Nominal, Best Case and High Confidence duration estimates. Note that technically, every task with a non-zero duration has a duration probability distribution function associated with it—many are represented as a single (or 100% discrete) duration. The Project Wizard is provided Expert System data (example shown in FIG. 15) to assist project planners in determining those tasks which should be discrete durations and those which should be considered for non-discrete probability distribution functions. In the method, a user may select a project task (302) and allows the user to keep task nominal duration as is or change it to another value (304). The method determines if the duration of the project task is 100% discrete duration and goes to the next task if it is true. If the current project task is not 100% discrete duration, the method may determine the distribution type (e.g. triangular based on Nominal, Minimum and Maximum duration values; triangular based on Nominal, 10% Best Case, 90% High Confidence duration values; or other available distribution type with its specific input parameters) (308), have the user enter the distribution input parameters (310) and then have the user review and change as needed (312) and go onto the next task.

Figure 4A:
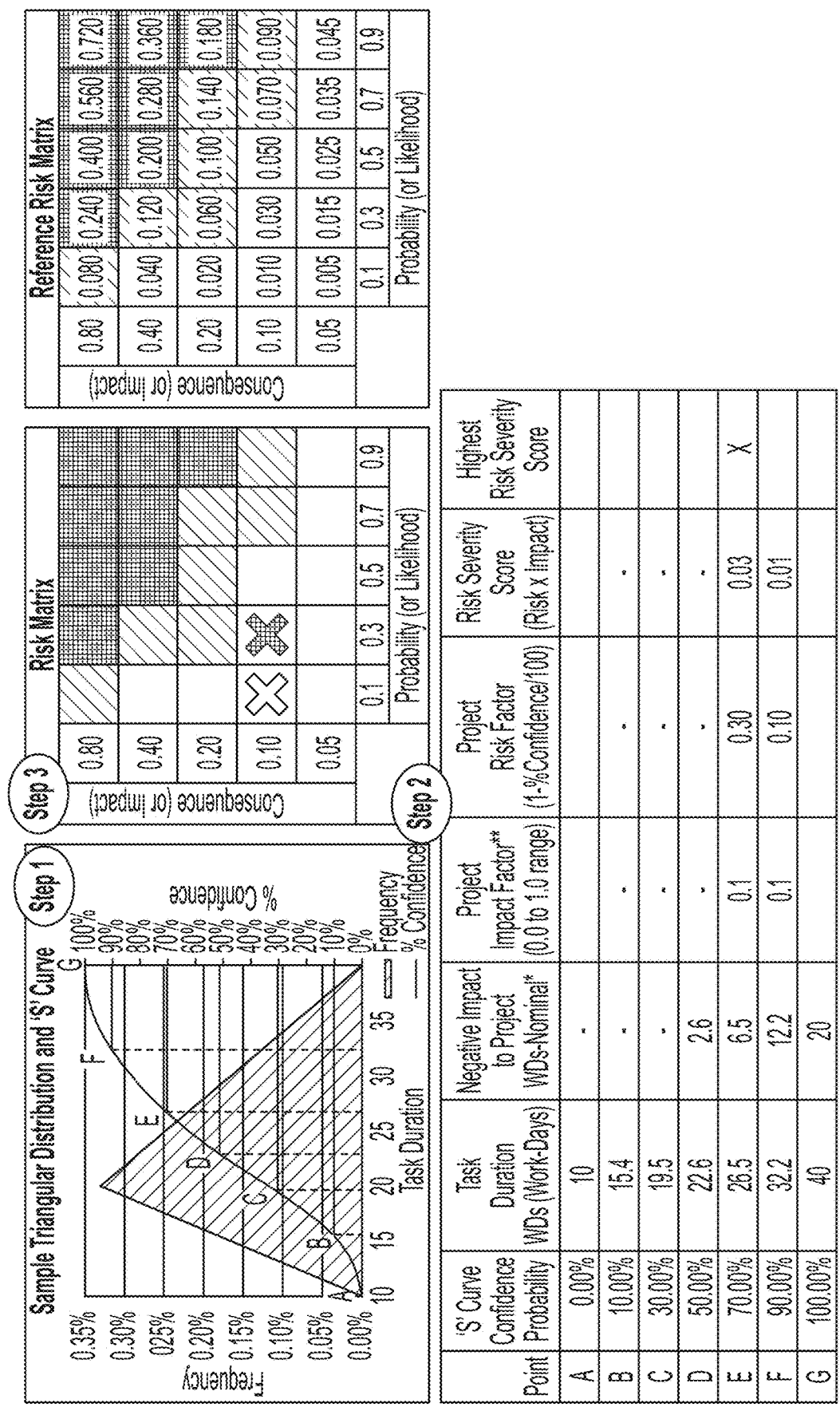
FIGS. 4A and 4B illustrate how the SPM System Project Wizard manages individual project risks, through the use of a notional task which has a schedule risk associated with it.
Figure 4B:
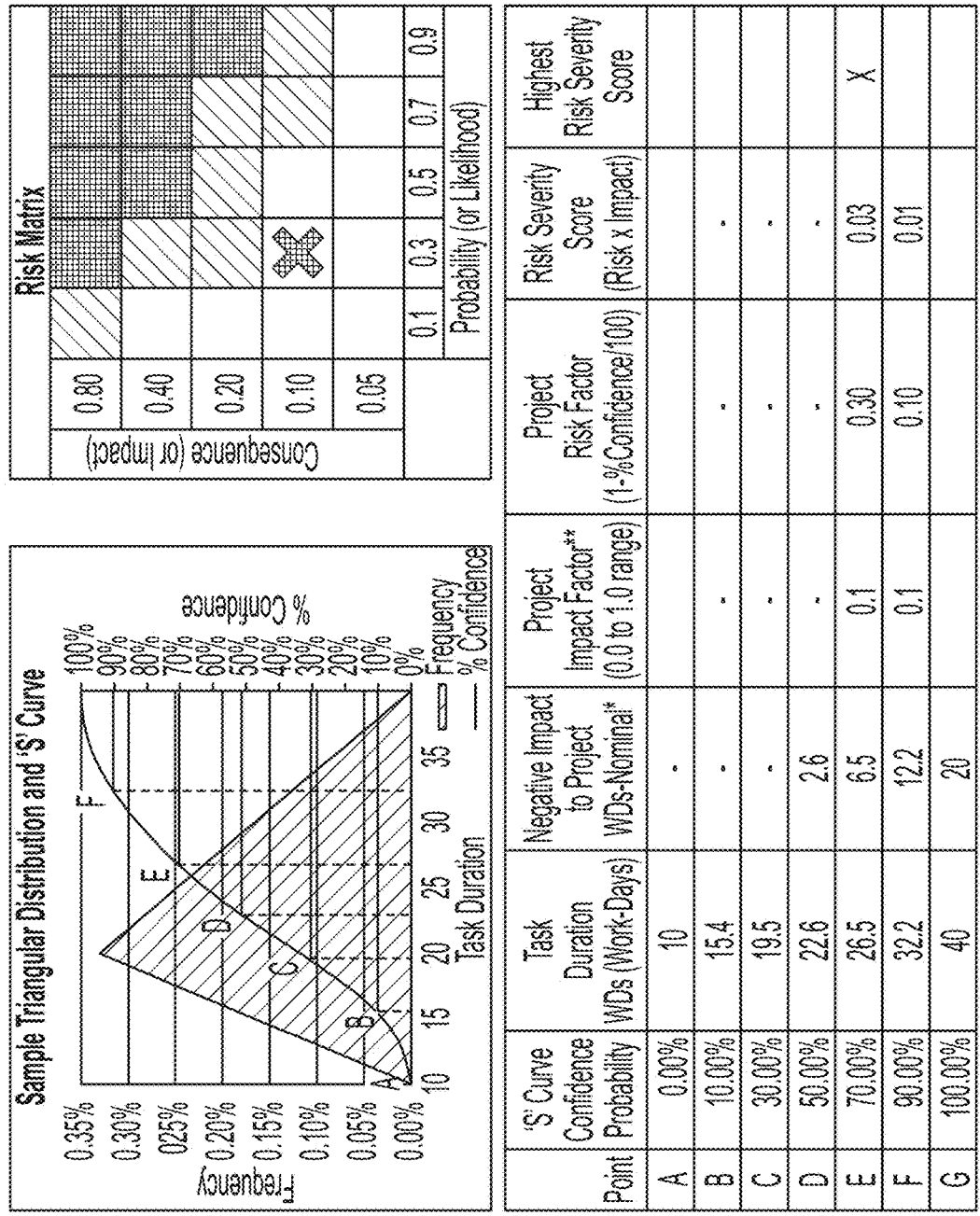

FIGS. 4A and 4B illustrate how the SPM System Project Wizard manages individual project risks, through the use of a notional task which has a schedule risk associated with the task. Through this example, the task duration distribution which (was previously established in the Project Wizard—Step 1) is automatically analyzed to derive an individual project risk entry for the Risk Matrix, and to support development of a risk description for entry into the project team's risk register. In this example it is presumed that the task itself is on the project IMS "critical path", thus any schedule impact to this task results in a direct project schedule impact of the same magnitude. If the task were not on the project critical path, the analysis of the impact would be determined by factoring in the number of work-days that the task is removed from the project critical path by appropriately accounting for the amount of total slack (or float) that the IMS application indicates for this particular task. The evaluation of all project individual task risks will also help determine the project risk rating (for status updates) that the SPM System can generate. Note that although this example focusses on the project risks (i.e. the right downward sloping side of the triangle used in this example) it can also do the same for the project opportunities (i.e. the left upward sloping side of the triangle used in this example). This example depicts a Variable Risk (one that has a continuous probability distribution function. Other risks (e.g. those with discrete discontinuous points) can also exist, and as such are handled in a similar way.

FIGS. 4A and 4B show how the Risk Severity score is determined. Points A through G (in both the Step 1 and Step 2 charts) are those which apply to S Curve confidence percentages (i.e. 0%, 10% . . . , 90% and 100%) and the Probability (or Likelihood) ratings on the x-axis of the matrix in Step 3 (which are converted to fractions by subtracting them from 100 and then dividing the Probabilities by 100). The Task Duration column in the Step 2 table is populated with information from the x-axis of the Step 1 figure, where the dashed lines from the S Curve intercept the x-axis. A "Negative Impact" applies to only those durations that are greater than the "nominal" task duration (i.e. the peak of the Step 1 triangle), so in this case only points D, E, F and G apply as indicated by the numbers in that column of the Step 2 table. The Project schedule "Consequence (or Impact)" is a relative number between 0.0 and 1.0, as shown on the y-axis of the Step 3 Matices—is relative to the total Project duration, which in this example is one calendar work-year, or 250 work-days. When you convert the "Negative Impacts" (which are in work-days) to the work-year you get the "Project Impact Factor" in the Step 2 table. So for this Step 1 Task there are two potential non-zero impact percentages—points E (the 70% Confidence, or 30% Risk which is a 0.3 Likelihood in the Step 3 Matrices) and F (the 90% Confidence, or 10% Risk which is a 0.1 Likelihood in the Step 3 Matrices). The most severe point is the one with the highest score in the Step 3 Reference Matrix, which is that derived from Point E so that is the point put on the matrix in FIG. 4B, and is considered the Item "A" Risk in the Step 6 Risk Register chart. Steps 4 and 5 are Metalanguage Statements that assist the User in determining the Risk Description to put into the Step 6 Risk Matrix.

Figure 5A:
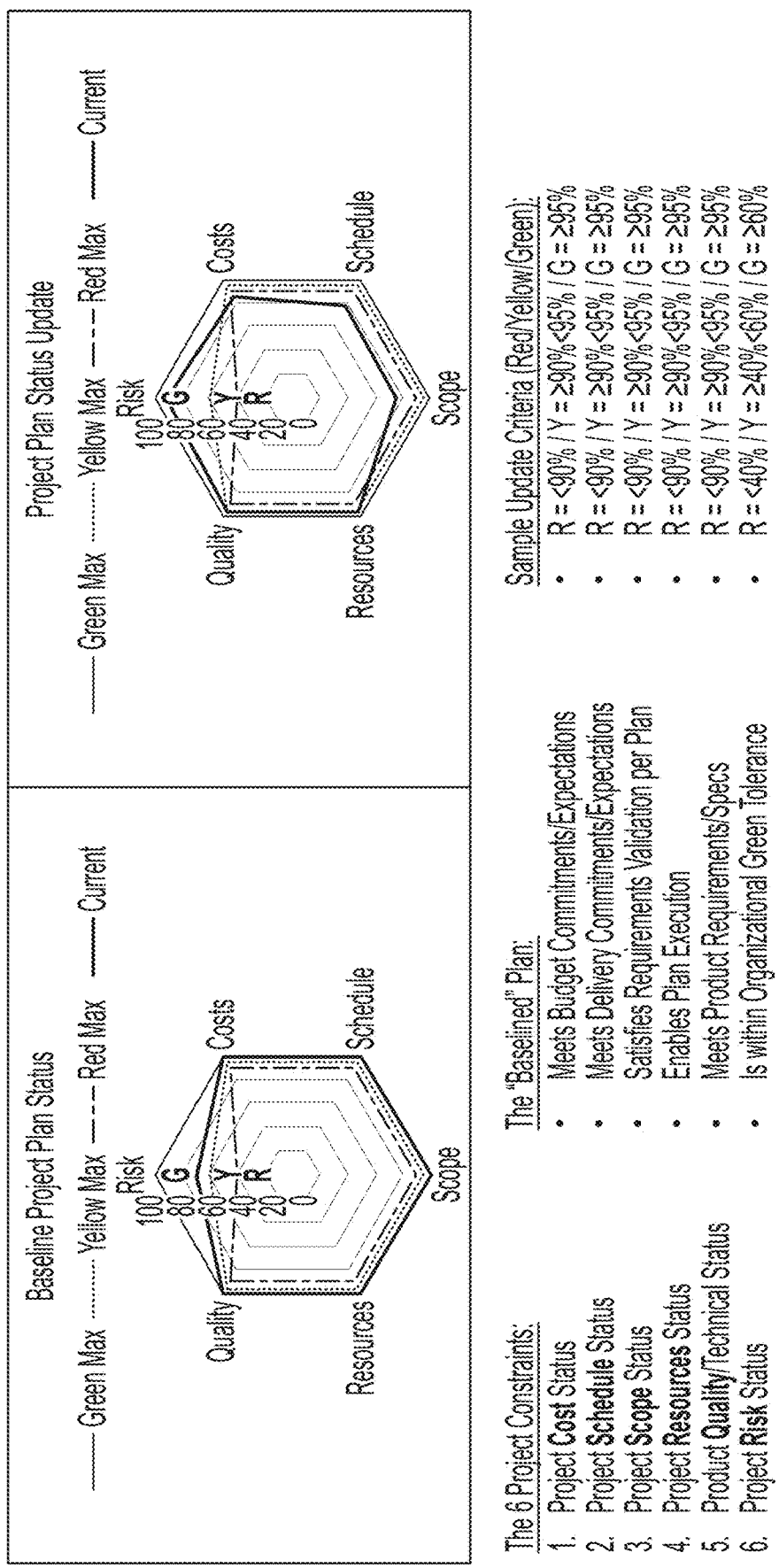

FIGS. 5A-5C illustrate the SPM System Spider diagram and Status Update chart creation and updating process. The Spider diagram can be created from both objective metrics and subjective inputs and provides a visual snap-shot of the current status of the 6 project constraints as listed in the lower left-hand corner of the page. The "Baseline" project plan expectation for each is provided in the lower center portion of the page and is represented by a Spider diagram in the upper left chart. Updates are rated based on Red/Yellow/Green zones (shown by the different solid and dotted lines shown in the legend) that are established in the SPM System per organizational governance and desires. A sample is shown in the lower right-hand table and an example update is shown in the upper right chart. Note that the criteria are fixed for both charts and that the "current" ratings are provided for each metric on both charts. These rating values are described in 5B, whereby a sample of "current" ratings are shown, and a list of how automated and manual updates are potentially arrived at are shown in the text on the right side of this page. Note that the ratings between FIGS. 5A and 5B are aligned, as they should be. The "Overall Project Health" rating is arrived at based on the number of G, Y and R ratings of the below metrics. FIG. 5C provides a look-up table for that determination. Note that this rating is depicted on the Project's Health Gauge described in FIG. 9. Also, recognize that this is a sample of one of many methods which could be employed to display project status data. The number of constraints can be reduced by the organization (for unimportant constraints) or expanded to accommodate other metrics (e.g. Customer Satisfaction, Team Dynamics, etc.). The metrics can also be "weighted", if that was desired, to arrive at a more appropriate Overall Project Health indication for a specific organization.

Figure 6A:
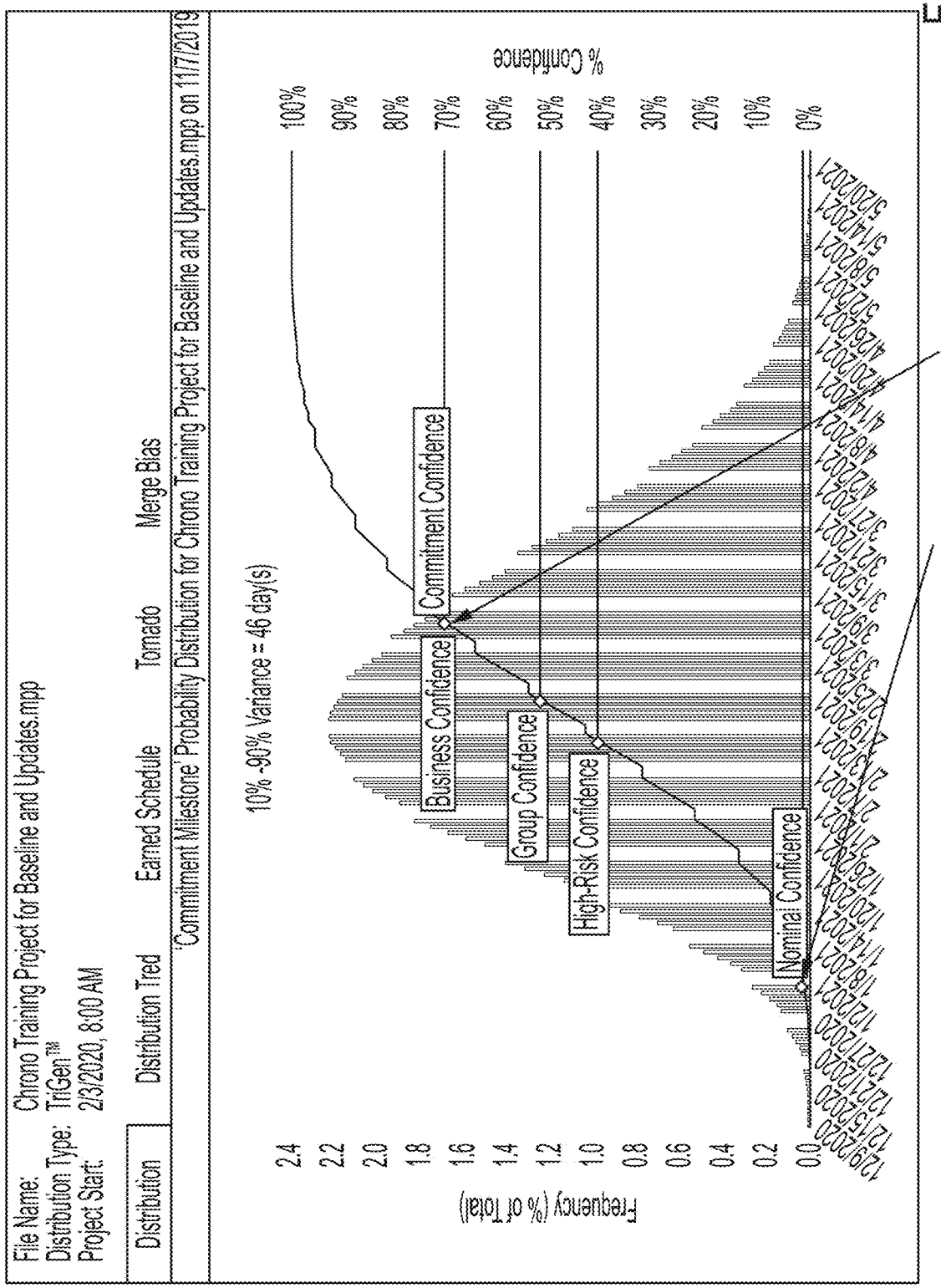
FIGS. 6A-6C illustrate the way that the SPM System adjusts the details of the schedule views in real-time.
Figure 6A:
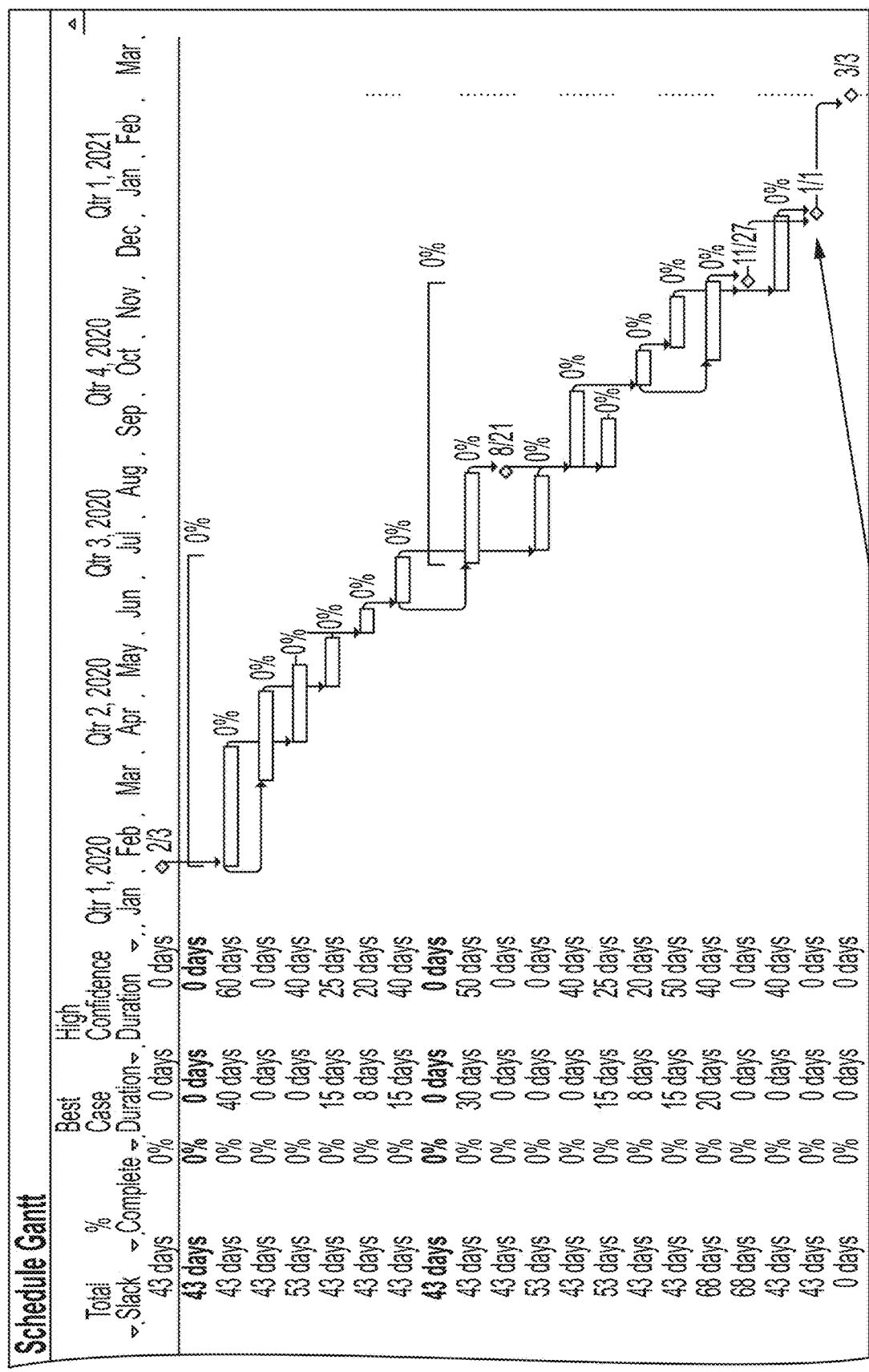
Figure 6A:
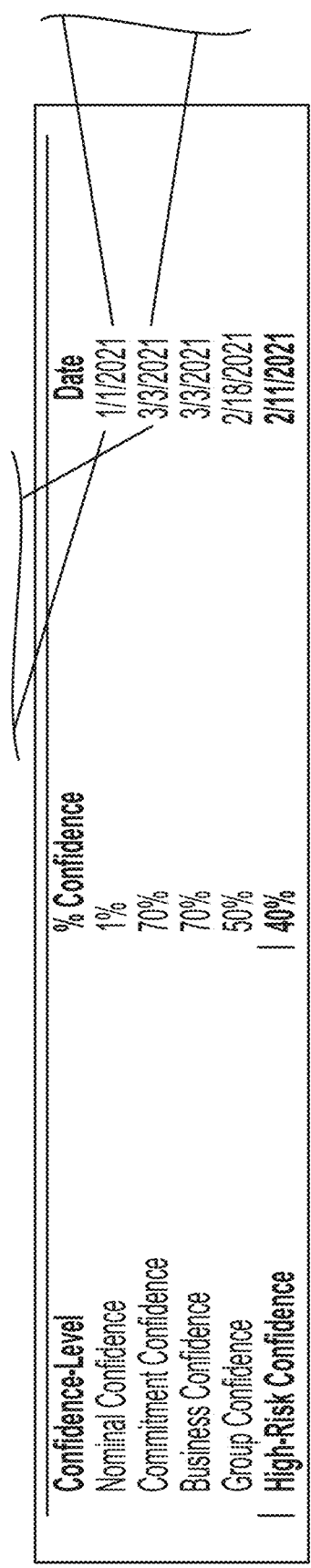
Figure 6A:
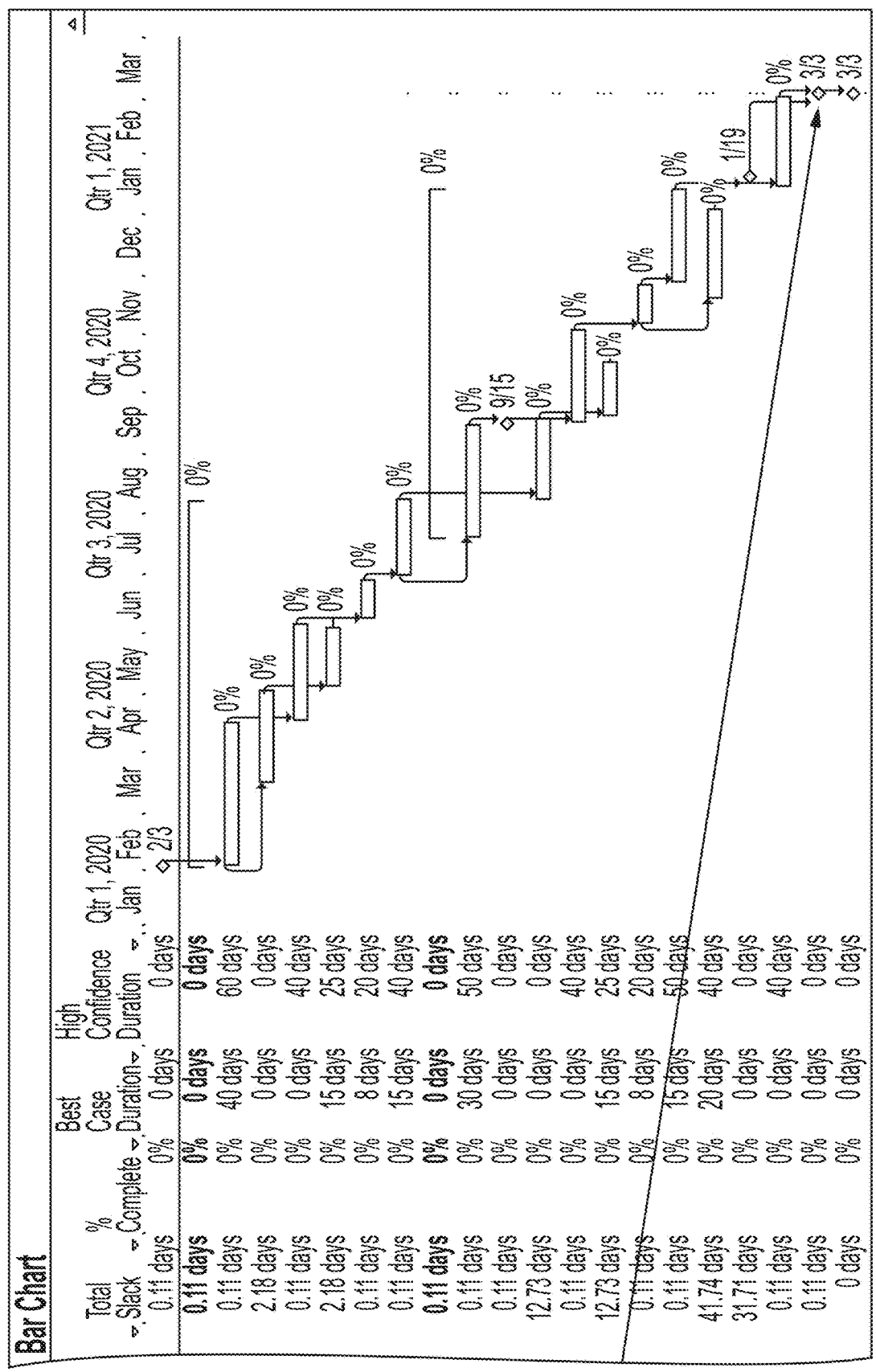
Figure 6B:
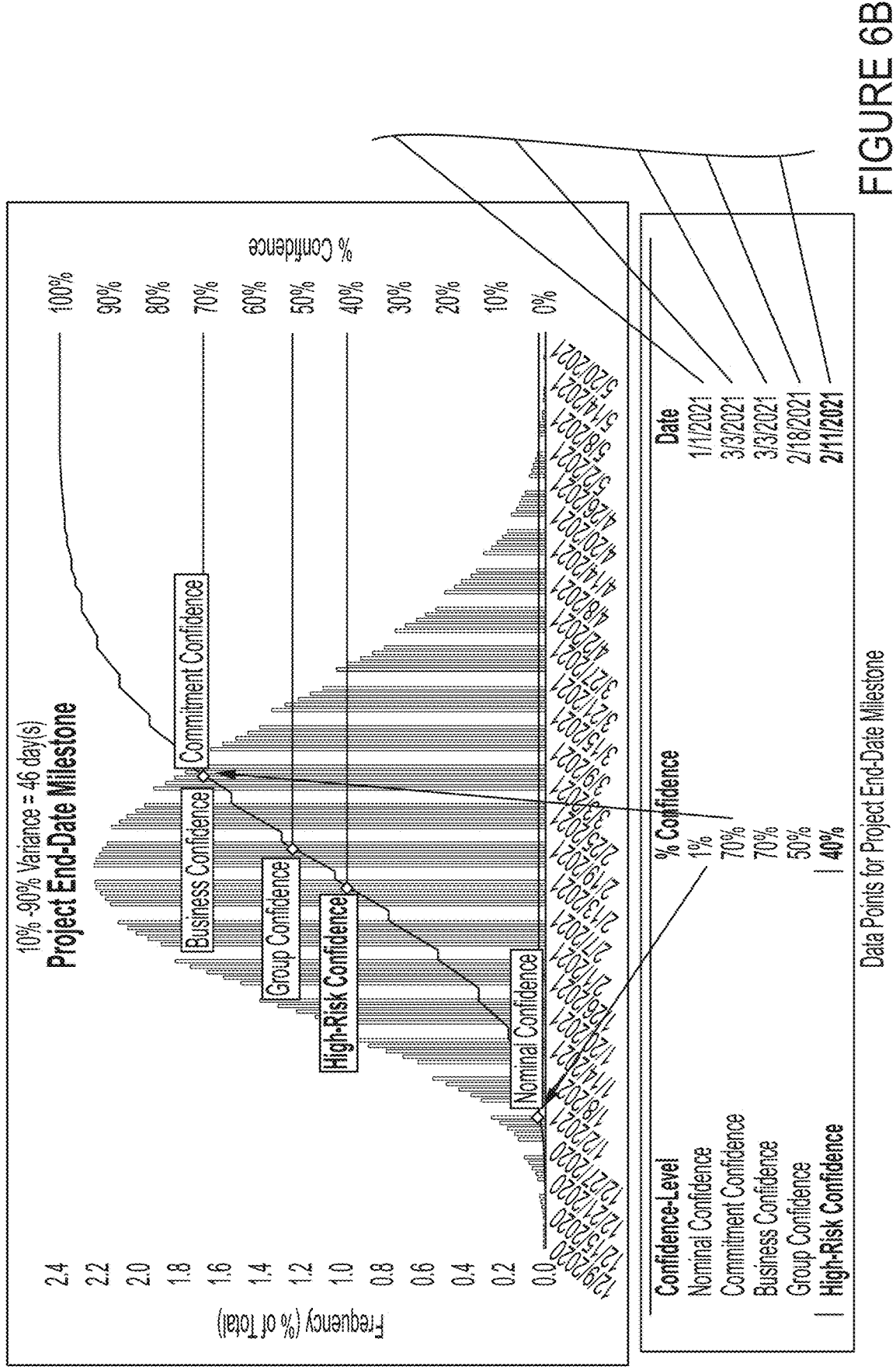
Figure 6B:
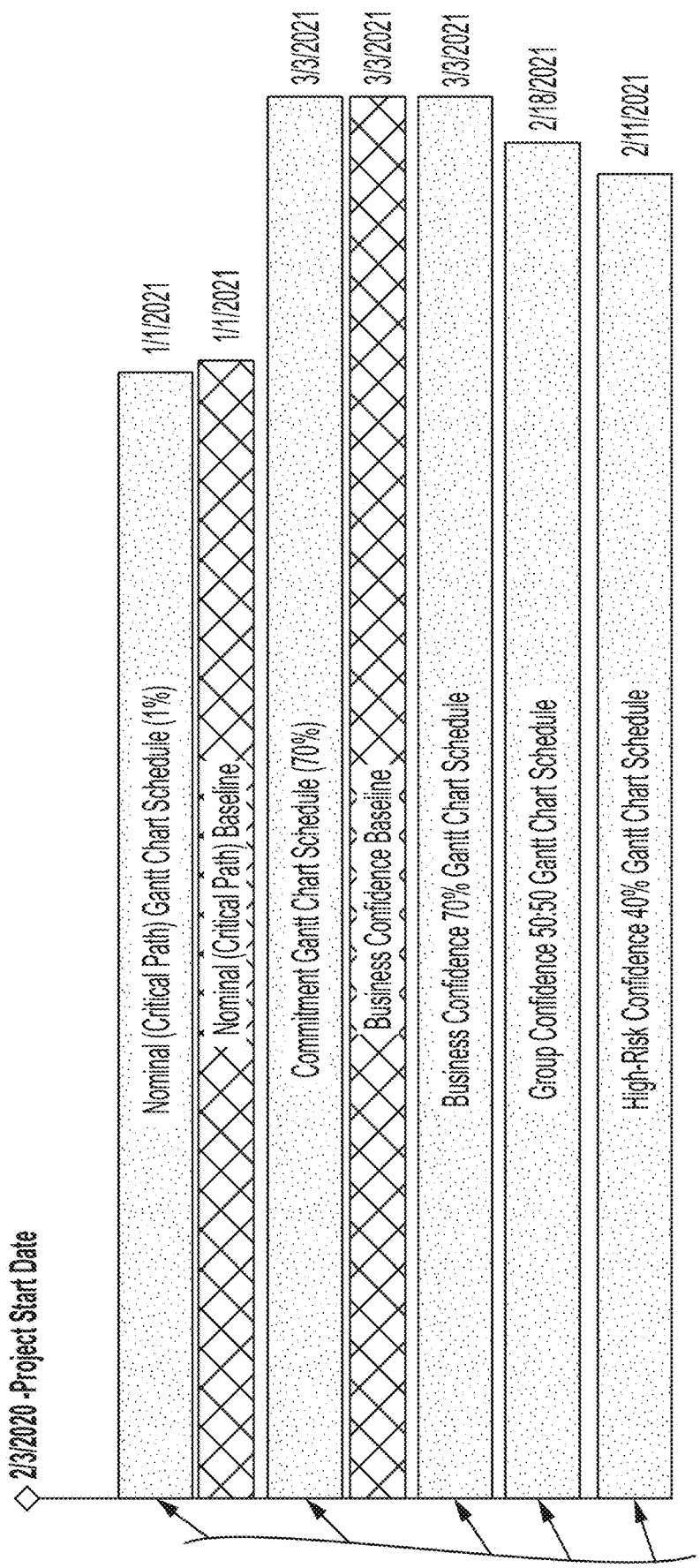
Figure 6C:
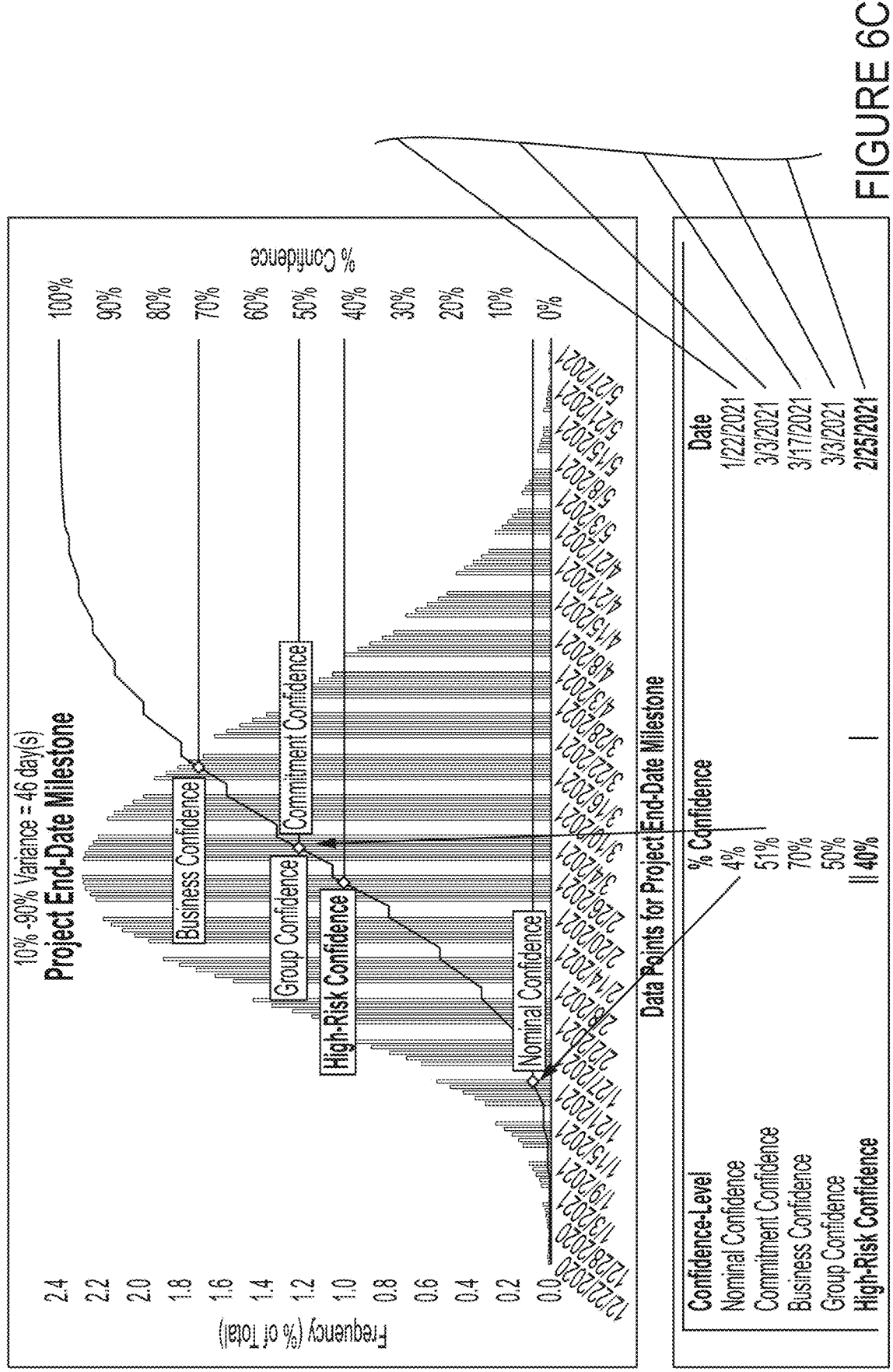
Figure 6C:
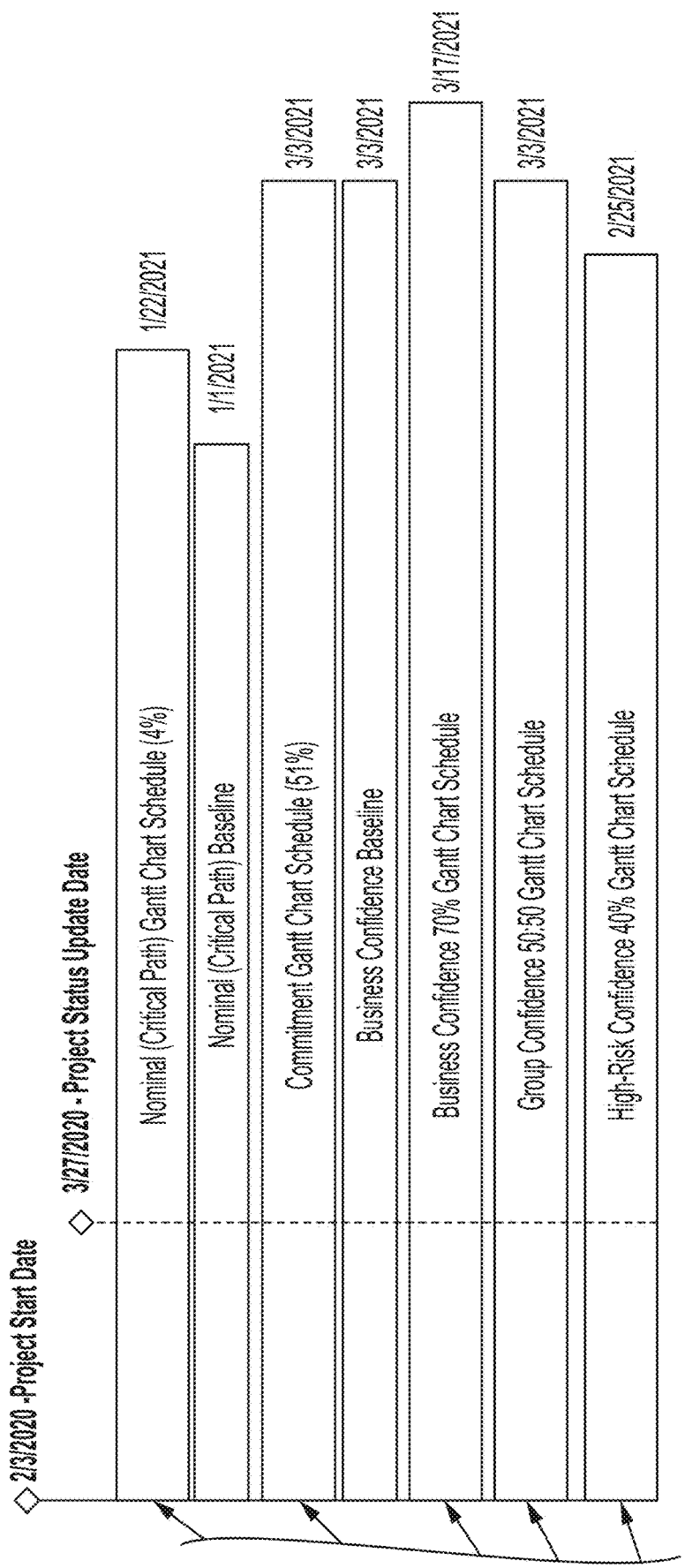

FIGS. 6A-6C illustrate the way that the SPM System adjusts the details of the schedule views in real-time. For example, FIG. 6A shows a comparison of the CP (Critical Path) Gantt generated by the IMS application, with the 70% confidence schedule Gantt generated by the Project Wizard—Same Schedule, different interpretation which can facilitate having a more aggressive target schedule (the CP schedule), yet a more rational (i.e. more reasonable % confidence) schedule for the team to present as their committed plan. FIGS. 6B and 6C show how the SPM System can display multiple overall schedule bar charts for the Baseline Plan (FIG. 6B) and the Updated Plan (FIG. 6C) whereby each bar is adjusted per the % Confidence and dates generated from the corresponding Project End-Milestone Distribution chart. This can be further elaborated to include the same general information for other key project milestones.

Figure 7:
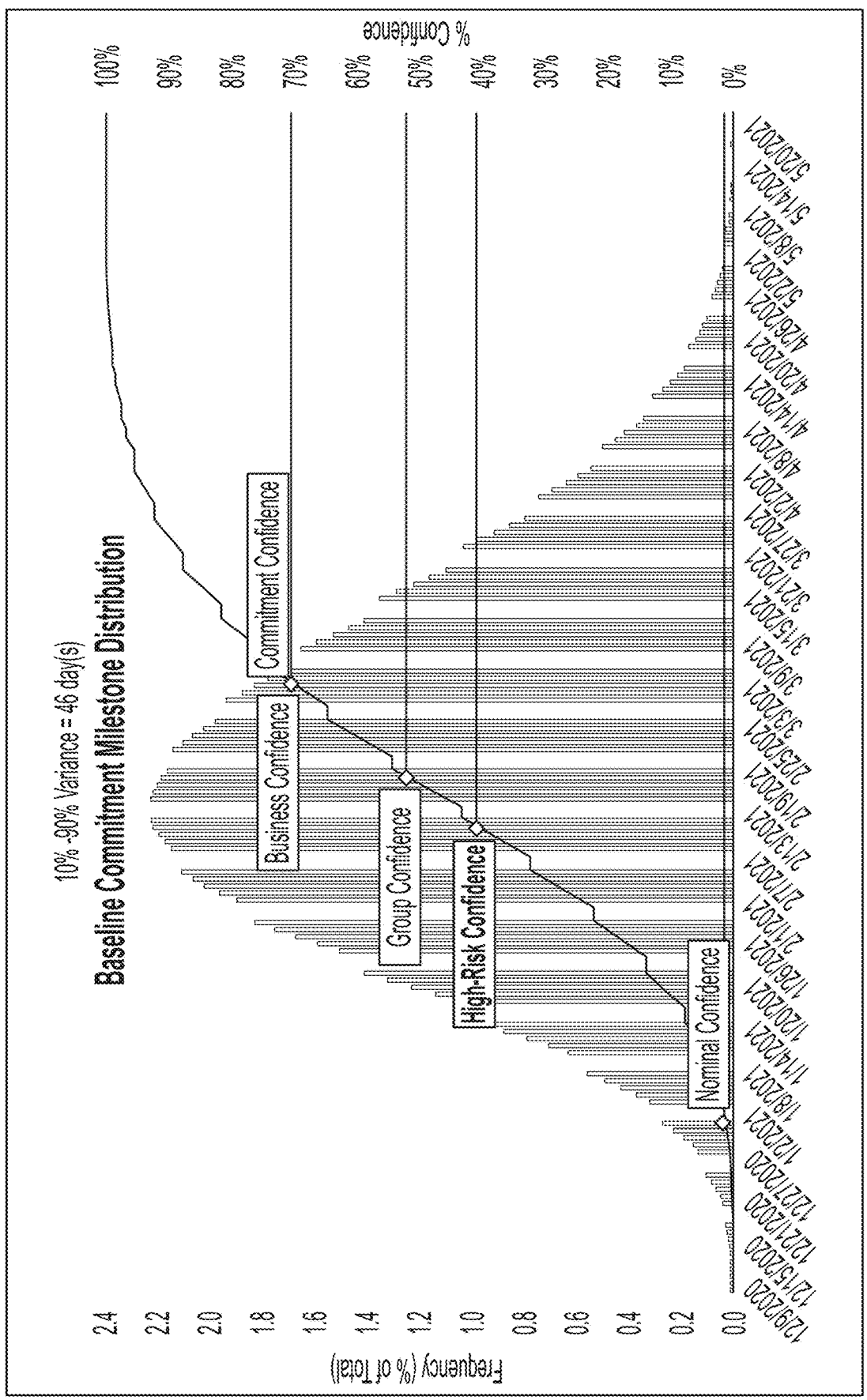
FIG. 7 depicts a project Baseline schedule with a 70% confidence and same schedule updated that was adjusted automatically without changing the IMS schedule Baseline, but only changing the task distribution parameters.
Figure 7:
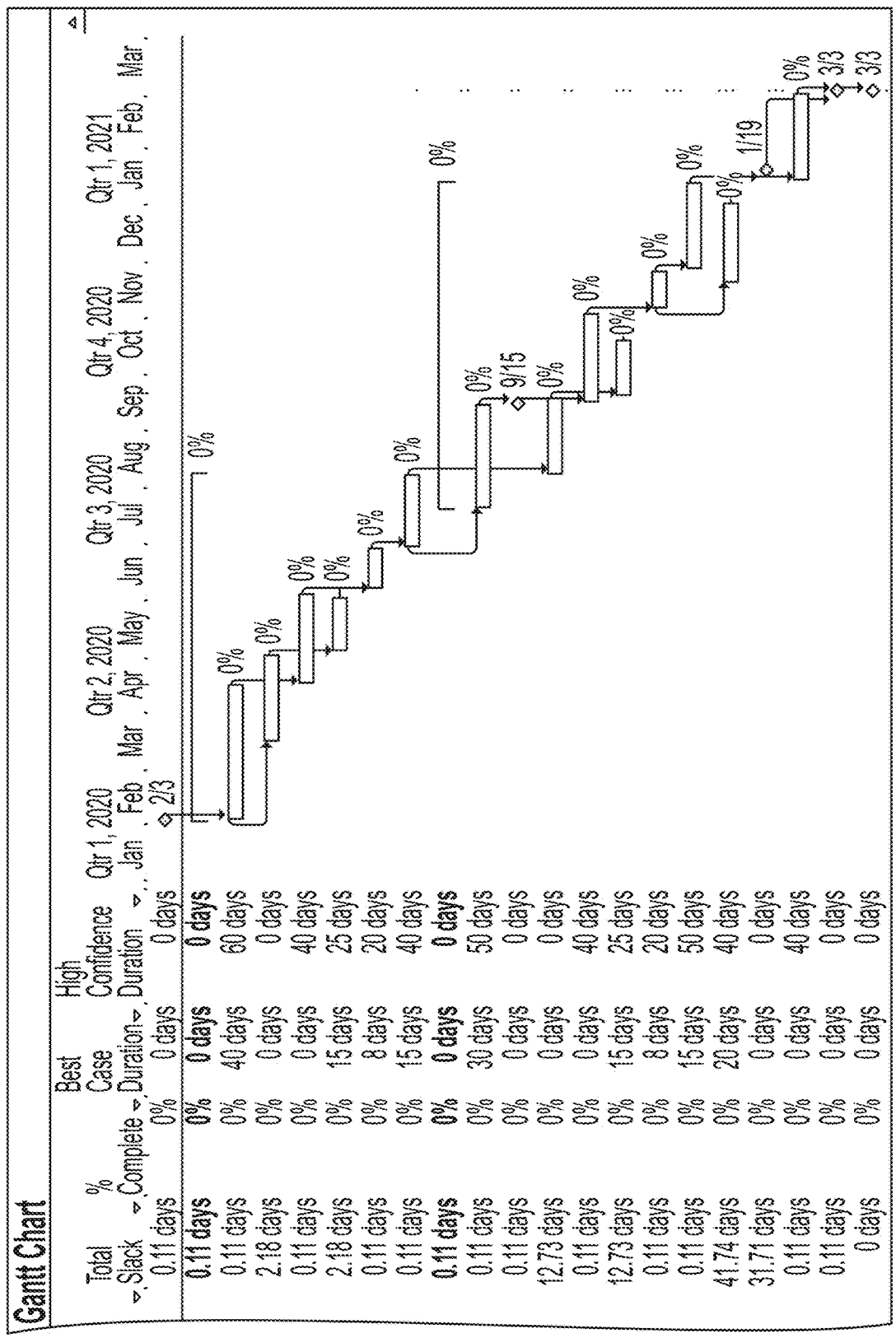
Figure 7:
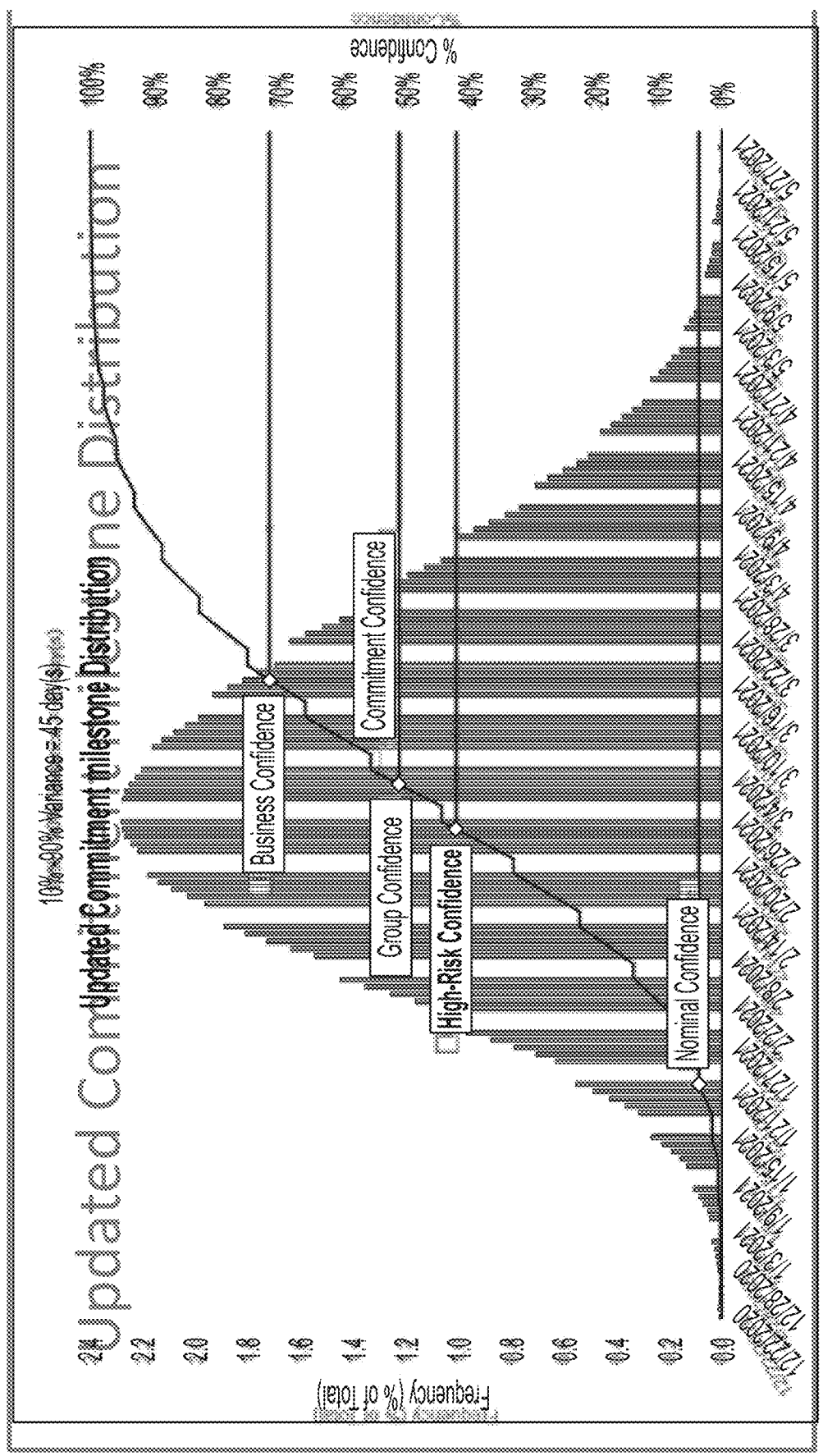
Figure 7:
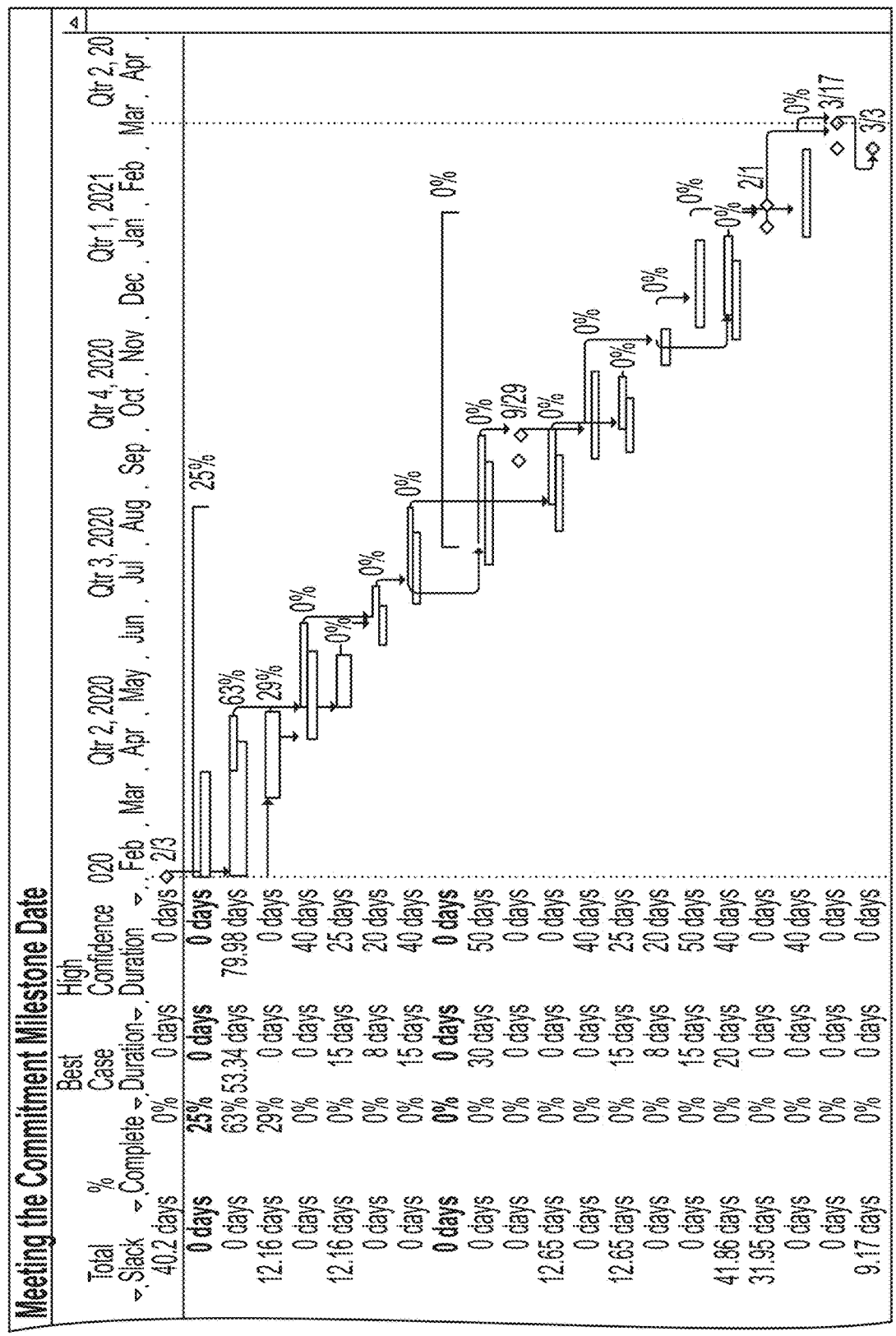

FIG. 7 illustrates an updated project percent (%) confidence schedule that was adjusted automatically without changing the IMS schedule, only recording work/schedule completed and changing the task distribution parameters of on-going or future tasks. This is a normal function of the IMS tool, but is a relatively complicated process (in which, in exiting tools, the IMS is updated then imported into the other tool to get the results) whereas the SPM system provides a novel method to accomplish this function using the Project Progress Update Wizard of the SPM system. The Project Wizard can implement this type of update (i.e. one which requires no structural change to the IMS schedule) via a simple SPM System message from the project lead (for that task) and/or the project manager. Further, this SPM System can accommodate updates with structural changes and total project re-baselining. And even further, the Distribution trends (e.g. completion milestone % confidence over time), 10% to 90% variances (in work-days) and Earned Schedule (a variant of Earned Value) metrics (Schedule Performance Indexes [SPI's], and independent Schedule extrapolations, etc.) are automatically generated and charted.

Figure 8:
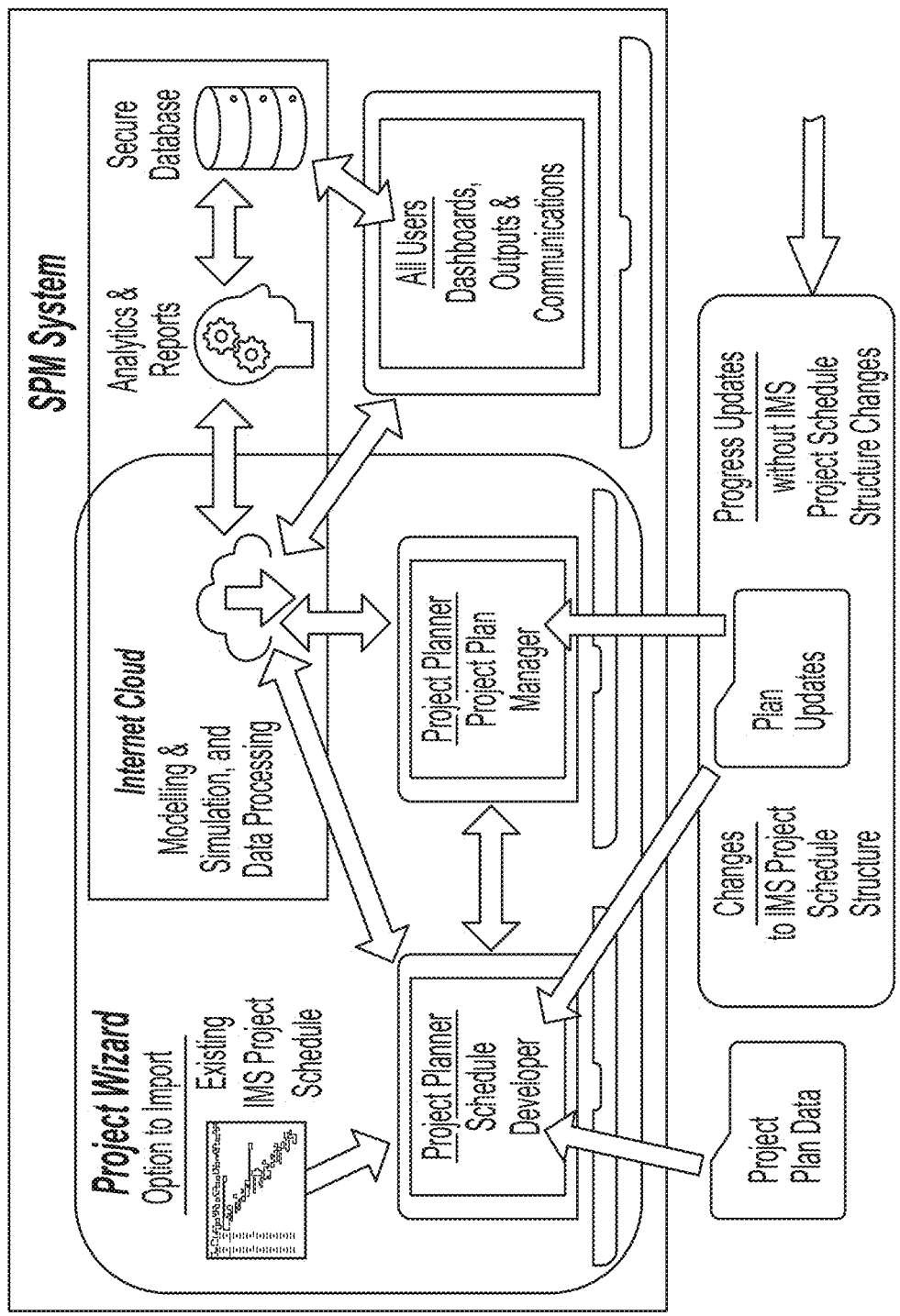
FIG. 8 depicts the "Roll-up" scenario whereby multiple independent project activities are planned and managed separately within their own IMS systems but are represented as tasks within the "Parent" IMS Schedule.
Figure 8:
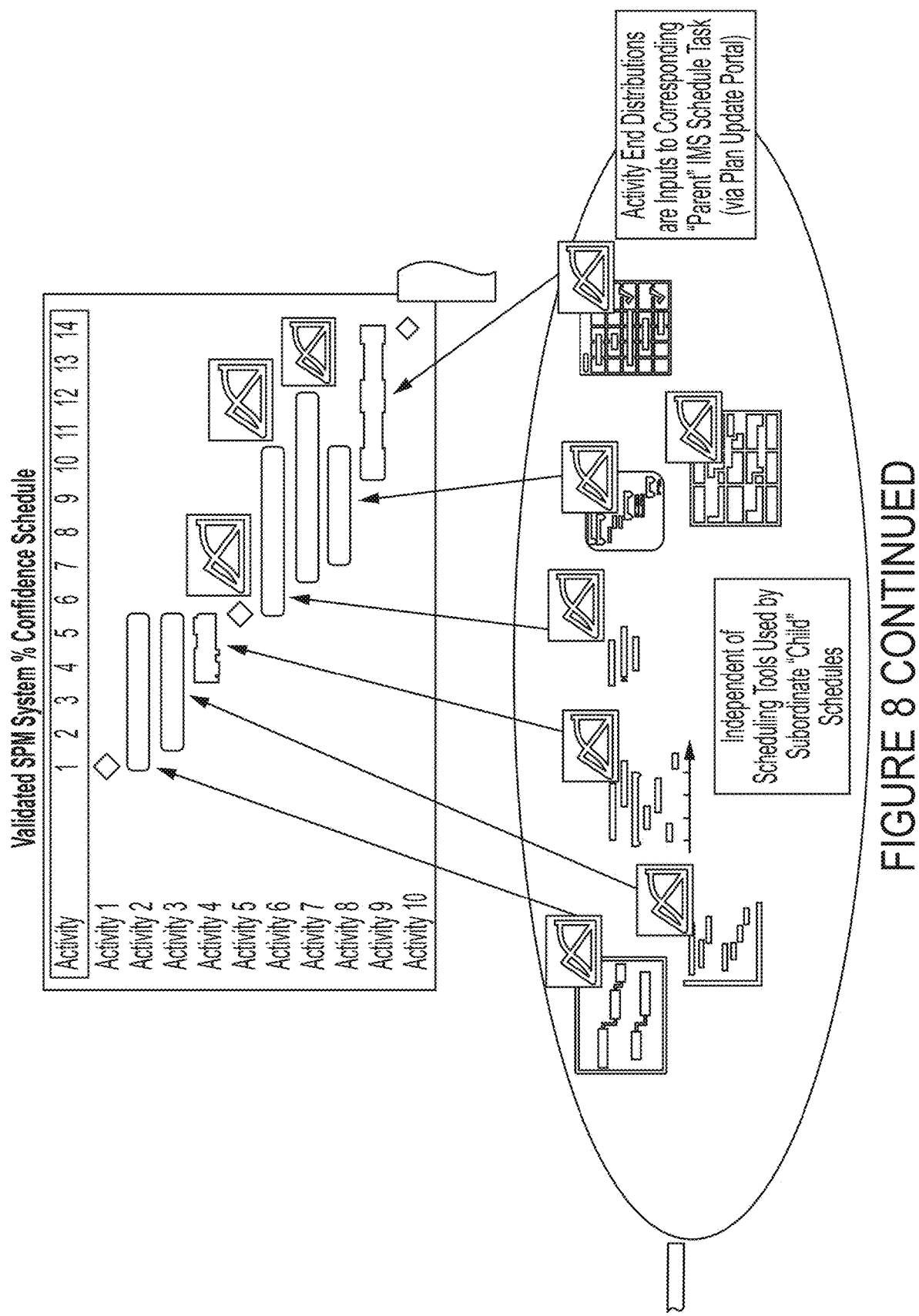
Figure 8:
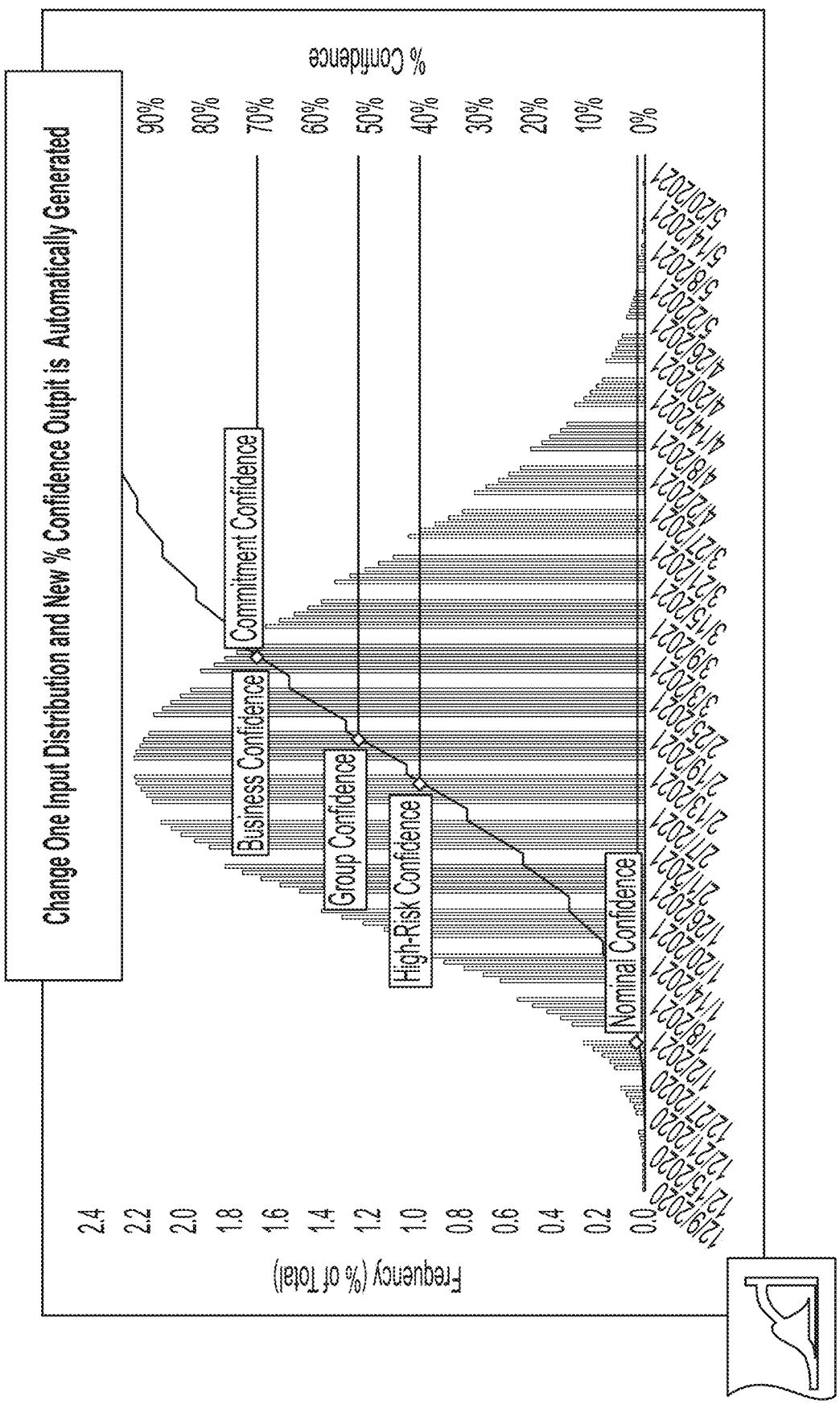

FIG. 8 illustrates a "Roll-up" scenario in the SPM system whereby multiple independent project activities are planned and managed separately within their own IMS systems but are represented as tasks within the "Parent" IMS Schedule. Instead of controlling all the "Child" scheduling tools and techniques and schedule development formats to enable IMS schedule roll-up, the SPM System rolls up (or actually links in) the probability distribution functions of the "Child" activities' completion milestones. This is a concept that has never been previously contemplated but is arguably the best way to perform project "Child" activity schedule planning and updating roll-ups into their "Parent" project IMS to produce a truly integrated project IMS that can be updated with ease at any time a "Child" activity is updated. This SPM System capability provides for near-real-time project status updating in a new and novel way. Instead of requiring sub-schedules to be integrated into the IMS (the current roll-up process), the SPM System does a complete roll-up by simply inserting new "Child" schedule completion milestone PDFs—eliminating the need to coordinate IMS structures, getting IMS inputs, incorporating all the "Child" IMS sub-schedule data into "Parent" IMS, then updating the IMS, saving the file and importing the file into a separate SRA tool for modelling and simulation processing. This latter methodology is a detractor in using SRA best practices, which the SPM System obviates.

Figure 9A:
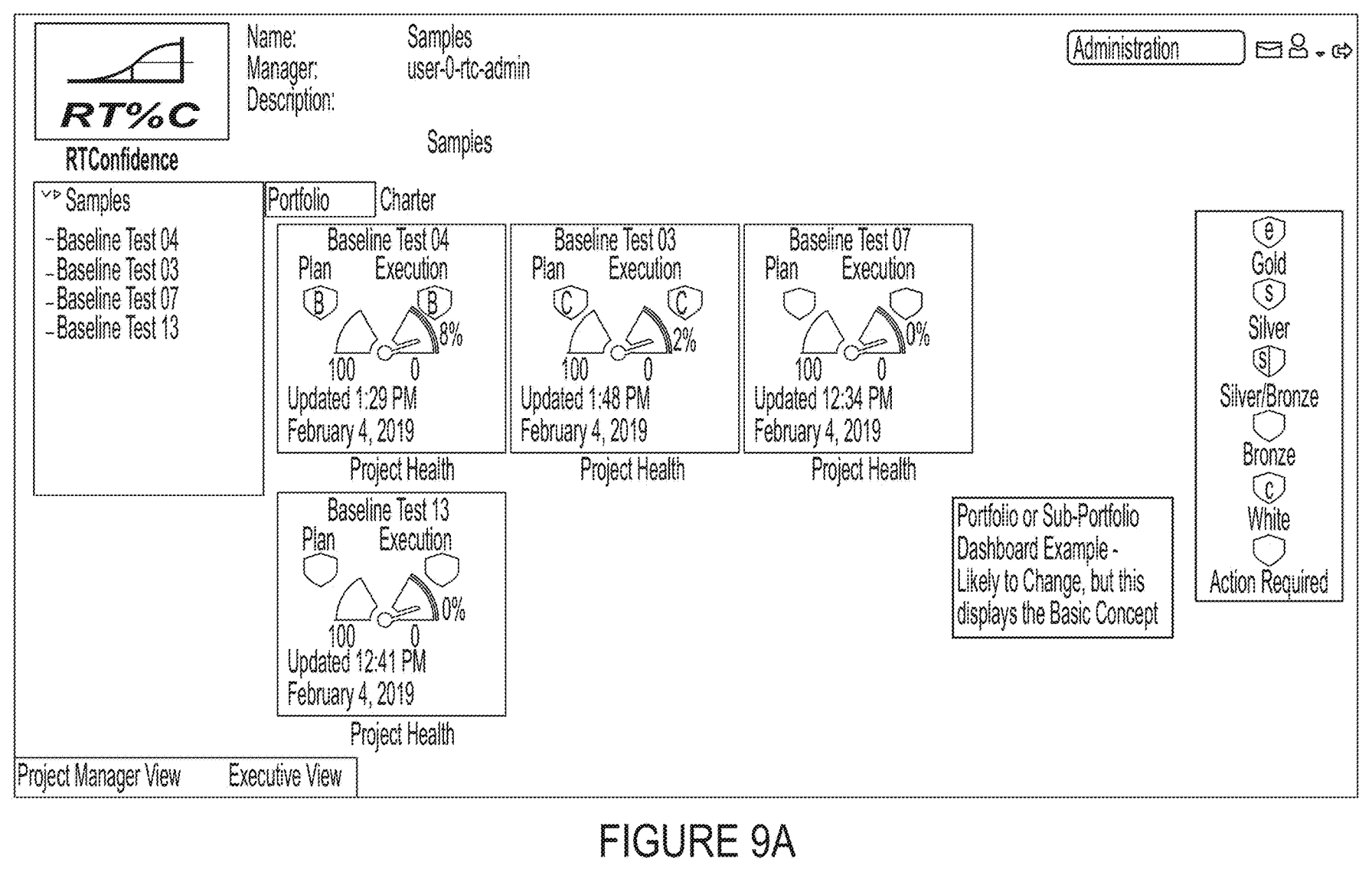
Figure 9B:
Figure 9B:
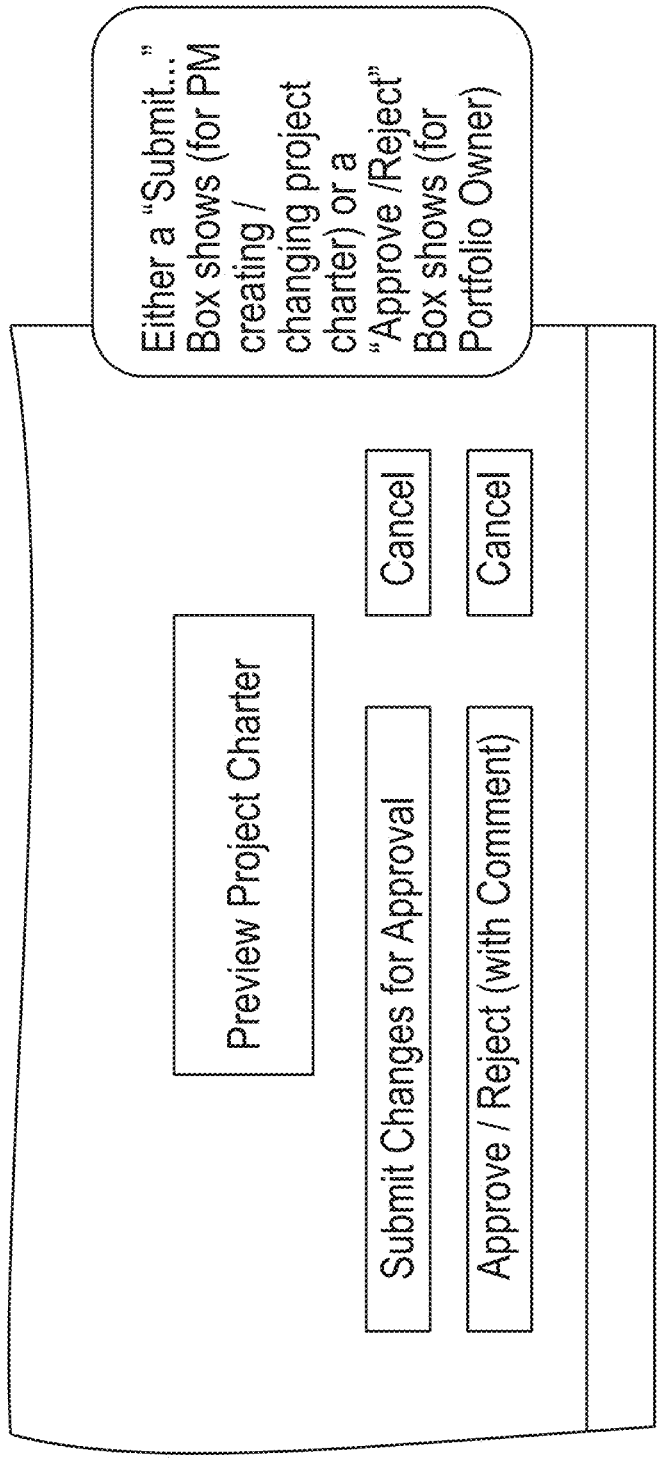
Figure 10:
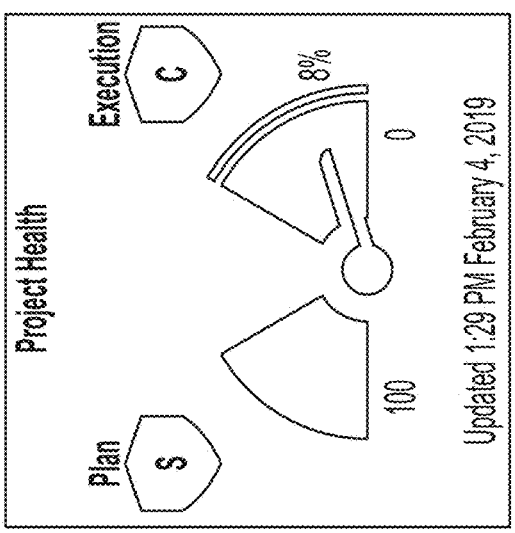
FIG. 10 illustrates an example of gamification of the SPM system.

FIGS. 9A and 9B illustrate a sample Portfolio Project Dashboard Page (FIG. 9A) and subordinate Project individual Home Page (FIG. 9B). The portfolio projects dashboards page (see sample embodied in FIG. 9A) identifies the portfolio, portfolio manager and sub-portfolios (if applicable) and/or the Individual project health gauges. The health gauge shows current Project Health per FIG. 5B and one or more subsequent project health metric values to indicate the project health trend. This near-real-time gauge and "Snap-shot" can be constructed in numerous ways to embody the concept and could comprise other high-level project ratings (e.g. plan and/or performance "Shields" or "Badges", with a more transparent gauge arrow indicating the last rating prior to the update, as shown in FIG. 10, etc.). Clicking on the various figures (e.g. gauge or shield or badge, etc.) launches the viewer (who has such privileges to do so) to drill down into the under-lying data.

The sample Project Home Page (see sample embodied in FIG. 9B) that could be accessed by the user (who has such privileges to do so) via hovering over the gauge performing a selection function (e.g. right-clicking the mouse). This Project Home Page examples shows several data which can be viewed and/or drilled-down further (by users with the appropriate privileges to do so). This is also where a project charter can be established and maintained (with sponsor approvals for solidifying updates to the charter).

FIG. 10 illustrates Shields or Badges for rating the quality of the project plan and execution performance status using Expert System judgment (and user organization preferences) established to enable this "gamification" concept. Examples of the criteria for rating a project plan and project execution/performance are provide in the corresponding table within this figure. Gold, Silver, Bronze and White Shields are identified in this figure, as samples. Other Colors, designs, number of levels and criteria could be established based on organizational preference. FIG. 10 shows how the SPM system provides a system level feature for awarding special recognition to teams for applying best practices associated with project planning and execution.

Figure 11:
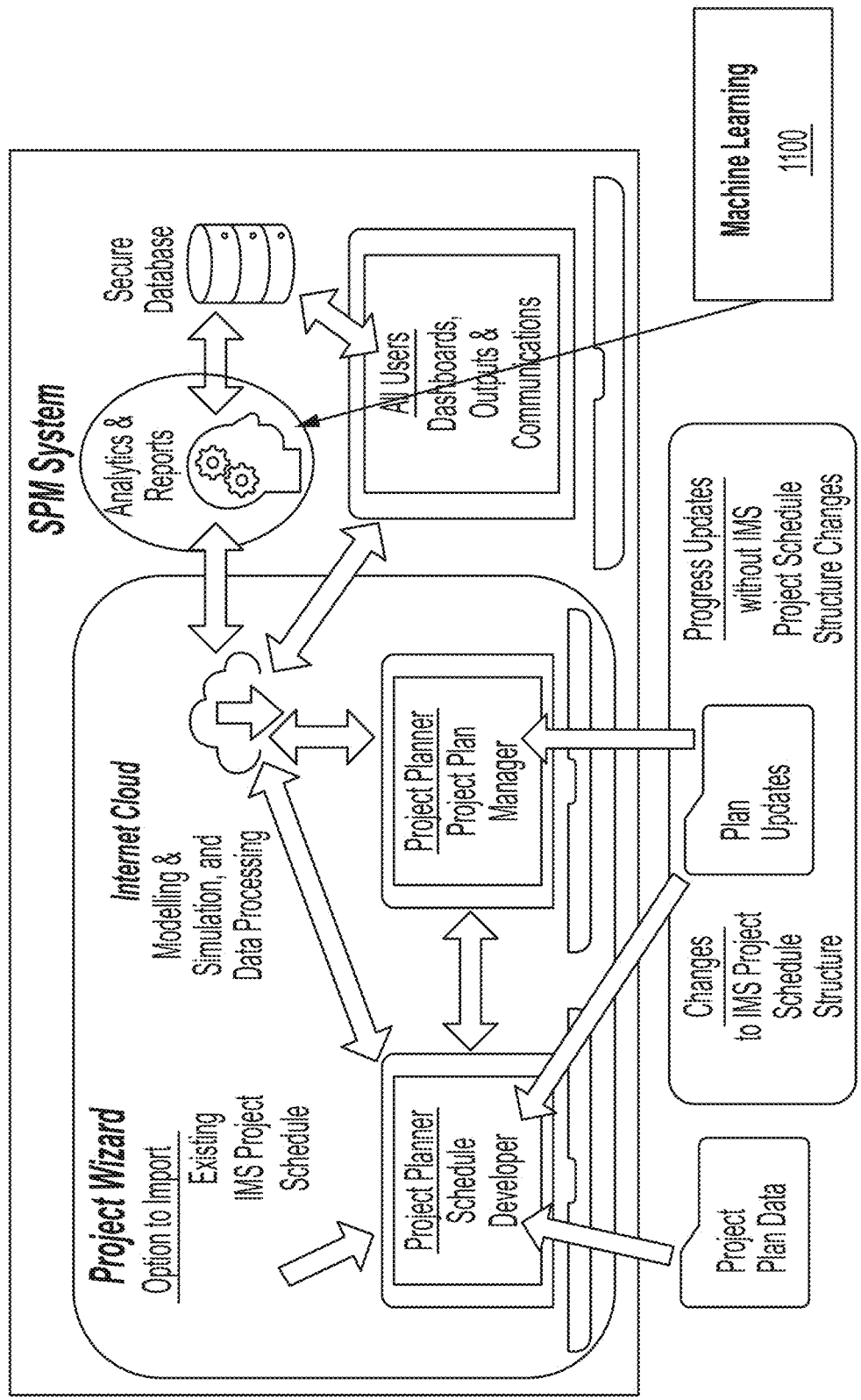
FIG. 11 illustrates the SPM System process associated with data collection, processing, storage and retrieval that uses Machine Learning.

FIG. 11 illustrates the SPM System as shown in FIG. 1 associated with data collection, processing, storage and retrieval that incorporates a Machine Learning element 1100. The machine learning element 1100 may be implemented, in one embodiment, by a computer system (that may be separate from the SPM system 100 or part of the SPM system 100 computer) with a processor and memory and a plurality of lines of instructions/computer code so that the processor of the computer system is configured to perform the machine learning processes as described below. This embodiment of the SPM System is designed to provide data organization and support analysis to facilitate arriving at conclusions which enable more effective and expedient decision-making in the topic areas associated with portfolio, program and project management that are not able to be arrived at without the unique data collected and generated within this SPM System. An obvious example is collecting actual task performance data (task complexity indicators [e.g. for a PCBA (Printed Circuit Board Assembly) you could record the number of layers, size of the board, whether it is uses only SMT (Surface Mount Technology) parts, or Through-Hole as well, how many ASICs, etc.]), the actual time it took and the amount of man-hours required to complete the task, then using that data from many different projects, creating an automated process for estimating time and resources needed for performing future such tasks.

Figure 12A:
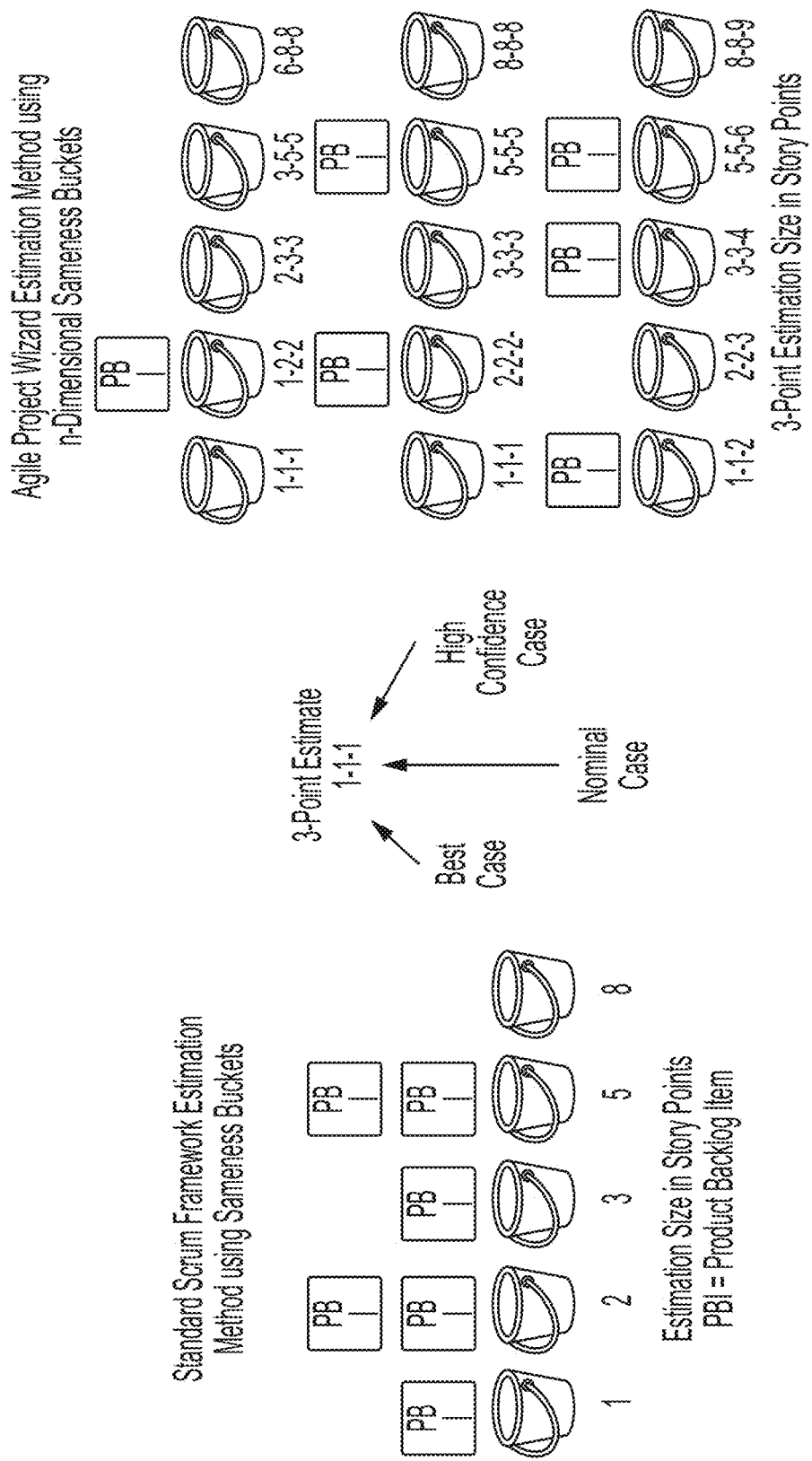
FIGS. 12A-12C illustrates the project wizard supporting Agile (or Adaptive) PDP Scrum Backlog with Refinement planning and updating process using an IMS and modelling and simulation tool.
Figure 12B:
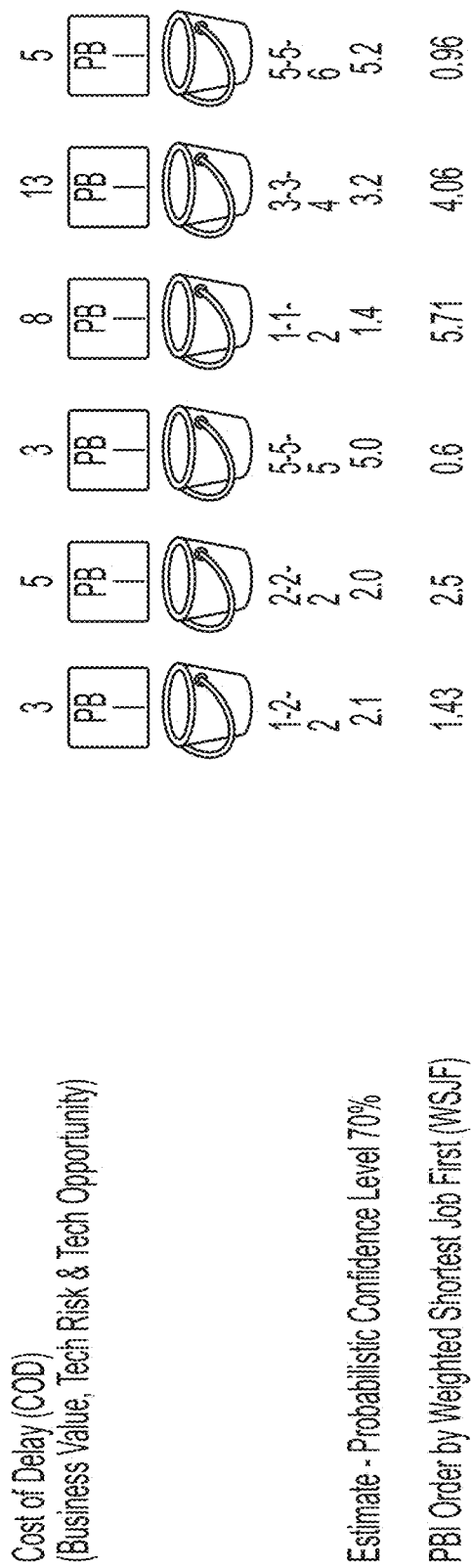
Figure 12C:
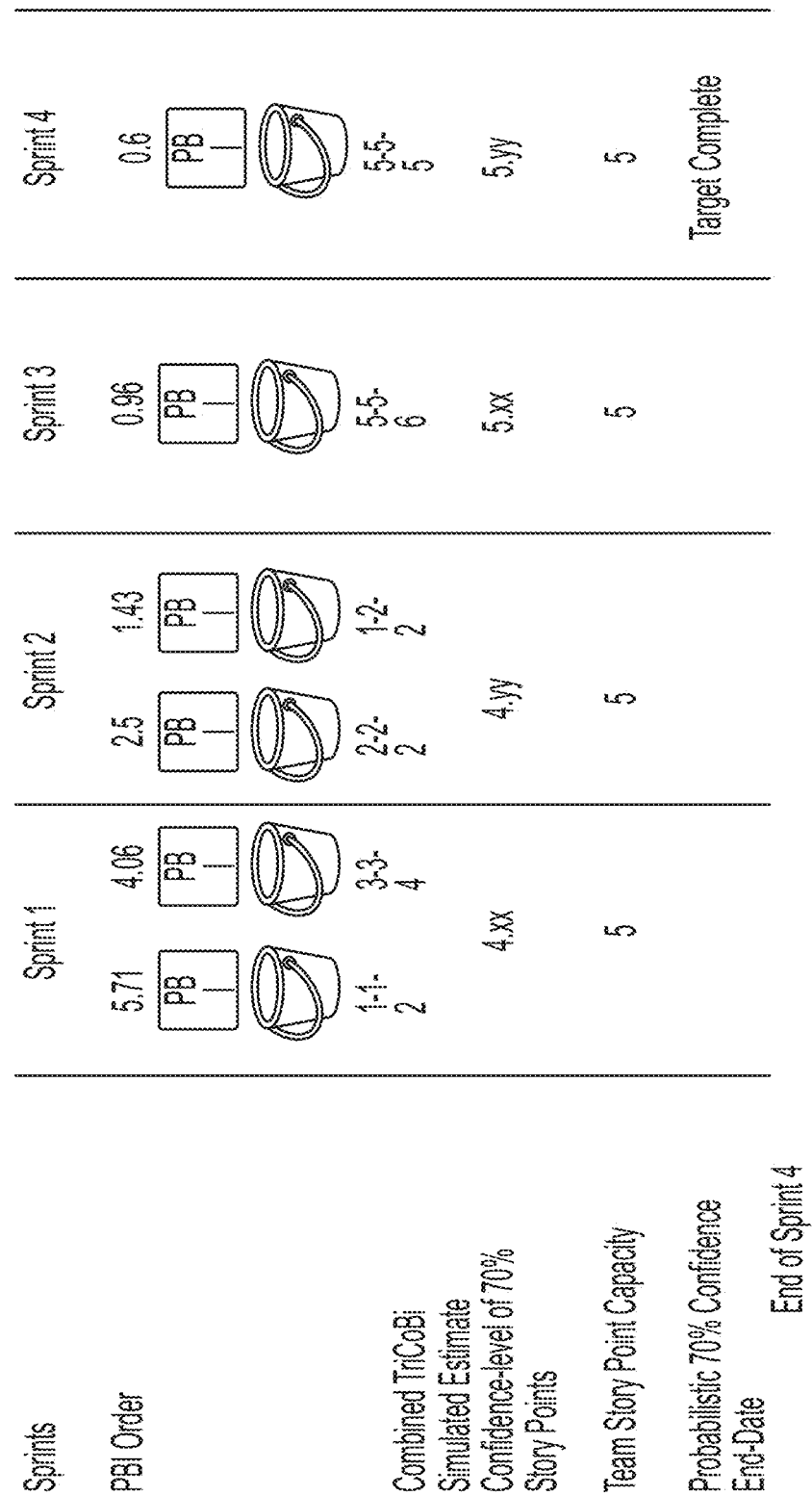

FIGS. 12A-12C illustrate the Agile (or Adaptive) PDP Scrum Backlog Refinement planning and updating process using an IMS and modelling and simulation tool. The Product Backlog in a Scrum Framework has Product Backlog Items (PBIs) that have the following attributes (as depicted in FIG. 12A): description, value, estimation, and order. The description attribute defines who the PBI is for, what is to be developed, and the why or the value that is generated with its completion, and acceptance criteria that is used to verify when the PBI is Done. The value is described as a combination of business value and technical value (considering both technical risk and technical opportunity) and is measured relative to the other PBIs often using an integer from the Fibonacci Series (1,2,3, 5, 8, 13 . . . ). The estimate includes all development and test effort and considers the complexity development activity is also measured relative to other PBIs, typically using an integer from the Fibonacci Series. The value is sometimes called the Cost of Delay and is divided by the estimate to provide a Weighted Shortest Job First (WSJF) prioritization of all PBIs in the Product Backlog. Using the development team's capacity, and the ordered Product Backlog, a project schedule can be forecasted. A Sprint in the Scrum Framework is a iterative development and test cycle where a set of PBIs are developed. The amount of PBIs that can be developed in one Sprint iteration can vary greatly and must be predicted by the development team to provide an end-to-end schedule which includes several Sprints.

PBIs are relatively estimated and grouped into buckets of sameness. These sameness buckets sized relative to each other using the Fibonacci Series. However, since the estimates are rough, and carry a lot of risk, the Agile Project Wizard helps increase estimation accuracy by providing a method to further classify the sameness of PBIs by providing the development team to the option to provide a 3-point estimate as described in this document for each PBI. As the development team decides if the nominal point in the 3-point estimate matches another PBI, then the team will decide if the best case and high confidence case points in the 3-point estimate is the same as the first PBI. If the new PBI does not have the 3-point estimate, then a new bucket is created to hold the new PBI. As all the PBIs in the Product Backlog are estimated, the set of sameness buckets are expanded from a linear raging set, to a n-dimensional set that includes, representing all possible 3-point estimations using a Fibonacci Series for the nominal-point, and either a percentage of the nominal or another Fibonacci number for each of the best case and high confidence points of the 3-point estimate.

The Agile Project Wizard then recreates the order of the PBIs using the WSJF process using the 3-point estimate and the percent confidence level selected by the development team (an example on which is shown in FIG. 12B). The team's capacity is then used to determine how many PBIs can be developed in each Sprint iteration (an example of which is shown in FIG. 12C). The project is then simulated using the Monte Carlo or TriCoBi™ method. The output of the simulation is a recommendation of which Sprint to place each PBI based on the predetermined order. The development team, working with project management, can update the order of the PBIs and then rerun the simulation to get a final estimated end-date for the full Product Backlog. The estimated end-date can be selected and reported out by confidence level. The result is a Product Backlog estimated and forecasted using probabilistic estimation.

Figure 13A:
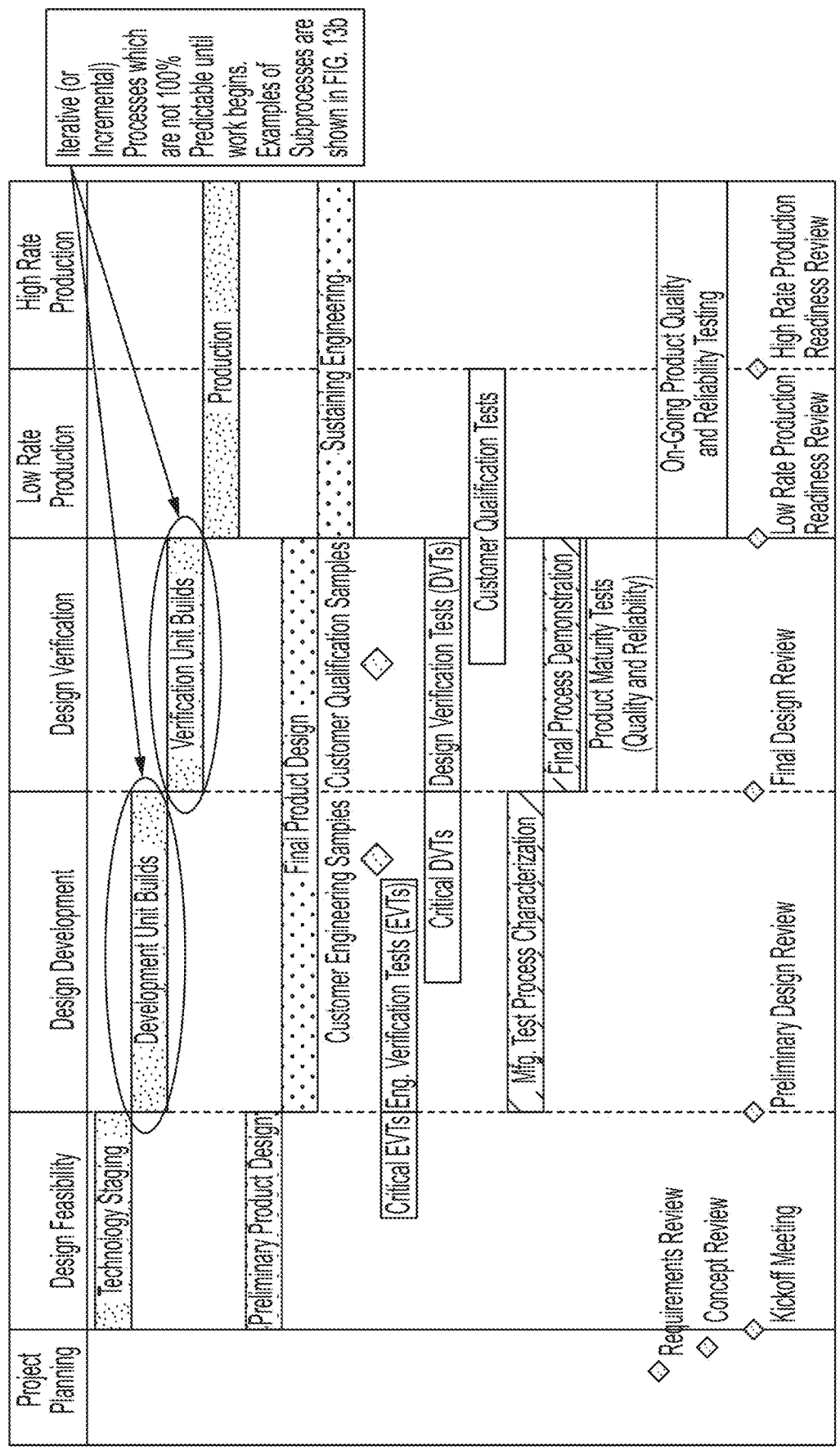
FIGS. 13A and 13B illustrate an Iterative (or Incremental) PDP planning and updating process as a sub-element of the larger project IMS.
Figure 13B:
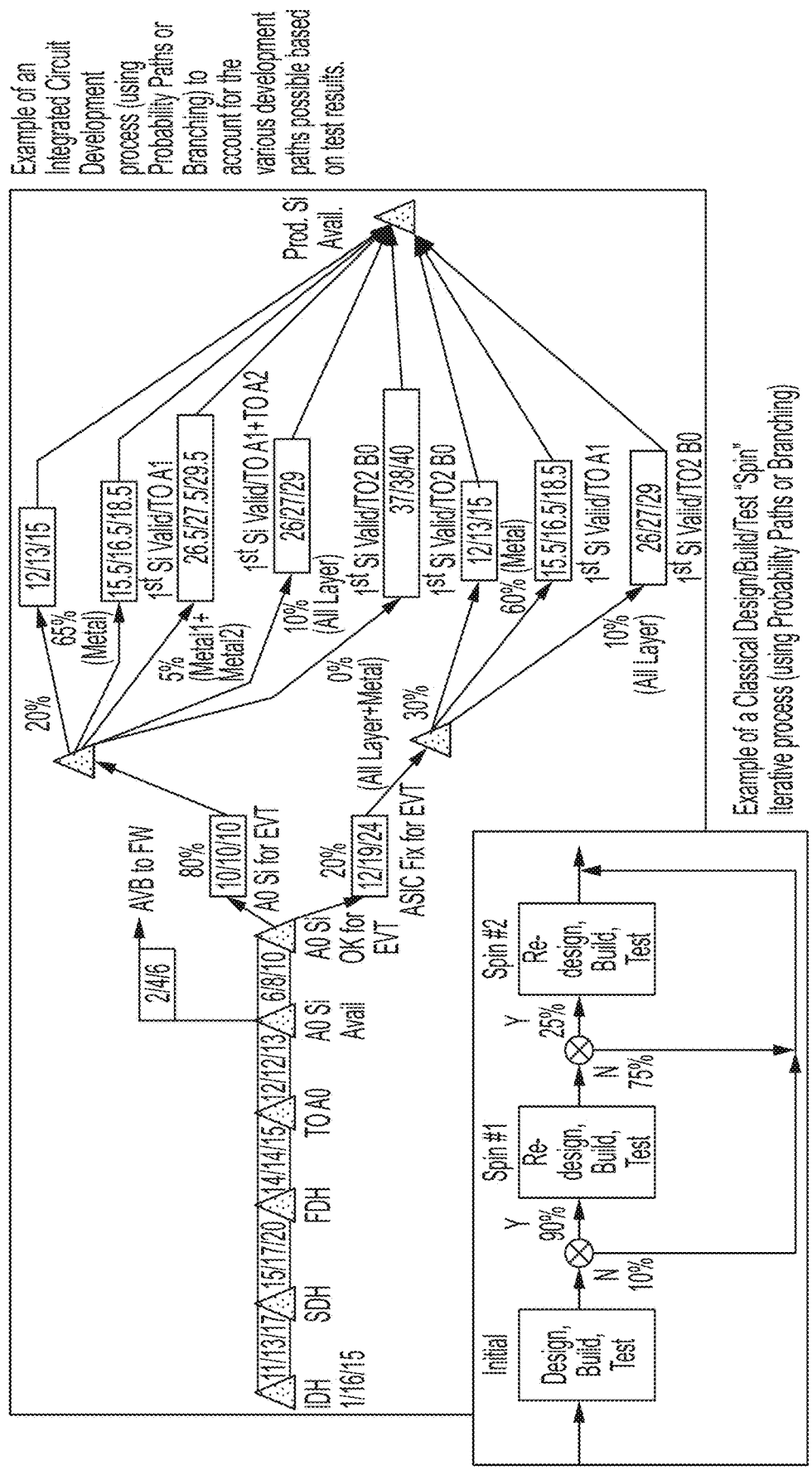
Figure 14:
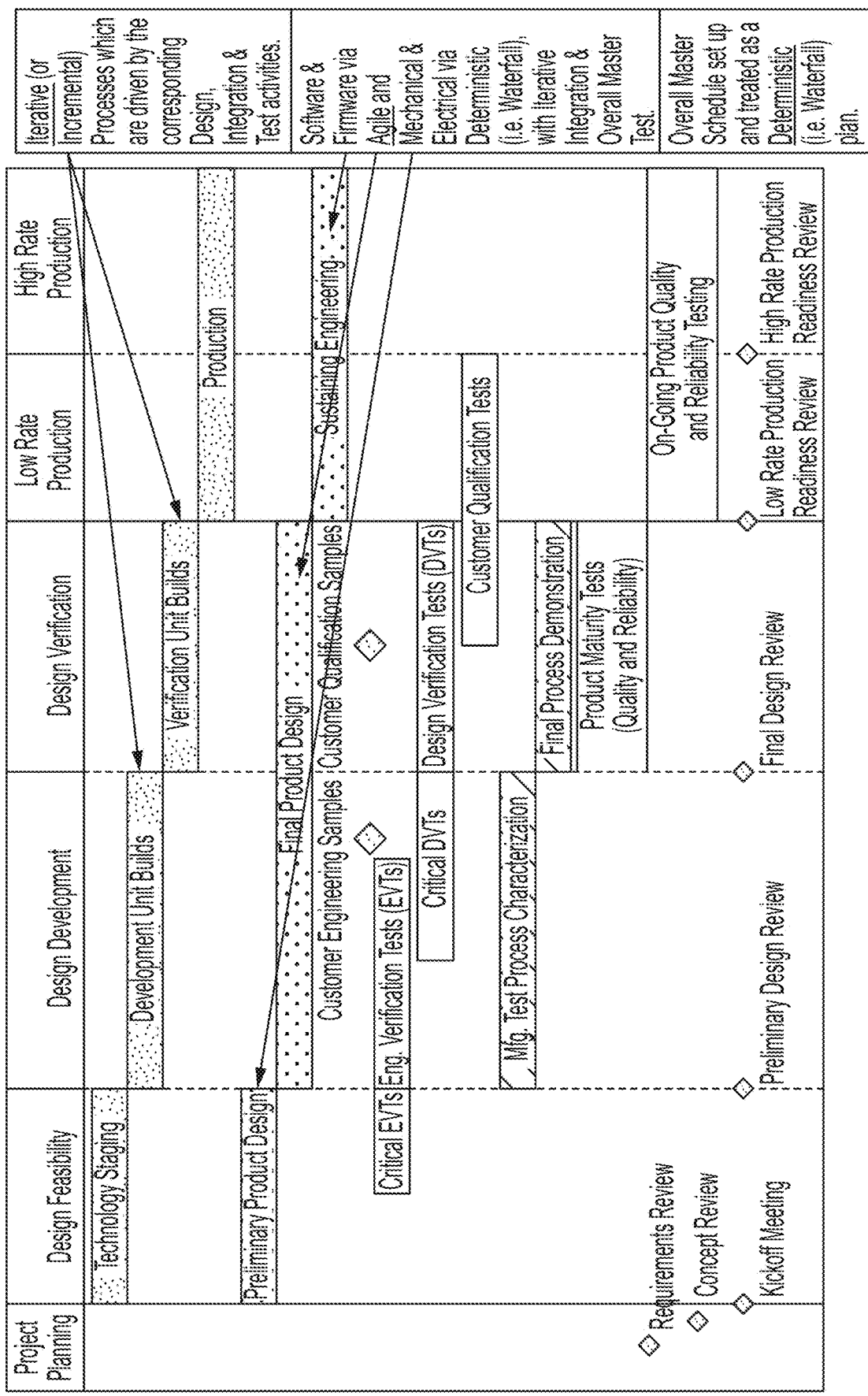
FIG. 14 illustrates how the SPM System and Project Wizard enables a Hybrid PDP.

FIGS. 13A and 13B that illustrate Iterative (or Incremental) PDP planning and updating processes using an IMS and modelling and simulation tool. This type of process is typically a sub-process within an IMS (as shown in FIG. 13A) and cannot be modelled with an IMS alone to predict schedule outcomes but needs modelling and simulation methods a la the SPM System's Project Wizard to facilitate both IMS set-up and perform SRA (Schedule Risk Analysis). FIG. 13B shows more detail relative to how this feature enables the user to set up a set of probability paths (i.e. branches) to accommodate a variable number of options. The examples shown include the classical Design/Build/Test "Spin" iterative process and the Integrated Circuit development process whereby different probability paths (i.e. branches) can be anticipated and appropriately factored into schedule % confidence expectations. Standard IMS tools cannot accommodate this without the use of a supplemental SRA capability. The SPM system facilitates rolling up a single IMS "Parent" plan by integrating the PDF outputs of "Child" IMSs using different PDP approaches—no other system is known to be available with this unique capability FIG. 14 illustrates how the SPM System and Project Wizard enables a Hybrid PDP (a combination of Waterfall [or Predictive/Deterministic], Iterative [or Incremental], Agile [or Adaptive], etc.) planning and updating process using an IMS and modelling and simulation tool via Waterfall mode, Iterative mode, Agile mode, and potential other mode selections/flags. This figure shows two separate approaches which could be taken to represent a Hybrid PDP: (1) all integrated into a single combined IMS; and (2) Integrated via separate "Child"/"Parent" relationships. Both are effective, and the latter is arguably the most practical for it enables other team leads to establish and tract their specific activities as sup-projects. Other IMS application programs cannot perform this type of PDP integration, and typically attempt to conform all sub-PDPs into the Waterfall PDP format (a much more cumbersome and time-consuming process as opposed to this novel SPM System approach which uses "Child" IMS probability density functions to integrate into the "Parent" IMS.

Figure 15:
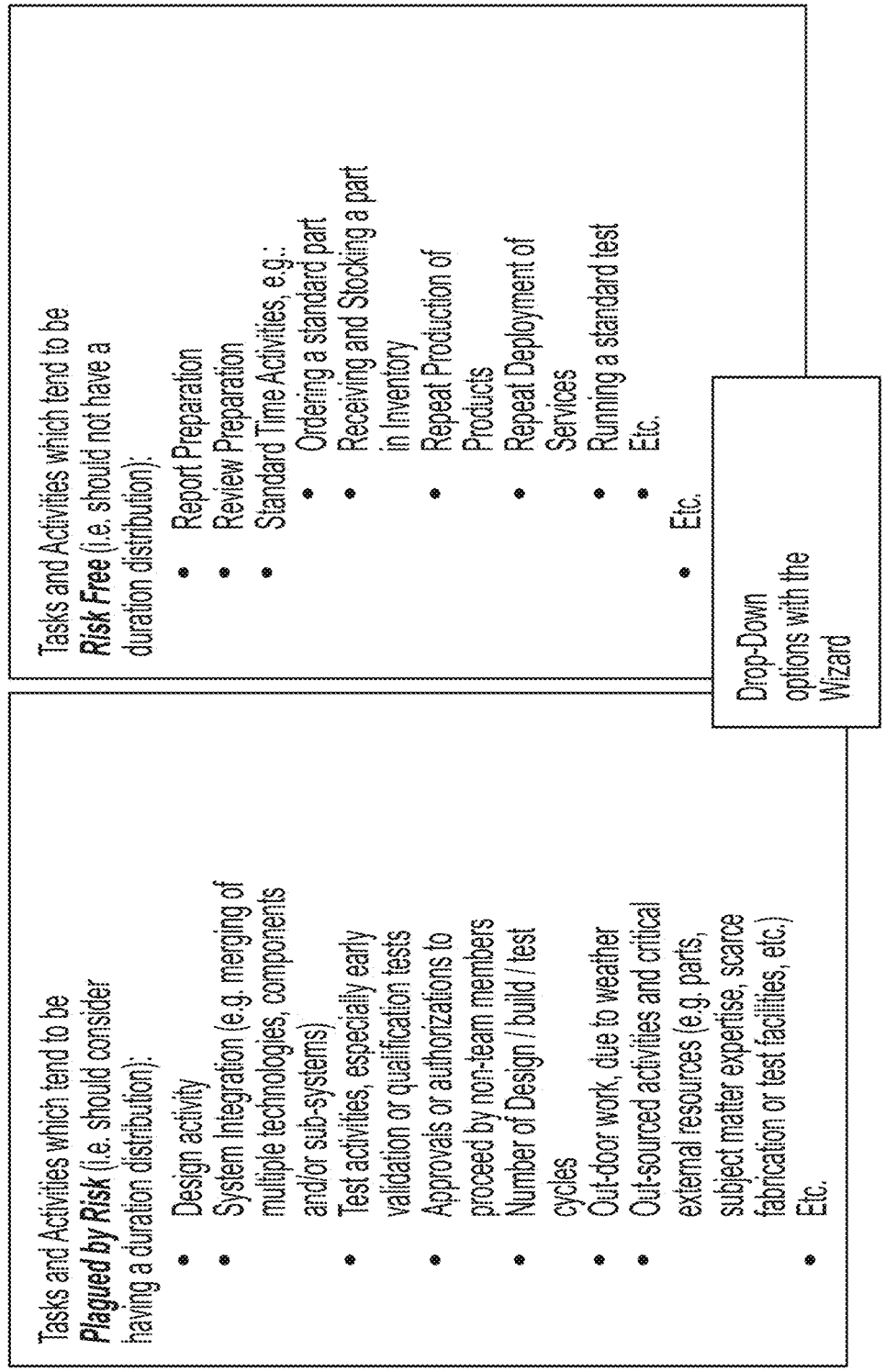
FIG. 15 illustrates the use of Expert System Task ID description analysis.

FIG. 15 illustrates the use of Expert System Task ID description analysis to suggest that the project planner consider task distributions for Risky tasks, as well as to discourage use of task distributions on tasks that are described with terms typical of non-risky tasks. Two representative lists of expert task categorization are shown (one for high-risk [warranting non-discrete probability distribution functions] and low-risk [warranting discrete values at 100%]). A third list will be provided as well relative to task opportunities to do better than planned. Key works can be inserted into the wizard to autonomously locate such tasks for suggesting appropriate distributions. This can assist those who might need or desire the suggestions. This feature can be turned off for those not desiring its services. The SPM System can be designed in such a way that it searches for key words in the Task Descriptions to prompt users to either consider tasks which seem like they should be at least considered for 3-point Estimates (but have not been), or for questioning if some tasks with 3-point estimates should be single point estimates instead. This can also be used to automatically apply a standard 0.5/1.0/2.0 (Best Case/Nominal/High Confidence) distribution on all tasks which seem to be risky as a quick "What-if?" for preliminary schedule evaluation.

Figure 16:
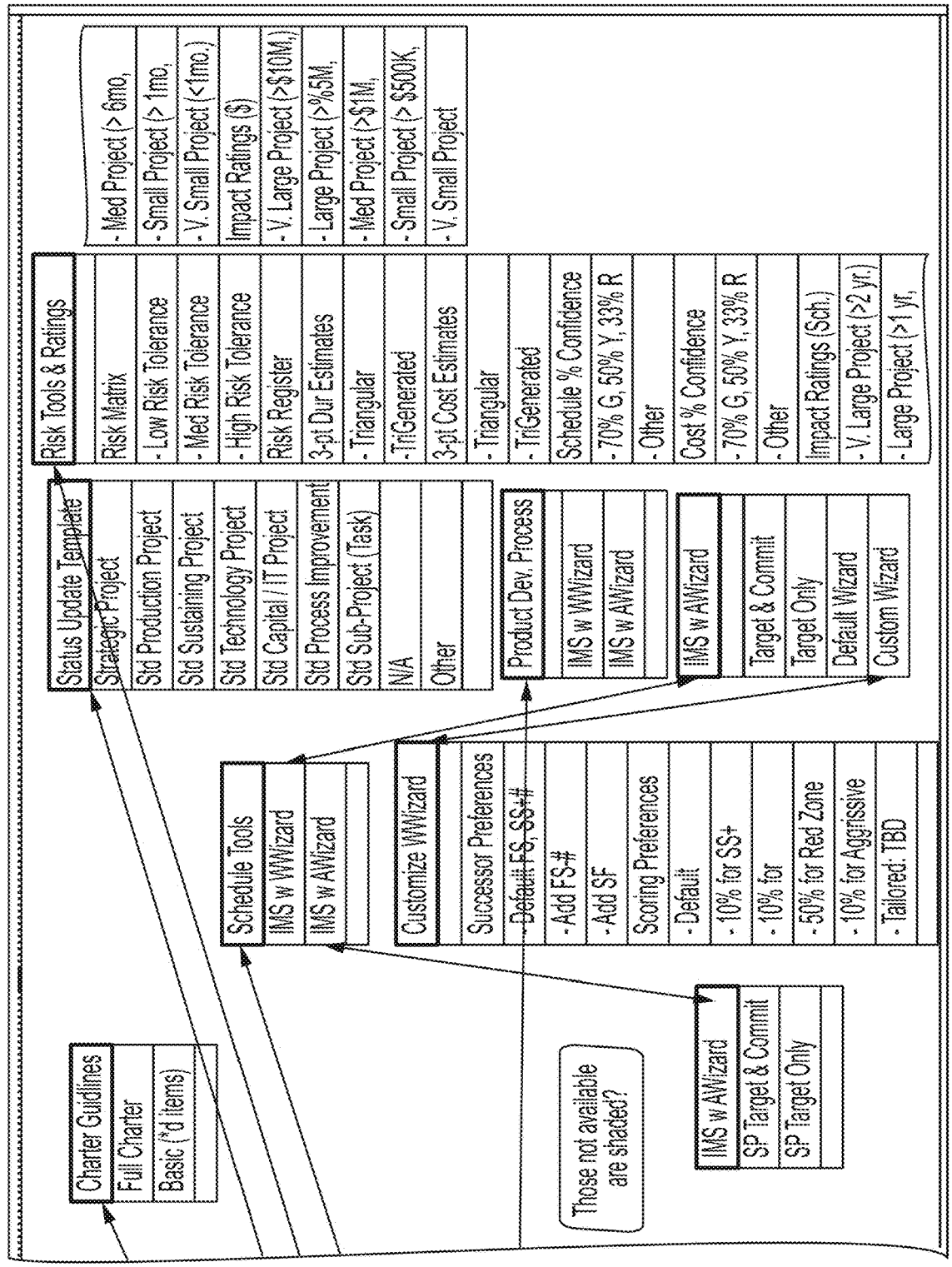
FIG. 16 describes the process for setting up Organizational Portfolio Governance to distinguish between standard guidelines and set-up options for different project types in various sub-portfolios in the SPM system.

FIG. 16 illustrates the process for setting up Organizational Portfolio Governance to distinguish between standard guidelines and set-up options for different project types in sub-portfolios. As shown in FIGS. 1 and 11, several users can have Governance control rights, and System Administrators may need to be appraised (or prompted) to provide certain set-up and/or change options. Further, within a single user organization, several different Portfolios (or Sub-Portfolios) can operate under different sets of project guidelines—enabling a degree of flexibility which makes this SPM System uniquely flexible enough to enable. This figure shows an example of organizational governance site and categories—and menu options available for selection within the categories. This listing will likely change over time, but the general concept and breadth of categories/selections is unique to this SPM System design.

Figure 17:
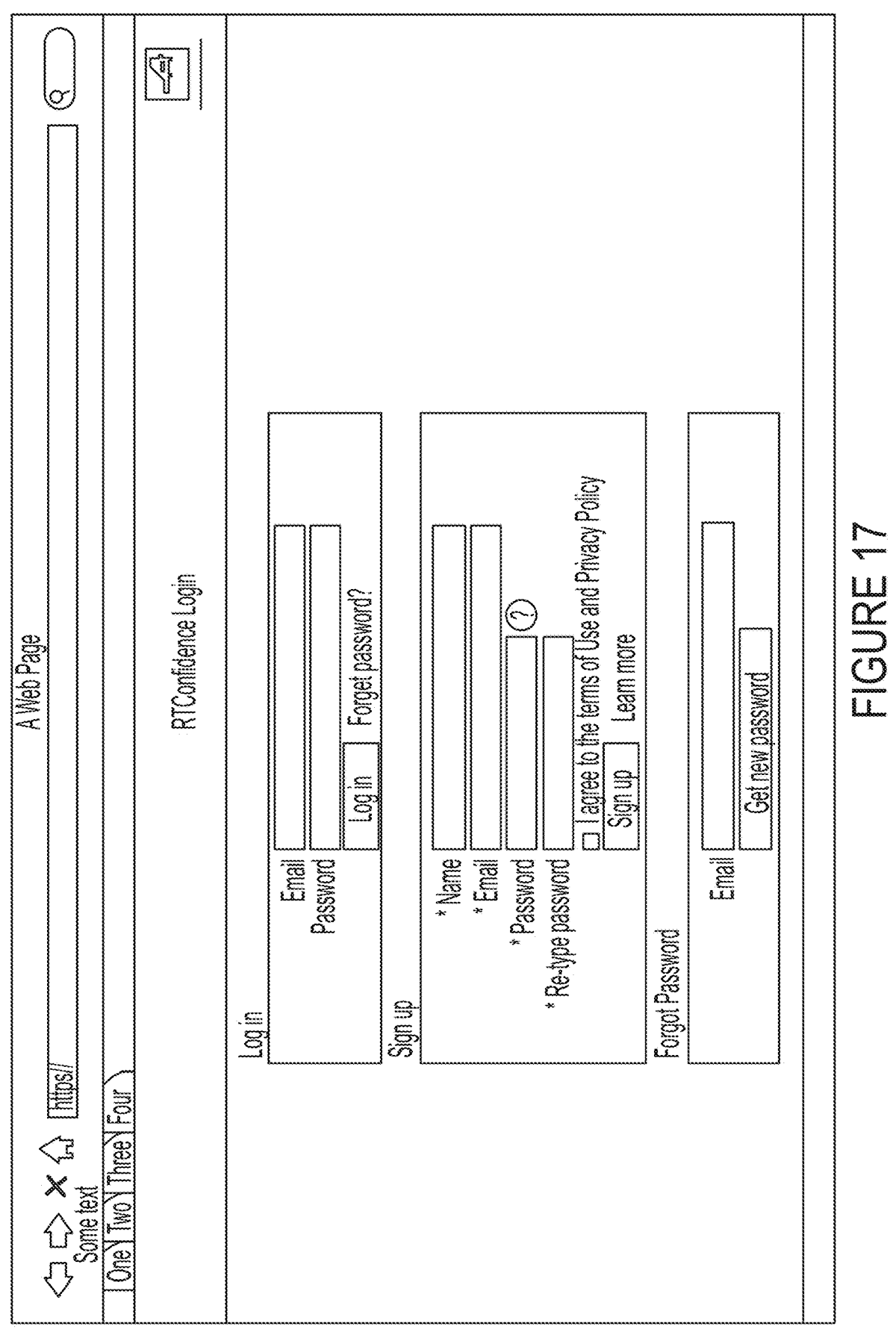

FIG. 17 illustrates the Authentication process within the SPM System process, and how this process facilitates all interactions between the users of the system and the Internet Cloud which interacts seamlessly and securely (protecting users and organizations, as well as all their privileged data) within the SPM system. A Standard Log-in Process is shown (which is cloud-based, thus internet access is required to use the system). Also shown is a sample user authorization matrix for various access rights and privileges. This system accommodates several layers of user accessibility and the ability for an Administrator to establish the appropriate settings based on Portfolio Management direction. If a third-party IMS tool is used by the Project Wizard of that licensed organization, the Project Planning individuals will need to have that application program resident within their computer system. Also, please note that other than the Project Planning activities, all cloud-based functions are able to be accessed via cellular and wi-fi enabled devices.

Figure 18:
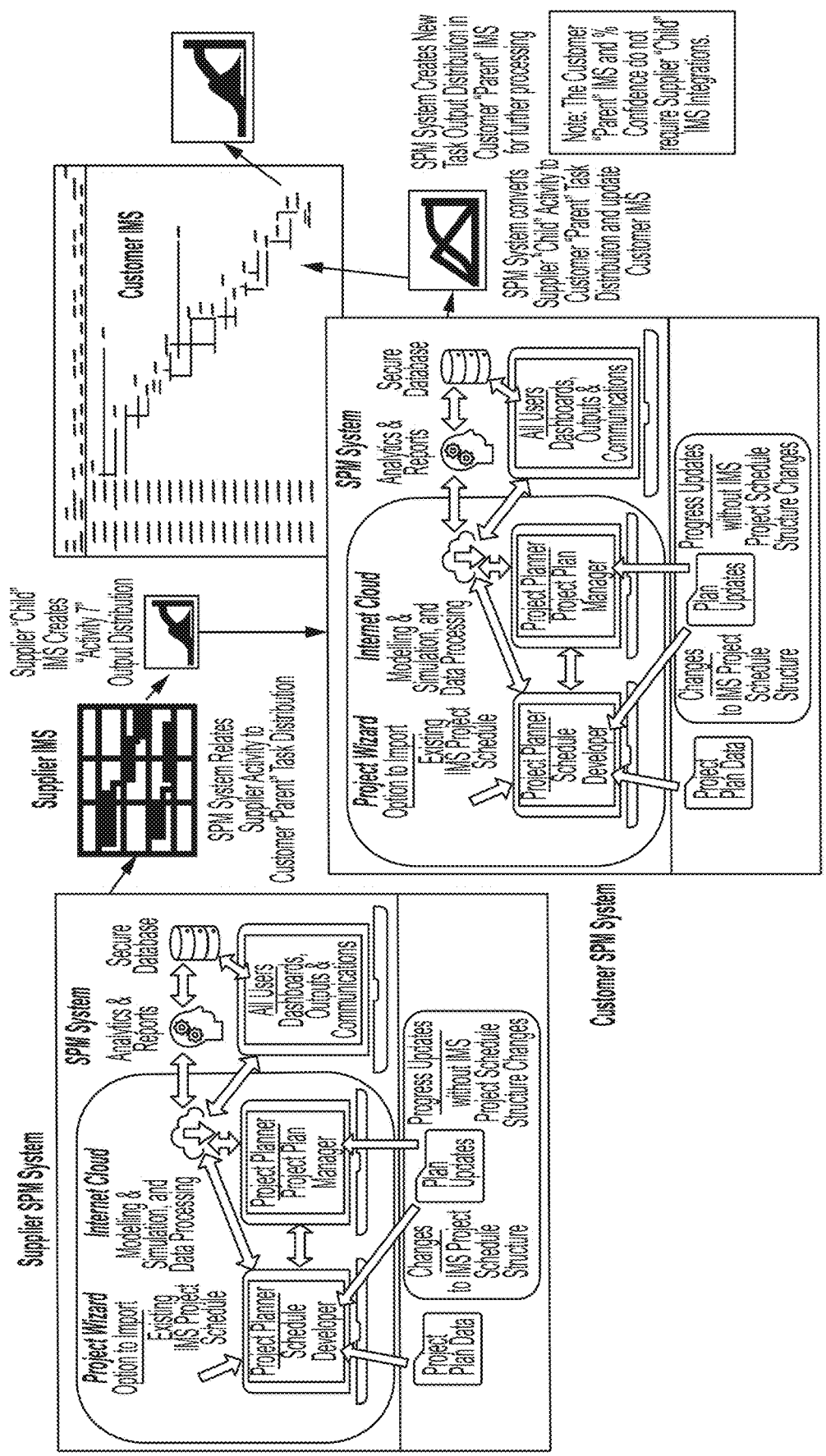
FIG. 18 illustrates how a user from another organization (within the originating organization's Supply Chain) can be authorized to have selective access to the customer SPM System so that near-real-time updates can be provided by all critical entities working on a project.

FIG. 18 illustrates how a user from another organization (e.g. within the originating organization's Supply Chain) can be authorized to have selective access to the customer SPM System so that near-real-time updates can be provided by all critical entities working on a project. The supplier updates its "Child" IMS and is given access rights to process an updated sub-project output distribution which is automatically inserted into the Customer "Parent" schedule as a replacement to the existing task distribution for a Task within the "Parent" schedule. This enables an automatic update of the "Parent" schedule and modelling and simulation result (i.e. overall project % confidence "S" curve without having to roll up the supplier's "Child" schedule IMS into the Customer's "Parent" schedule IMS). The SPM System may be set up to enable this transaction automatically or with an alert to and approver before officially enable the update to be published to the other Organizational Stakeholders.

Figure 19A:
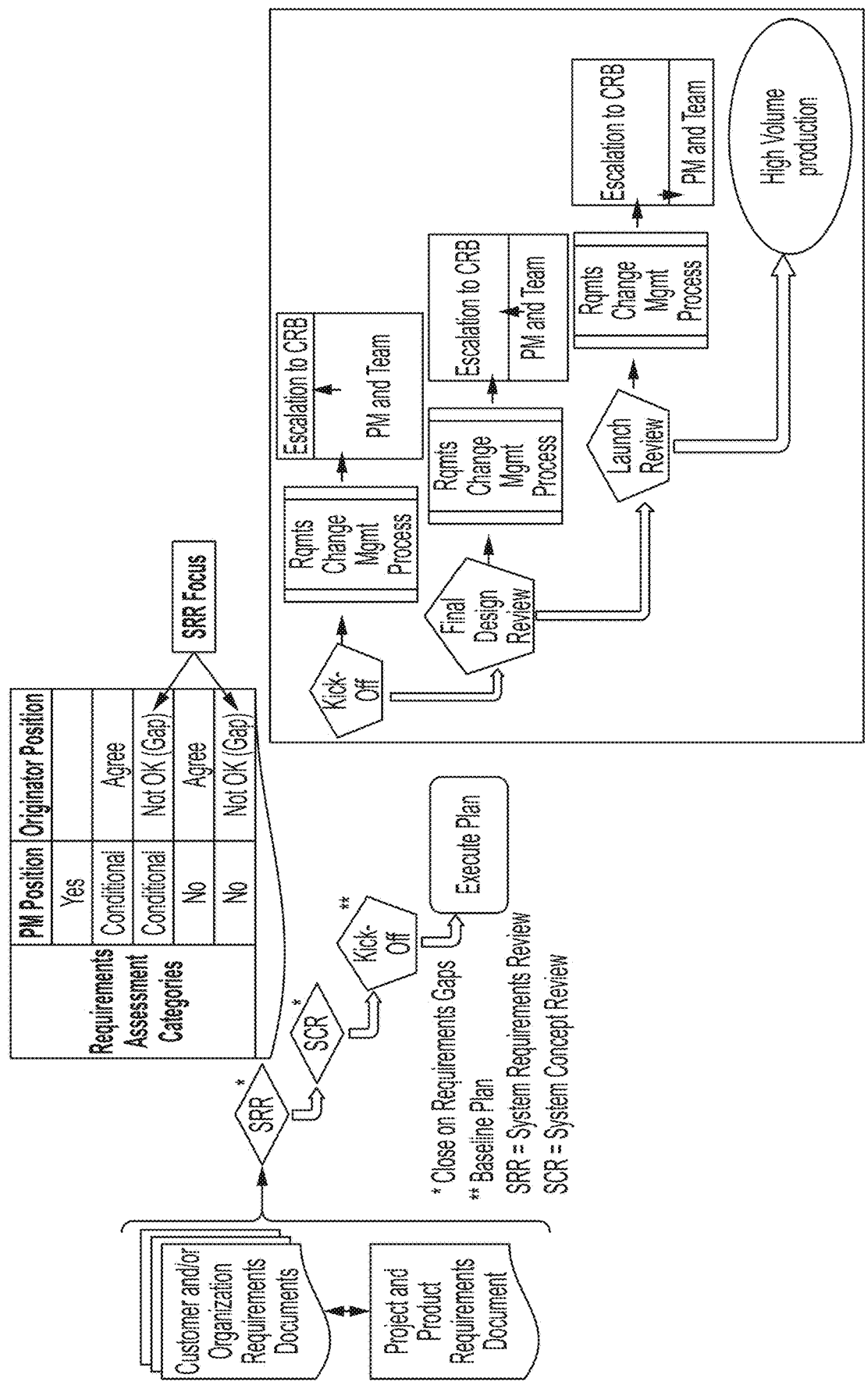
FIGS. 19A and 19B illustrate a process flow for Project Requirements and Change Management.
Figure 19B:
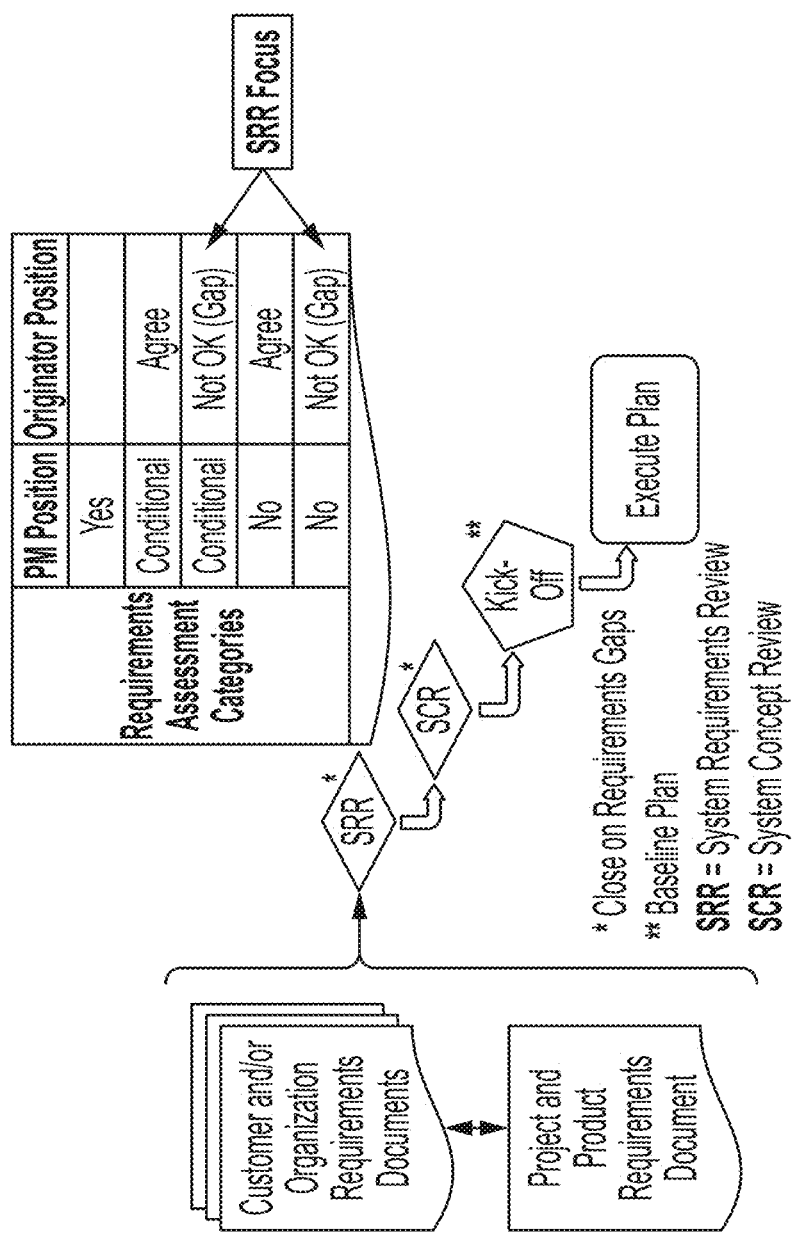

FIGS. 19A and 19B illustrate and define the potential (i.e. if user elects to use this feature) process flow for Project Requirements and Change Management. This process flow is general in nature and can be customized to satisfy organizational needs. As shown, the SPM System communications capability is able to construct a "configuration controlled" Project Requirements Compliance Matrix and is able to accommodate organizational and PDP preferences for products. This flow can include a "request for change" as well as approvals for evaluating and implementing changes throughout the project life cycle. This system also enables automatic Product Requirements updating based on change request and change implementation decisions and associated metrics.

Figure 20A:
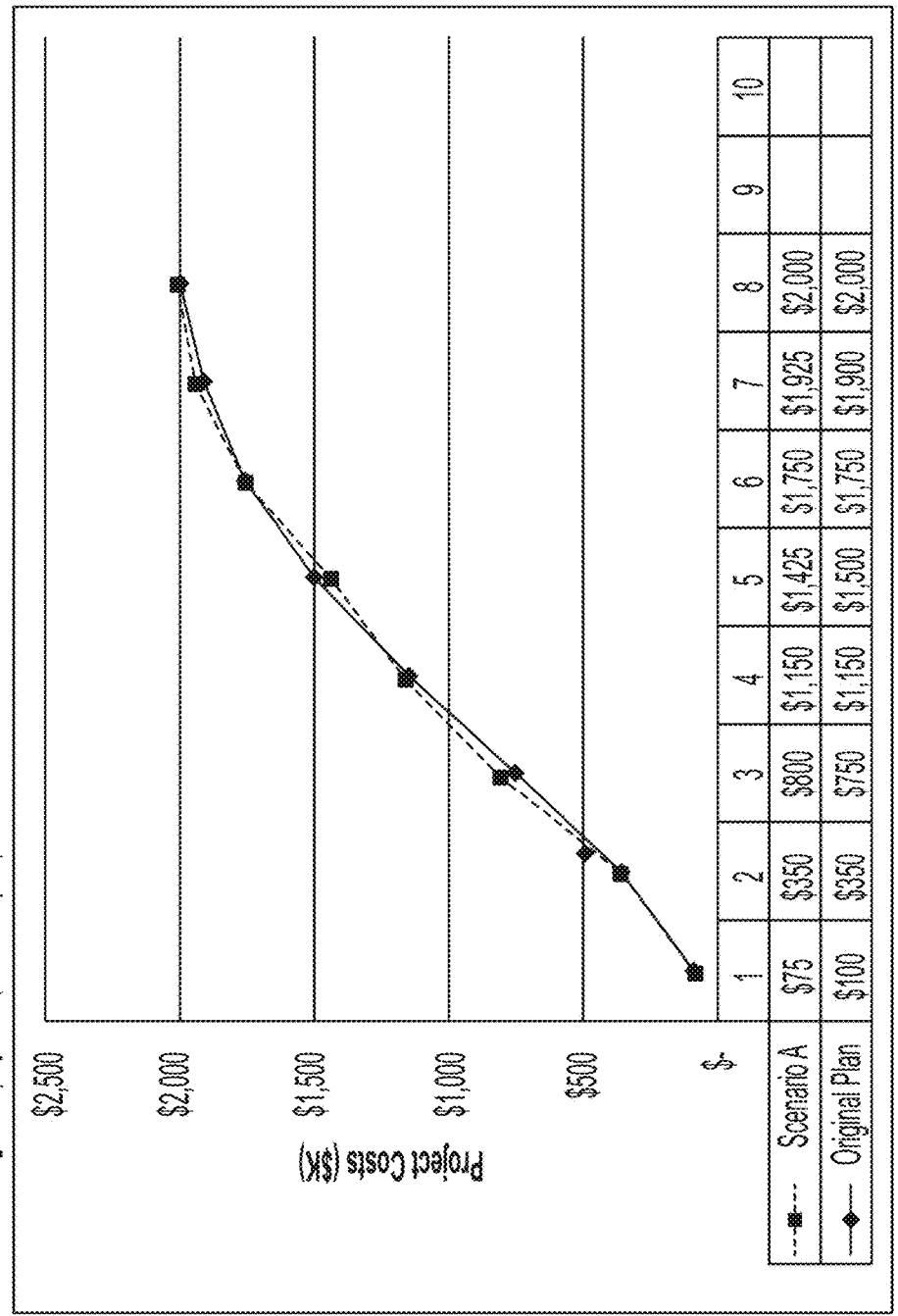
Figure 20A:
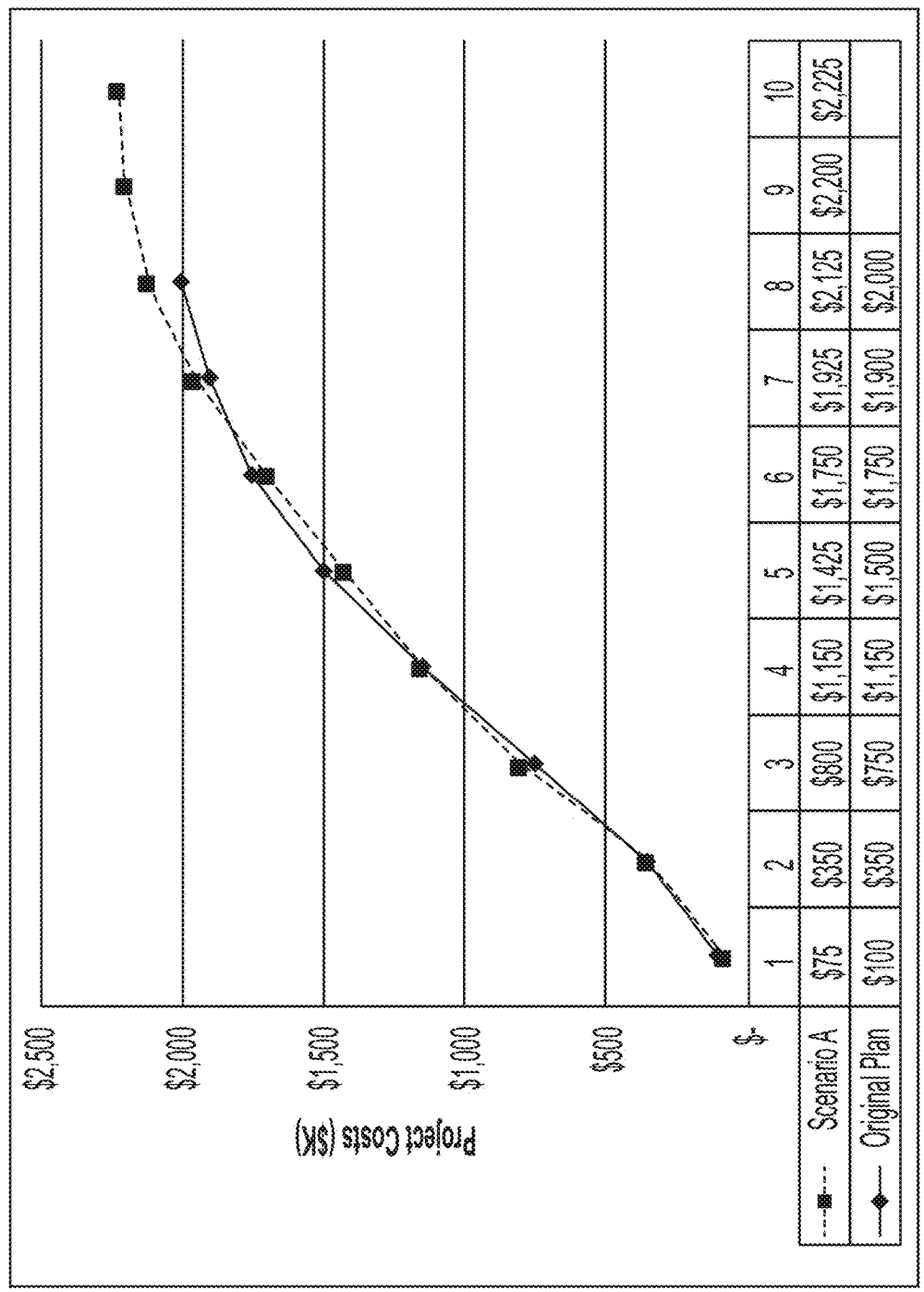
Figure 20A:
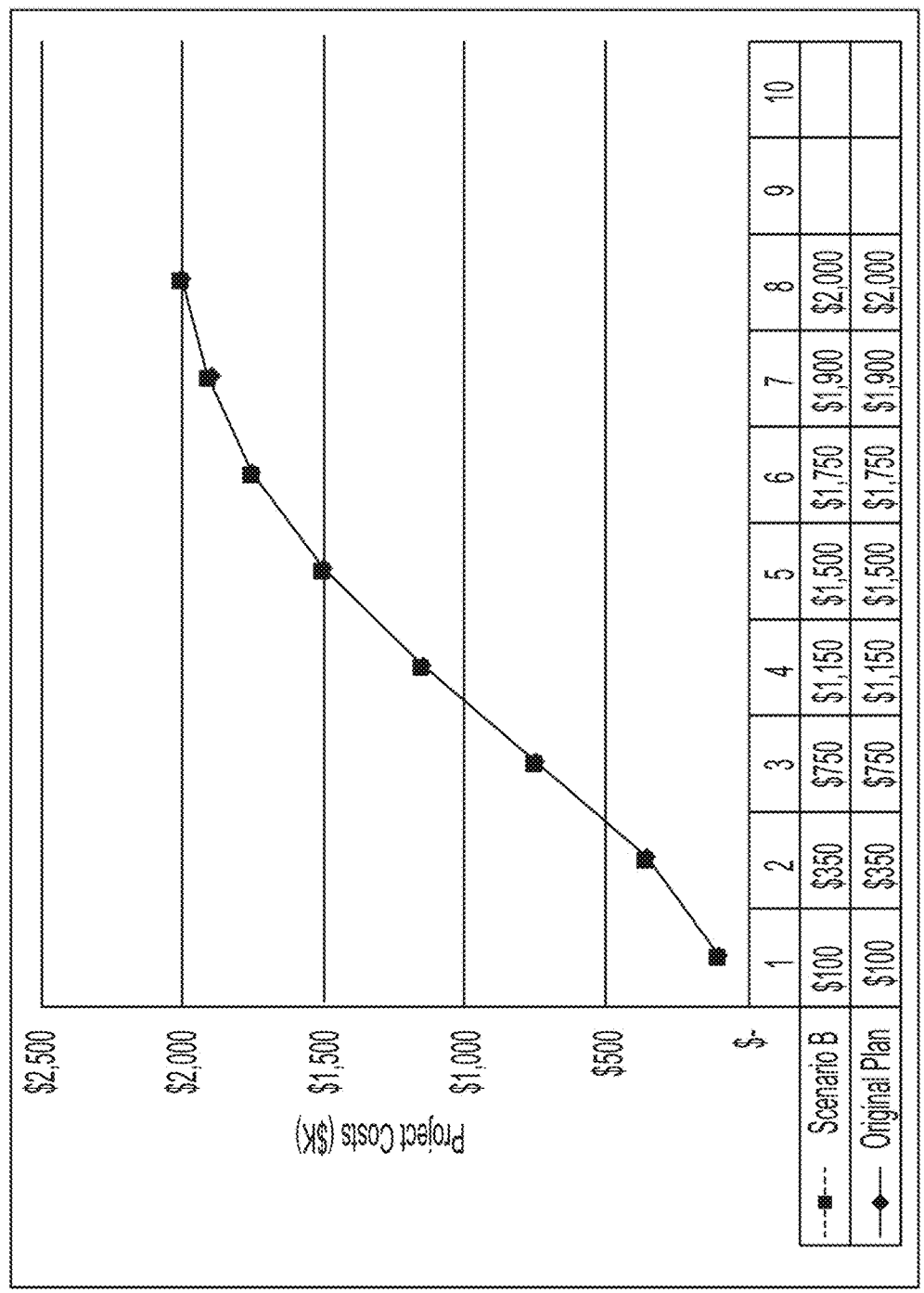
Figure 20A:
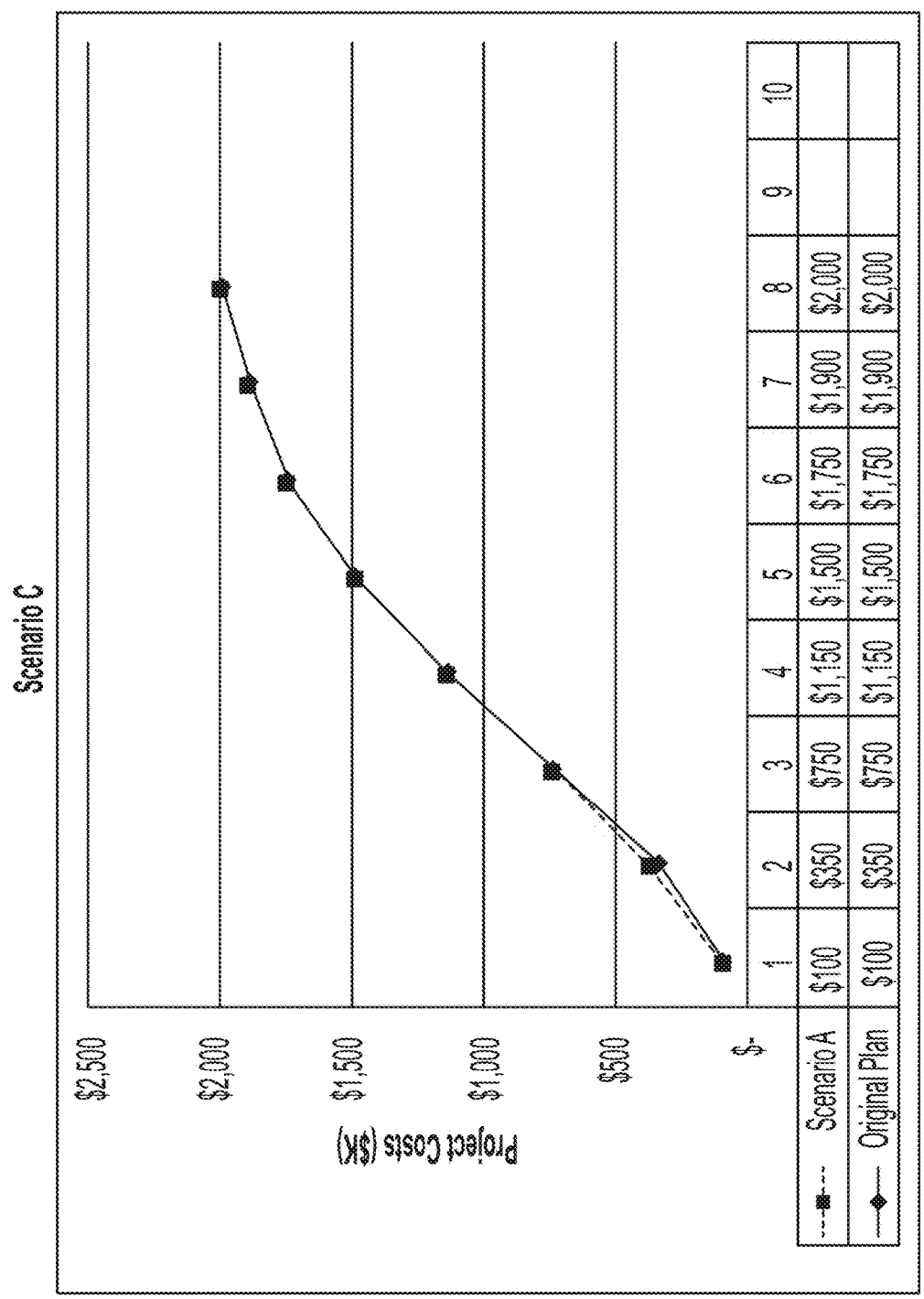
Figure 20A:
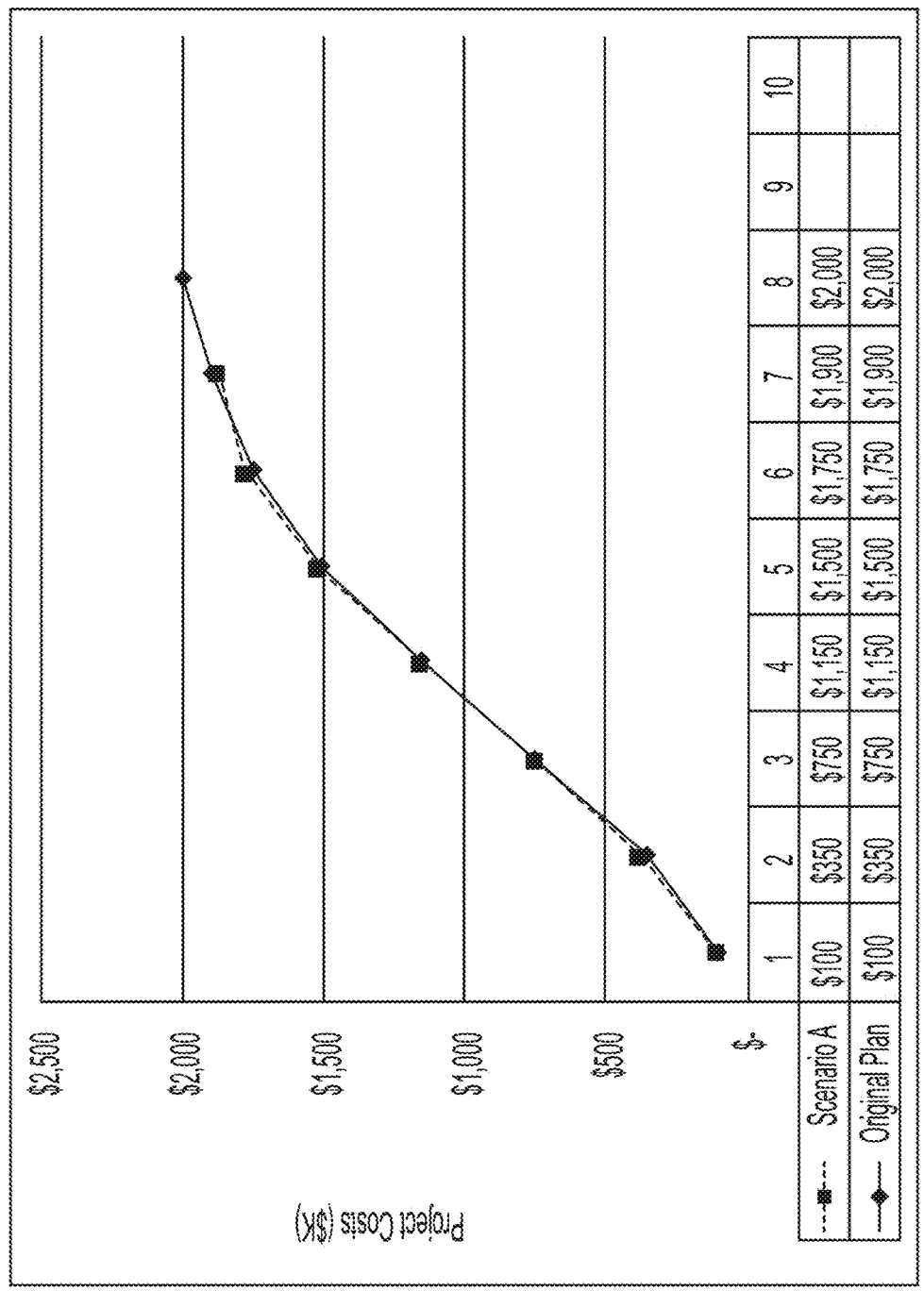
Figure 20A:
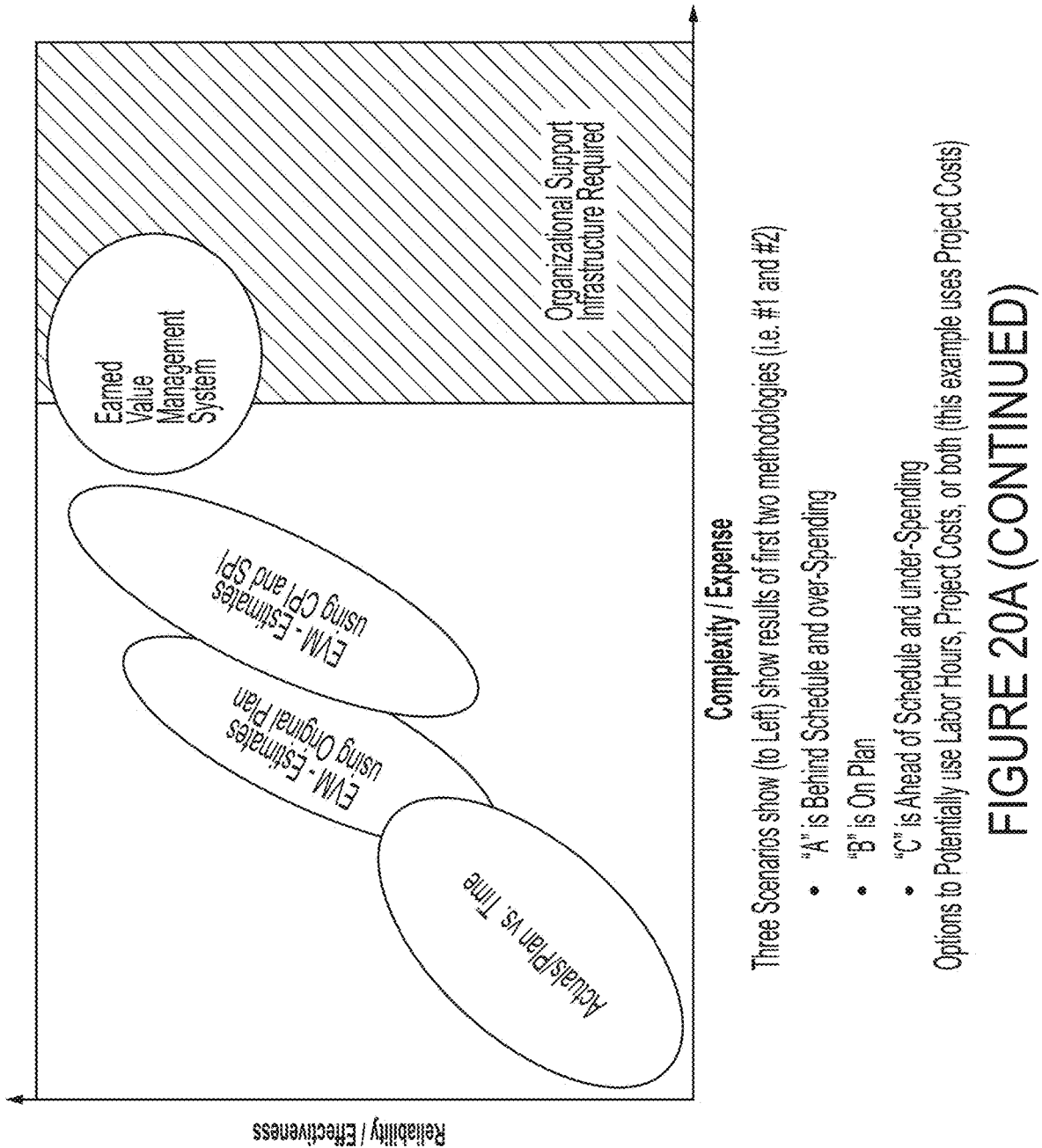

FIGS. 20A-20C illustrate and describe the options and how the two methodologies for generating project earned value management (EVM) metrics are employed. Formalized EMVS is well-documented and is offered, but the simpler approaches are not as well known, and no tools are readily available to offer all three, like this SPM System is. Three simple project scenarios are used (with data provided) to show how the tool works, and the outputs of the more complicated of the two methodologies (Estimates using CPI [Cost Performance Index] and SPI [Schedule Performance Index]) are displayed. It must also be noted that this system can automatically facilitate Earned Schedule (ES), whereby task duration (or time) is focused on to provide SPIs and corresponding independent estimates of Schedule completion ranges.

Figure 21A:
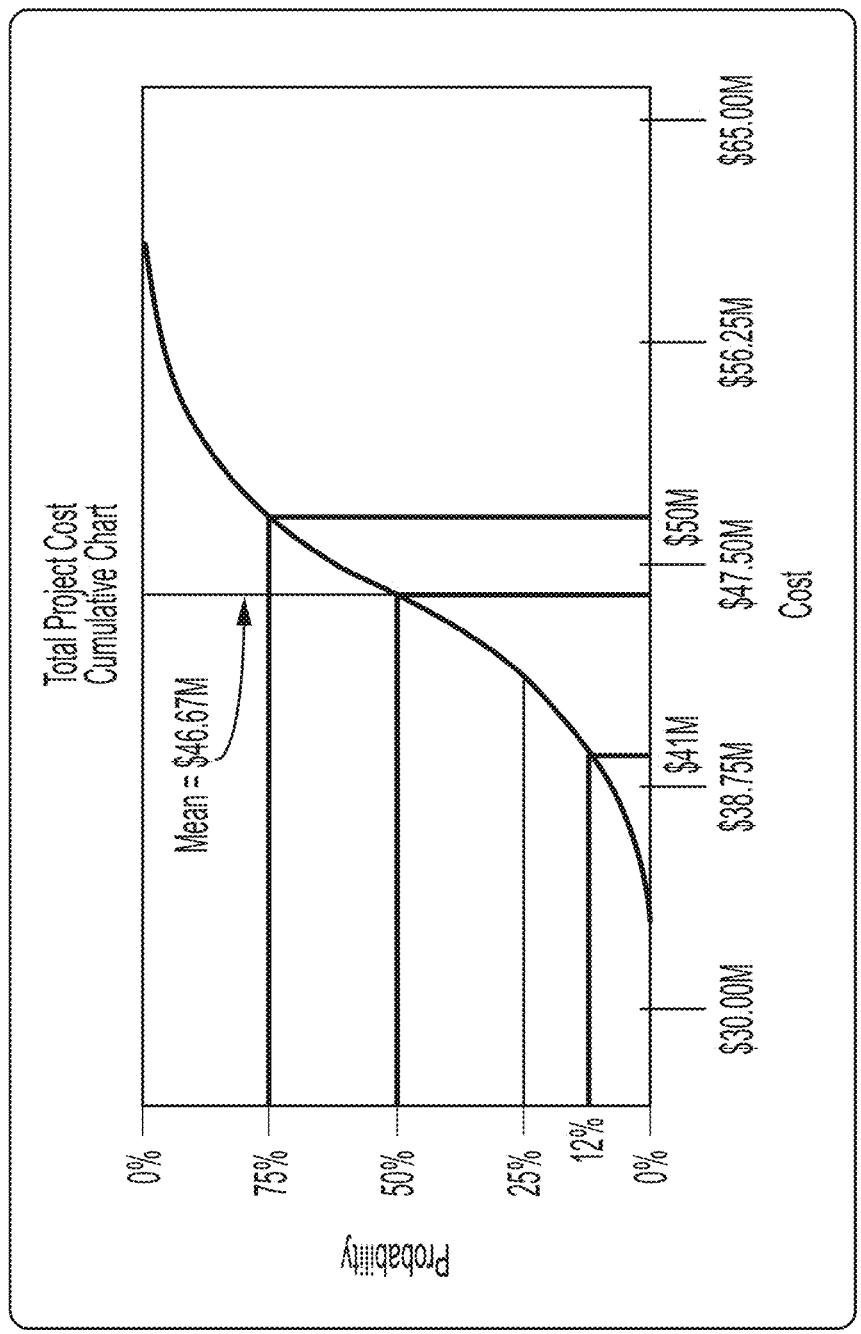
FIGS. 21A and 21B illustrate the SPM system being used for financial management.
Figure 21B:
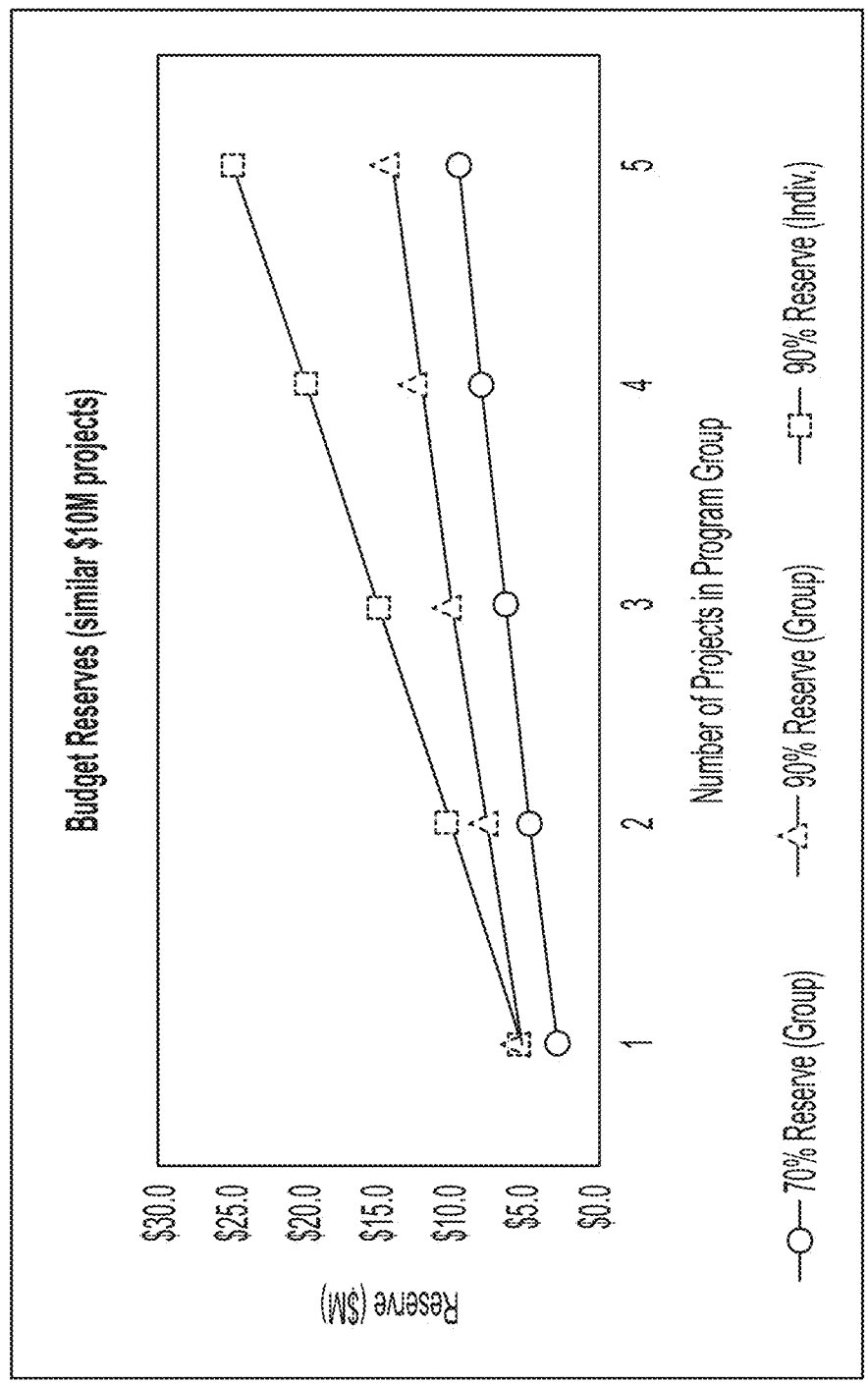

FIGS. 21A and 21B illustrate two examples relative to the process of using the SPM system for performance of Financial Management and/or Prediction. In one example shown in FIG. 21A an 'S' curve (i.e. % Confidence curve) is shown to demonstrate and describe the unique aspect of this SPM System and its Project Wizard to give insight into project cost projections and/or project effort projections (note that the effort metric can be put into several potential units of measure [e.g. man-hours, man-years, man-days, etc.]). This type of cost projection curve can be derived automatically via the use of the Project Wizard and SPM System. The Probability percentage is equivalent to % Confidence. Similar to the way the Project Wizard can develop % confidence for project tasks and accumulate them for every schedule milestone, the same can be performed for project cost or effort (e.g. man-months of effort)

FIG. 21B provides insight into another cost risk metric (at the portfolio level) that can assist in determining the appropriate reserves to set aside to cover project cost risks across the portfolio (using a methodology similar to that of insurance companies to enable absorption of multiple project-level risks that are less than the total sum). Other, more conventional financial data (e.g. actuals, parts open commitments/expenses, other-direct-costs, capital equipment costs, funding, etc.) can be displayed as well. For simplicity, this analysis in FIG. 21B assumes that each project has the same level of complexity and budget. Each has a nominal $10M budget requirement and the risk assumes there is a 10% (or best-case) probability that each project can be completed for as little as $8M and a 90% (or high % confidence) probability that each project will be completed for $15M or less. When considered individually, to ensure a 90% confidence, one would thus set aside $15M for each project. As a group, given statistics, the budget set-aside amount needed to maintain a 90% confidence decreases incrementally with each additional project (i.e., 2 projects require $27.43M versus $30M, 3 projects require $39.8M versus $45M, etc.) Further, if risk tolerance supports a lower confidence threshold (like 70%), less of a budget set-aside is needed—refer to the accompanying chart.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims

What is claimed is:

1. A software project management system, comprising:
a computer system having a processor and memory and a plurality of lines of instructions that are configured to:
retrieve a risk adjusted integrated master schedule (IMS) project having a plurality of tasks wherein each task has a duration and one or more parameters of the task and wherein an association exists between two or more tasks in the IMS;
receive a child IMS being one of an imported IMS and a new IMS, the child IMS having at least one completion milestone probability distribution function (PDF);
insert the child IMS completion milestone PDF into the IMS project to generate an updated IMS with the child IMS automatically rolled up into the IMS project; and
store the updated IMS.

2. The system of claim 1, wherein the processor is further configured to set, using a project baseline wizard executed by the processor, one or more baselines for the imported IMS and the new IMS and to update, using a project progress update wizard executed by the processor, a stored IMS.

3. The system of claim 1, wherein the processor is further configured to gamify the retrieved IMS project.

4. The system of claim 1, wherein the processor is further configured to track one or more pieces of financial data about the IMS project and to execute a project progress update wizard to receive one or more pieces of update data for the project, automatically generate a new report for the project based on the one or more pieces of update data and automatically update a duration for at least one task of the project based on the one or more pieces of update data.

5. The system of claim 1, wherein the processor is further configured to execute a probability distribution wizard to determine an overall project percent confidence, wherein the processor executing the probability distribution wizard is further configured to calculate the overall project percent confidence based on a probability distribution function for one or more of the tasks that are part of the project and to display a schedule with the duration of at least one task adjusted based on the overall project percent confidence.

6. The system of claim 1, wherein the processor is further configured to execute a probabilistic branching wizard to manage one of incremental activity and iterative activity using probabilistic branching.

7. The system of claim 1, wherein the processor is further configured to integrate the child IMS into the retrieved IMS and to represent the child IMS as a child task in the retrieved IMS and wherein the child IMS is a supply chain partner IMS.

8. The system of claim 1, wherein the processor is further configured to generate a dashboard for each user and to generate customized home page for each user, the customized home page displaying the dashboard for the user.

9. The system of claim 1, wherein the processor is further configured to execute an earned schedule wizard that generates one or more different earned value management reports, to securely authorize each user of the system based on an authorization matrix and wherein the retrieved IMS is one of an imported IMS, a new IMS and a stored IMS.

10. The system of claim 1, wherein each task in the risk-adjusted IMS has a task risk probability curve that is used to generate a resource allocation probability risk and the processor is further configured to generate a high risk of resource over allocation curve based on the resource allocation probability risk.

11. The system of claim 1, wherein each task in the risk-adjusted IMS has a task risk probability curve that is used to probabilistically maximize allocation benefits and wherein the processor is further configured to probabilistically maximize allocation benefits using one or more of automatic adjustment of one or more of task ordering and task timing and manual adjustment of one or more of task ordering and task timing.

12. A software project management method, comprising:
retrieving a risk adjusted integrated master schedule (IMS) project having a plurality of tasks wherein each task has a duration and one or more parameters of the task and wherein an association exists between two or more tasks in the IMS;
receiving a child IMS being one of an imported IMS and a new IMS, the child IMS having at least one completion milestone probability distribution function (PDF);
inserting the child IMS completion milestone PDF into the IMS project to generate an updated IMS with the child IMS automatically rolled up into the IMS project; and
storing the updated IMS.

13. The method of claim 12 further comprising setting, using a project baseline wizard, one or more baselines for the imported IMS and the new IMS and updating, using a project progress update wizard, a stored IMS.

14. The method of claim 12, wherein the retrieved IMS further comprises an IMS that is not risk adjusted.

15. The method of claim 12 further comprising gamifying the retrieved IMS project.

16. The method of claim 12 further comprising tracking one or more pieces of financial data about the IMS project and receiving one or more pieces of update data for the project, automatically generating a new report for the project based on the one or more pieces of update data and automatically updating a duration for at least one task of the project based on the one or more pieces of update data.

17. The method of claim 12 further comprising executing a probability distribution wizard to determine an overall project percent confidence, calculating the overall project percent confidence based on a probability distribution function for one or more of the tasks that are part of the project and displaying a schedule with the duration of at least one task adjusted based on the overall project percent confidence.

18. The method of claim 12 further comprising managing, using a probabilistic branching wizard, one of incremental activity and iterative activity using probabilistic branching.

19. The method of claim 12 further comprising integrating the child IMS into the retrieved IMS, wherein integrating the child IMS into the retrieved IMS further comprises representing the child IMS as a child task in the retrieved IMS and the child IMS is a supply chain partner IMS.

20. The method claim 12 further comprising generating a dashboard for each user, generating a customized home page for each user, the customized home page displaying the dashboard for the user, generating, using an earned schedule wizard, one or more different earned value management reports and securely authorizing each user of the system based on an authorization matrix.

21. The method of claim 12, wherein the retrieved IMS is one of an imported IMS, a new IMS and a stored IMS.

22. The method of claim 12, wherein each task in the risk-adjusted IMS has a task risk probability curve that is used to generate a resource allocation probability risk and further comprising generating a high risk of resource over allocation curve based on the resource allocation probability risk.

23. The method of claim 12, wherein each task in the risk-adjusted IMS has a task risk probability curve that is used to probabilistically maximize allocation benefits and wherein probabilistically maximize allocation benefits further comprises probabilistically maximize allocation benefits using one or more of automatic adjustment of one or more of task ordering and task timing and manual adjustment of one or more of task ordering and task timing.

* * * * *